(12) United States Patent
Bae et al.

(10) Patent No.: US 12,114,211 B2
(45) Date of Patent: Oct. 8, 2024

(54) DEVICE AND METHOD FOR SUPPORTING CONDITIONAL HANDOVER IN WIRELESS COMMUNICATION SYSTEM

(71) Applicant: Samsung Electronics Co., Ltd., Suwon-si (KR)

(72) Inventors: Beomsik Bae, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 479 days.

(21) Appl. No.: 17/634,128

(22) PCT Filed: Aug. 10, 2020

(86) PCT No.: PCT/KR2020/010575
§ 371 (c)(1),
(2) Date: Feb. 9, 2022

(87) PCT Pub. No.: WO2021/029644
PCT Pub. Date: Feb. 18, 2021

(65) Prior Publication Data
US 2022/0279391 A1  Sep. 1, 2022

(30) Foreign Application Priority Data
Aug. 9, 2019  (KR) .......................... 10-2019-0097536

(51) Int. Cl.
*H04W 36/00* (2009.01)
*H04W 36/08* (2009.01)
*H04W 36/36* (2009.01)

(52) U.S. Cl.
CPC ..... *H04W 36/0033* (2013.01); *H04W 36/087* (2023.05); *H04W 36/362* (2023.05)

(58) Field of Classification Search
None
See application file for complete search history.

(56) References Cited

U.S. PATENT DOCUMENTS 9,521,565 B2  12/2016  Tenny et al.
10,432,291 B2  10/2019  Agiwal et al.
(Continued)

FOREIGN PATENT DOCUMENTS

CN  108370593 A  8/2018
CN  109691155 A  4/2019
(Continued)

OTHER PUBLICATIONS

3rd Generation Partnership Project (3GPP) TS 38.463 v15.4.0; Technical Specification Group Radio Access Network; NG-RAN; E1 Application Protocol (E1AP) (Release 15), Jul. 2019.
(Continued)

*Primary Examiner* — Liem H. Nguyen
(74) *Attorney, Agent, or Firm* — Jefferson IP Law, LLP

(57) ABSTRACT

The disclosure relates to a $5^{th}$ Generation (5G) or pre-5G communication system for supporting a higher data transfer rate after a $4^{th}$ Generation (4G) communication system such as long term evolution (LTE). According to various embodiments of the disclosure, an operation method performed by a Center Unit (CU)-Control Plane (CP) of a candidate Base Station (BS) may include transmitting a first message for a bearer context setup request to a CU-User Plane (UP) of the candidate BS, wherein the first message includes information for indicating a conditional handover which is a handover performed by a User Equipment (UE) when at least one execution condition is satisfied, and receiving a second message for a bearer context setup response from the CU-UP.

16 Claims, 30 Drawing Sheets

(56) References Cited

U.S. PATENT DOCUMENTS

| | | | |
|---|---|---|---|
| 10,716,161 | B2 | 7/2020 | Ryu et al. |
| 10,869,209 | B2 | 12/2020 | Hahn et al. |
| 2019/0037629 | A1 | 1/2019 | Ryu et al. |
| 2020/0077314 | A1* | 3/2020 | Hwang ............... H04W 36/362 |
| 2020/0196205 | A1* | 6/2020 | Kim ................. H04W 36/0033 |
| 2020/0396652 | A1* | 12/2020 | Decarreau ......... H04W 36/0055 |
| 2021/0045031 | A1* | 2/2021 | Lee ................... H04W 28/0284 |
| 2021/0068016 | A1* | 3/2021 | Shi ........................ H04W 36/00 |
| 2021/0176802 | A1* | 6/2021 | Sirotkin ............... H04L 1/1864 |
| 2022/0022121 | A1* | 1/2022 | Ekl?f .................. H04W 36/322 |
| 2022/0030483 | A1* | 1/2022 | Cheng ............... H04W 36/0058 |
| 2022/0030498 | A1* | 1/2022 | Futaki ................ H04W 36/362 |
| 2022/0279391 | A1 | 9/2022 | Bae et al. |
| 2022/0322175 | A1* | 10/2022 | Liu ................... H04W 28/0861 |
| 2023/0007542 | A1* | 1/2023 | Teyeb ............... H04W 36/0016 |
| 2023/0345321 | A1* | 10/2023 | Zhang ............ H04W 36/00837 |

FOREIGN PATENT DOCUMENTS

| | | |
|---|---|---|
| KR | 10-2011-0086623 A | 7/2011 |
| KR | 10-2018-0122963 A | 11/2018 |
| WO | 2017/126922 A1 | 7/2017 |
| WO | 2021/029644 A1 | 2/2021 |
| WO | 2021/158577 A1 | 8/2021 |

OTHER PUBLICATIONS

China Telecom, 'On Conditional Handover for NR', 3GPP TSG RAN WG3#104, R3-192513, Reno, Nevada, USA, May 12-17, 2019.

CATT, 'Consideration on handover preparation in CHO for NR', 3GPP TSG-RAN WG3 #104 R3-193095, Reno, NV, USA, May 13-17, 2019.

Samsung, '(TP for NR_Mob_enh BL CR for TS 38.463): Introducing CHO, indication over E1', 3GPP TSG-RAN WG3 #105 R3-194071, Ljubljana, Slovenia, Aug. 26-30, 2019.

ZTE et al., 'Further Discussion of CHO Addition, Modify and Cancel of Upper Layer UP Resources over E1AP', 3GPP TSG-RAN3 Meeting #107-e R3-200520, Feb. 24-Mar. 6, 2020 E-Meeting.

European Search Report dated Sep. 23, 2022, issued in European Application No. 20852847.1.

Samsung, Introducing CHO indication to gNB-DU and gNB-CU-UP, 3GPP TSG-RAN WG3 #105, R3-194067, Ljubljana, Slovenia, Aug. 26-30, 2019.

Huawei, F1 impact for CHO, 3GPP TSG-RAN WG3 #105, R3-194114, Ljubljana, Slovenia, Aug. 26-30, 2019.

Ericsson, Conditional Handover—Disaggregated gNB impact, 3GPP TSG-RAN WG3 Meeting #106, R3-197443, Reno, NV, USA, Nov. 18-22, 2019.

3GPP TS 38.473 V16.8.0; 3rd Generation Partnership Project; Technical Specification Group Radio Access Network; NG-RAN; F1 application protocol (F1AP), (Release 16), Dec. 2021.

Change Request, 3GPP TSG-RAN WG3 #107-e, R3-200527, Feb. 24-Mar. 6, 2020.

Change Request, 3GPP TSG-RAN3 Meeting #107-e, R3-200521, Feb. 24-Mar. 6, 2020.

3GPP TS 38.401 V15.6.0; 3rd Generation Partnership Project; Technical Specification Group Radio Access Network; NG-RAN; Architecture description (Release 15), Jul. 2019.

3GPP TS 38.463 V15.4.0; 3rd Generation Partnership Project; Technical Specification Group Radio Access Network; NG-RAN; E1 Application Protocol (E1AP), (Release 15), Jul. 2019.

Chinese Office Action with English translation dated Feb. 8, 2024; Chinese Appln. No. 202080069659.6.

* cited by examiner

DEVICE AND METHOD FOR SUPPORTING CONDITIONAL HANDOVER IN WIRELESS COMMUNICATION SYSTEM

CROSS-REFERENCE TO RELATED APPLICATION(S)

This application is a U.S. National Stage application under 35 U.S.C. § 371 of an International application number PCT/KR2020/010575, filed on Aug. 10, 2020, which is based on and claims priority of a Korean patent application number 10-2019-0097536, filed on Aug. 9, 2019, in the Korean Intellectual Property Office, the disclosure of which is incorporated by reference herein in its entirety.

TECHNICAL FIELD

The disclosure relates in general to a wireless communication system, and in particular to an apparatus and method for supporting a Conditional Handover (CHO) in the wireless communication system.

BACKGROUND ART

To meet a demand on wireless data traffic which has been in an increasing trend after a $4^{th}$ Generation (4G) communication system was commercialized, there is an ongoing effort to develop an improved $5^{th}$ Generation (5G) communication system or a pre-5G communication system. For this reason, the 5G communication system or the pre-5G communication system is called a beyond 4G network communication system or a post Long Term Evolution (LTE) system.

To achieve a high data transfer rate, the 5G communication system is considered to be implemented in an mmWave band (e.g., such as a 60 GHz band). To reduce a propagation path loss at the mmWave band and to increase a propagation delivery distance, beamforming, massive Multiple Input Multiple Output (MIMO), Full Dimensional MIMO (FD-MIMO), array antenna, analog beam-forming, and large scale antenna techniques are under discussion in the 5G communication system.

In addition, to improve a network of a system, techniques such as an evolved small cell, an advanced small cell, a cloud Radio Access Network (RAN), an ultra-dense network, Device to Device (D2D) communication, a wireless backhaul, a moving network, cooperative communication, Coordinated Multi-Points (CoMP), and reception interference cancellation, or the like are being developed in the 5G communication system.

In addition thereto, Hybrid Frequency shift keying and Quadrature Amplitude Modulation (FQAM) and Sliding Window Superposition Coding (SWSC) as an Advanced Coding Modulation (ACM) technique and Filter Bank Multi Carrier (FBMC), Non Orthogonal Multiple Access (NOMA), and Sparse Code Multiple Access (SCMA), or the like as an advanced access technology are being developed in the 5G system.

In a wireless communication system such as the 5G system, a handover may be supported to ensure user mobility. Due to the handover, a seamless service can be provided to a user while moving. In particular, since a signal loss is great due to a high frequency characteristic of the 5G system, there is ongoing research on various methods for effectively performing the handover.

DISCLOSURE OF INVENTION

Technical Problem

The disclosure provides an apparatus and method for effectively supporting a Conditional Handover (CHO) in a wireless communication system, based on the aforementioned discussion.

In addition, the disclosure provides an apparatus and method for minimizing unnecessary signaling when a CHO is executed in a wireless communication system.

In addition, the disclosure provides an apparatus and method for responding to resource modification, cancellation, or the like when a CHO is executed in a wireless communication system.

Solution to Problem

According to various embodiments, an operation method of a Control Unit (CU)-Control Plane (CP) unit of a Base Station (BS) in a wireless communication system may include receiving a handover request message including an indicator indicating a Conditional Handover (CHO), and transmitting to a CU-User Plane (UP) unit a bearer context setup request message including information for reporting execution of the CHO.

According to various embodiments, a CU-CP unit of a BS in a wireless communication system may include a transceiver and at least one processor coupled to the transceiver. The at least one processor may provide control to receive a handover request message including an indicator indicating a CHO, and transmit to a CU-UP unit a bearer context setup request message including information for reporting execution of the CHO.

According to various embodiments, an operation method of a CU-CP unit of a BS in a wireless communication system may include receiving a handover request message including an indicator indicating a CHO from a source BS, transmitting to the source BS a cancel request message for a handover cancel request in response to determining of cancelling the CHO, and receiving a cancel message from the source BS.

According to various embodiments, an operation method performed by a CU-CP of a candidate BS may include transmitting a first message for a bearer context setup request to a CU-UP of the candidate BS, wherein the first message includes information for indicating a conditional handover which is a handover executed by a User Equipment (UE) when at least one execution condition is satisfied, and receiving a second message for a bearer context setup response from the CU-UP.

According to various embodiments, a CU-CP of a candidate BS of a conditional handover which is a handover executed by a UE when at least one execution condition is satisfied may include at least one transceiver and at least one processor. The at least one processor may be configured to transmit a first message for a bearer context setup request to a CU-UP of the candidate BS, wherein the first message includes information for indicating a conditional handover which is a handover executed by a UE when at least one execution condition is satisfied, and receive a second message for a bearer context setup response from the CU-UP.

According to various embodiments, an operation method performed by a CU-UP of a candidate BS may include receiving a first message for a bearer context setup request from a CU-CP of the candidate BS, wherein the first message includes information for indicating a conditional handover which is a handover executed by a UE when at least one execution condition is satisfied, and transmitting a second message for a bearer context setup response to the CU-CP.

According to various embodiments, a CU-UP of a candidate BS of a conditional handover which is a handover executed by a UE when at least one execution condition is satisfied may include at least one transceiver and at least one processor. The at least one processor may be configured to receive a first message for a bearer context setup request from a CU-CP of the candidate BS, wherein the first message includes information for indicating a conditional handover which is a handover executed by the UE when at least one execution condition is satisfied, and transmit a second message for a bearer context setup response to the CU-CP.

According to various embodiments, an operation method performed by a DU of a candidate BS may include receiving a first message for a UE context setup request from a CU-CP of the candidate BS, wherein the first message includes information for indicating a conditional handover which is a handover executed by a UE when at least one execution condition is satisfied, and transmitting a second message for a UE context setup response to the CU-CP. The DU may be configured to stop an operation for detecting an RLF, based on the conditional handover.

According to various embodiments, a DU of a candidate BS of a conditional handover which is a handover executed by a UE when at least one execution condition is satisfied may include at least one transceiver and at least one processor. The at least one processor may be configured to receive a first message for a UE context setup request from a CU-CP of the candidate BS, wherein the first message includes information for indicating a conditional handover which is a handover executed by the UE when at least one execution condition is satisfied, and transmit a second message for a UE context setup response to the CU-CP. The DU may be configured to stop an operation for detecting an RLF, based on the conditional handover.

According to various embodiments, an operation method performed by a CU of a candidate BS may include transmitting a first message including first configuration information to a source BS of a conditional handover which is a handover executed by a UE when at least one execution condition is satisfied, wherein the first configuration information relates to a first transaction Identifier (ID), transmitting a second message including second configuration information to the source BS after transmitting the first message, wherein the second configuration information relates to a second transaction ID, and receiving a third message from a DU of the candidate BS after an access procedure of the UE, wherein the third message relates to the second transaction ID.

According to various embodiments, a CU-CP of a candidate BS of a conditional handover which is a handover executed by a UE when at least one execution condition is satisfied may include at least one transceiver and at least one processor. The at least one processor may be configured to transmit a first message including first configuration information to a source BS of a conditional handover which is a handover executed by the UE when at least one execution condition is satisfied, wherein the first configuration information relates to a first transaction ID, transmit a second message including second configuration information to the source BS after transmitting the first message, wherein the second configuration information relates to a second transaction ID, and receive a third message from a DU of the candidate BS after an access procedure of the UE, wherein the third message relates to the second transaction ID.

Advantageous Effects of Invention

An apparatus and method according to various embodiments of the disclosure can effectively support a Conditional Handover (CHO).

Advantageous effects that can be obtained in the disclosure are not limited to the aforementioned advantageous effects, and other unmentioned advantageous effects can be clearly understood by one of ordinary skill in the art to which the disclosure pertains from the description below.

BEST MODE FOR CARRYING OUT THE INVENTION

Figure 1:
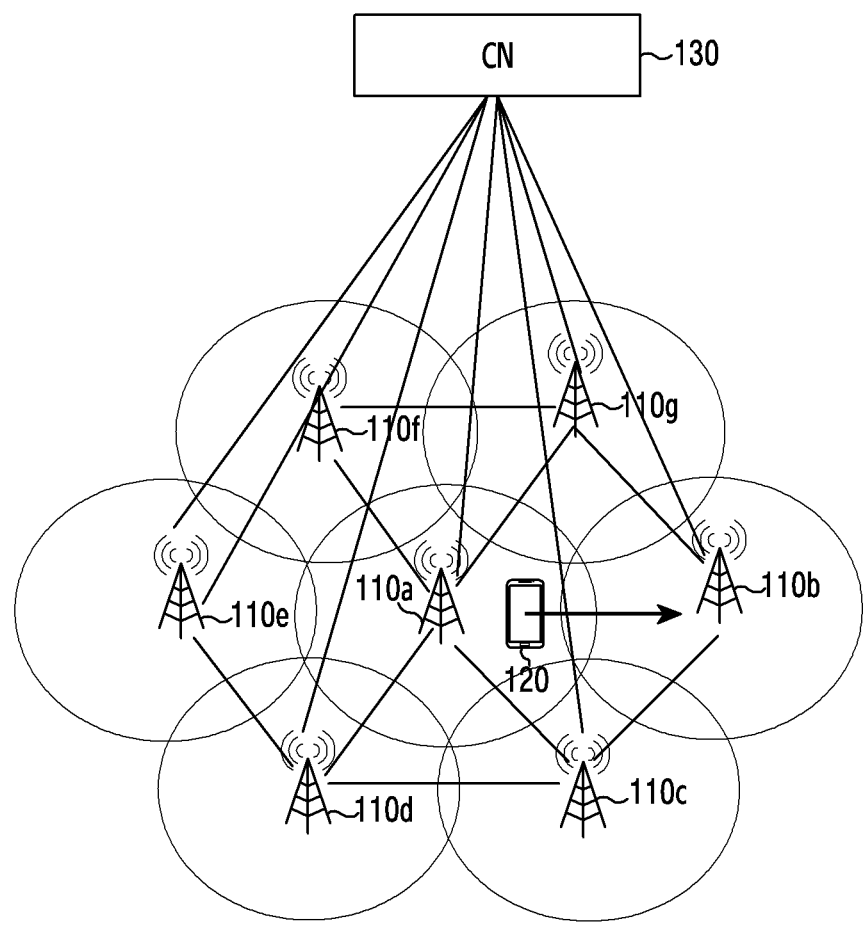
FIG. 1 illustrates an example of disposing a Base Station (BS) and switching of the BS due to a movement of a terminal in a wireless communication system according to various embodiments.

Terms used in the disclosure are for the purpose of describing particular embodiments only and are not intended to limit other embodiments. A singular expression may include a plural expression unless there is a contextually distinctive difference. Unless otherwise defined, all terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described for example in the various embodiments of the disclosure described hereinafter. However, since the various embodiments of the disclosure include a technique in which hardware and software are both used, a software-based approach is not excluded in the embodiments of the disclosure.

The disclosure described hereinafter relates to an apparatus and method for supporting a Conditional Handover (hereinafter, CHO) in a wireless communication system. Specifically, the disclosure describes a technique for controlling (e.g., modifying, cancelling, or the like) a resource for the CHO in the wireless communication system.

Terms used hereinafter to refer to a signal, a channel, control information, a message, network entities, a component of a device, or the like are exemplified for convenience of explanation. Therefore, the disclosure is not limited to the terms described below, and thus other terms have the same technical meaning may also be used.

In the following description, a physical channel and a signal may be used interchangeably with data or a control signal. For example, although a Physical Downlink Shared Channel (PDSCH) is a term referring to a physical channel through which data is transmitted, the PDSCH may also be used to refer to data. That is, in the disclosure, an expression 'transmitting a physical channel' may be interpreted equivalent to an expression 'transmitting data or a signal through a physical channel'.

Hereinafter, in the disclosure, higher signaling refers to a method of transferring a signal from a Base Station (BS) to a terminal by using a downlink data channel of a physical layer or from the terminal to the BS by using an uplink data channel of the physical layer. The higher signaling may be understood as Radio Resource Control (RRC) signaling or Media Access Control (MAC) Control Element (CE).

In addition, although an expression 'greater than' or 'less than' is used in the disclosure to determine whether a specific condition is fulfilled, this is for exemplary purposes only and does not exclude an expression of 'greater than or equal to' or 'less than or equal to'. A condition described as "greater than or equal to" may be replaced with "greater than". A condition described as "less than or equal to" may be replaced with "less than". A condition described as "greater than or equal to and less than" may be replaced with "greater than and less than or equal to".

In addition, although the disclosure describes various embodiments by using terms used in some communication standards (e.g., $3^{rd}$ Generation Partnership Project (3GPP)), this is for exemplary purposes only. Various embodiments of the disclosure may be easily modified and applied to other communication systems.

FIG. 1 illustrates a wireless communication system according to various embodiments of the disclosure.

Referring to FIG. 1, the wireless communication system includes a plurality of BSs 110a to 110g, a terminal 120, and a Core Network (CN) 130.

The BSs 110a to 110g are network infrastructures which provide a radio access to the terminal 120. Each of the BSs 110a to 110g has coverage defined as a specific geographic region, based on a distance at which a signal can be transmitted. The BSs 110a to 110g may be coupled to at least some of neighboring BSs, and the BSs may be coupled to the CN 130. Each of the BSs 110a to 110g may be a mobile communication BS independent of Radio Access Technology (RAT) such as LTE, NR, or WiFi. Each of the BSs 110a to 110g may be referred to as not only the base station but also an 'Access Point (AP)', an 'eNodeB (eNB)', a '5$^{th}$ Generation (5G) node', a 'next generation nodeB (gNB)', a 'wireless point', a 'Transmission/Reception Point (TRP)', or other terms having equivalent technical meanings.

The terminal 120 is a device used by a user, and performs communication through a wireless channel with respect to the BSs 110a to 110g. After the terminal 120 is coupled to the BS, a mobile communication service may be provided. Since the terminal 120 moves, a service may be provided seamlessly through a Handover (HO) procedure by switching the BS. The terminal 120 may be referred to as not only the terminal but also a 'User Equipment (UE)', a 'mobile station', a 'subscriber station', a 'remote terminal', a 'wireless terminal', a 'user device', or other terms having equivalent technical meanings.

The CN 130 is a set of entities or nodes which manage a Radio Access Network (RAN) including BSs for a mobile communication service and control connectivity with an external network. The CN 130 may provide a function for managing subscriber information such as a subscriber number and a current location of the subscriber, a function for coupling to another network, a function for providing other additional services, or the like. The CN 130 may include at least one of an Evolved Packet Core (EPC) or a 5G Core (5GC). The CN 130 may include at least one functional entity. For example, the functional entities may include an Access and Mobility Function (AMF), a Session Management Function (SMF), a User Plane Function (UPF), a Policy Control Function (PCF), an Application Function (AF), a User Data Management (UDM), or the like. The listed functional entities may be implemented as at least one hardware device (e.g., a server). When a plurality of functional entities are performed in one device, the plurality of functional entities may be implemented by a plurality of virtual machines.

Figure 2:
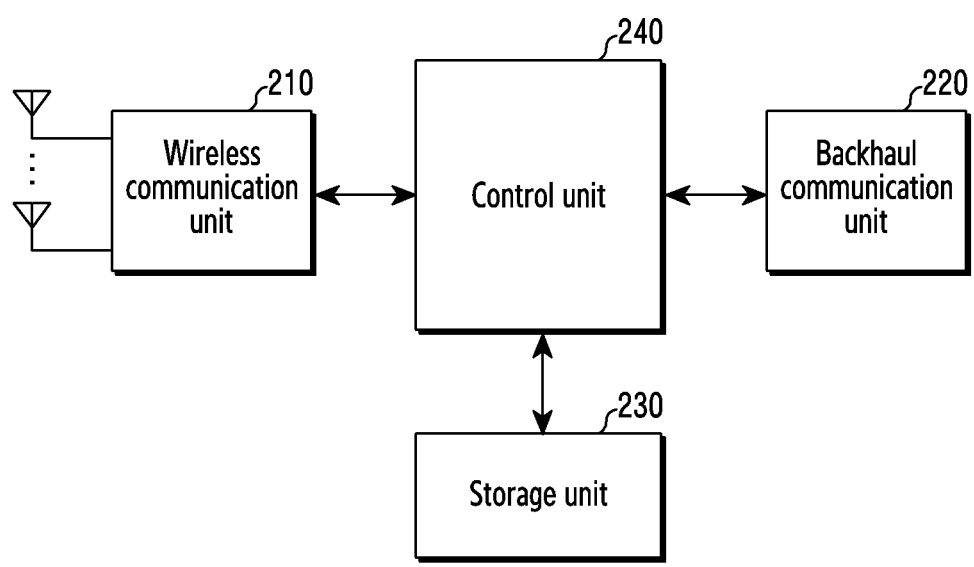
FIG. 2 illustrates a structure of a BS in a wireless communication system according to various embodiments of the disclosure.

FIG. 2 illustrates a structure of a BS in a wireless communication system according to various embodiments of the disclosure. The exemplary structure of FIG. 2 may be understood as a structure of the first BS 110a or any one of the other BSs 110b to 110g. Hereinafter, the term ' . . . unit', ' . . . device', or the like implies a unit of processing at least one function or operation, and may be implemented in hardware or software or in combination of the hardware and the software.

Referring to FIG. 2, the BS includes a wireless communication unit 210, a backhaul communication unit 220, a storage unit 230, and a control unit 240.

The wireless communication unit 210 performs functions for transmitting and receiving a signal through a wireless channel. For example, the wireless communication unit 210 performs a function of conversion between a baseband signal and a bit-stream according to a physical layer standard of a system. For example, in data transmission, the wireless communication unit 210 generates complex symbols by coding and modulating a transmission bit-stream. In addition, in data reception, the wireless communication unit 210 restores a reception bit-stream by demodulating and decoding a baseband signal.

In addition, the wireless communication unit 210 up-converts a baseband signal into a Radio Frequency (RF) signal and thereafter transmits it through an antenna, and down-converts an RF signal received through the antenna into a baseband signal. For this, the wireless communication unit 210 may include a transmission filter, a reception filter, an amplifier, a mixer, an oscillator, a Digital to Analog Converter (DAC), an Analog to Digital Converter (ADC), or the like. In addition, the wireless communication unit 210 may include a plurality of transmission/reception paths. Further, the wireless communication unit 210 may include at least one antenna array constructed of a plurality of antenna elements.

From a hardware aspect, the wireless communication unit 210 may be constructed of a digital unit and an analog unit, and the analog unit may be constructed of a plurality of sub-units according to operating power, operation frequency, or the like. The digital unit may be implemented with at least one processor (e.g., a Digital Signal Processor (DSP)).

The wireless communication unit 210 transmits and receives a signal as described above. Accordingly, the wireless communication unit 210 may be referred to as a transmitter, a receiver, or a transceiver. In addition, in the following description, transmission and reception performed through a wireless channel are used to imply that the aforementioned processing is performed by the wireless communication unit 210.

The backhaul communication unit 220 provides an interface for preforming communication with different nodes in a network. That is, the backhaul communication unit 220 converts a bit-stream transmitted from the BS to a different node, e.g., a different access node, a different BS, an upper node, a core network, or the like, into a physical signal, and converts a physical signal received from the different node into a bit-stream.

The storage unit 230 stores data such as a basic program, application program, setup information, or the like for an operation of the BS. The storage unit 230 may be constructed of a volatile memory, a non-volatile memory, or a combination of the volatile memory and the non-volatile memory. In addition, the storage unit 230 provides the stored data at the request of the control unit 240.

The control unit 240 controls overall operations of the BS. For example, the control unit 240 may transmit and receive a signal via the wireless communication unit 210 or the backhaul communication unit 220. In addition, the control unit 240 writes data to the storage unit 230, and reads the data. Further, the control unit 240 may perform functions of a protocol stack required in a communication standard. According to another implementation, the protocol stack may be included in the wireless communication unit 210. For this, the control unit 240 may include at least one processor. According to various embodiments, the control unit 240 may control the BS to perform operations in accordance with various embodiments described below.

Figure 3:
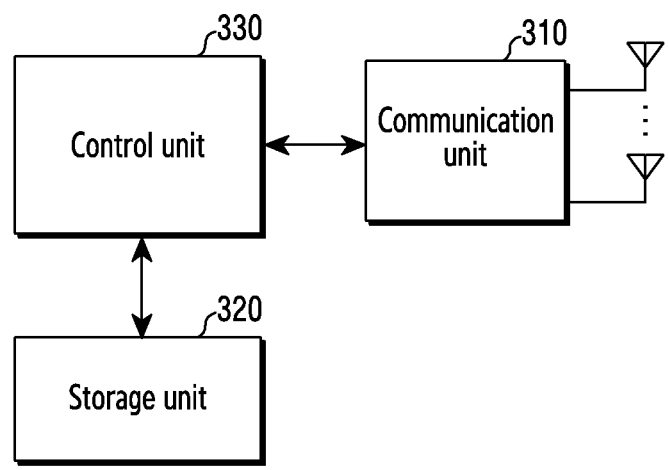
FIG. 3 illustrates a structure of a terminal in a wireless communication system according to various embodiments of the disclosure.

FIG. 3 illustrates a structure of a terminal in a wireless communication system according to various embodiments of the disclosure. The exemplary structure of FIG. 3 may be understood as a structure of the terminal 120. Hereinafter, the term '. . . unit', '. . . device', or the like implies a unit of processing at least one function or operation, and may be implemented in hardware or software or in combination of the hardware and the software.

Referring to FIG. 3, the terminal includes a communication unit 310, a storage unit 320, and a control unit 330.

The communication unit 310 performs functions for transmitting and receiving a signal through a wireless channel. For example, the communication unit 310 performs a function of conversion between a baseband signal and a bit-stream according to a physical layer standard of a system. For example, in data transmission, the communication unit 310 generates complex symbols by coding and modulating a transmission bit-stream. In addition, in data reception, the communication unit 310 restores a reception bit-stream by demodulating and decoding a baseband signal. In addition, the communication unit 310 up-converts a baseband signal into a Radio Frequency (RF) signal and thereafter transmits it through an antenna, and down-converts an RF signal received through the antenna into a baseband signal. For example, the communication unit 310 may include a transmission filter, a reception filter, an amplifier, a mixer, an oscillator, a DAC, an ADC, or the like.

In addition, the communication unit 310 may include a plurality of transmission/reception paths. Further, the communication unit 310 may include at least one antenna array constructed of a plurality of antenna elements. From a hardware aspect, the communication unit 310 may be constructed of a digital circuit and an analog circuit (e.g., a Radio Frequency Integrated Circuit (RFIC)). Herein, the digital and the analog circuit may be implemented as one package. In addition, the communication unit 310 may include a plurality of RF chains. Further, the communication unit 310 may perform beamforming.

The communication unit 310 transmits and receives a signal as described above. Accordingly, the communication unit 310 may be referred to as a transmitter, a receiver, or a transceiver. In addition, in the following description, transmission and reception performed through a wireless channel are used to imply that the aforementioned processing is performed by the communication unit 310.

The storage unit 320 stores data such as a basic program, application program, setup information, or the like for an operation of the terminal. The storage unit 320 may be constructed of a volatile memory, a non-volatile memory, or a combination of the volatile memory and the non-volatile memory. In addition, the storage unit 320 provides the stored data at the request of the control unit 330.

The control unit 330 controls overall operations of the terminal. For example, the control unit 330 may transmit and receive a signal via the communication unit 310. In addition, the control unit 330 writes data to the storage unit 320, and reads the data. Further, the control unit 330 may perform functions of a protocol stack required in a communication standard. For this, the control unit 330 may include at least one processor or micro-processor, or may be part of the processor. In addition, part of the communication unit 310 and the control unit 330 may be referred to as a Communication Processor (CP). According to various embodiments, the control unit 330 may control the terminal to perform operations in accordance with various embodiments described below.

Figure 4:
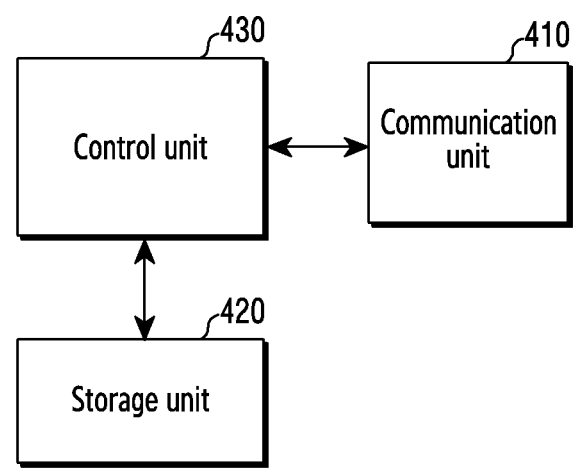
FIG. 4 illustrates a structure of a core network device in a wireless communication system according to various embodiments of the disclosure.

FIG. 4 illustrates a structure of a core network device in a wireless communication system according to various embodiments of the disclosure. The exemplary structure of FIG. 4 may be understood as a structure of a device which performs at least one function among the functional entities included in the CN 130. Hereinafter, the term '. . . unit', '. . . device', or the like implies a unit of processing at least one function or operation, and may be implemented in hardware or software or in combination of the hardware and the software.

Referring to FIG. 4, the core network device includes a communication unit 410, a storage unit 420, and a control unit 430.

The communication unit 410 provides an interface for preforming communication with different nodes in a network. That is, the communication unit 410 converts a bit-stream transmitted from the core network device to a different device, and converts a physical signal received from the different device into a bit-stream. That is, the communication unit 410 may transmit and receive a signal. Accordingly, the communication unit 410 may be referred to as a transmitter, a receiver, or a transceiver. In this case, the communication unit 410 may allow the core network device to communication with other devices or systems via a backhaul connection (e.g., a wired backhaul or a wireless backhaul).

The storage unit 420 stores a basic program, application program, setup information, or the like for an operation of the core network device. The storage unit 420 may be constructed of a volatile memory, a non-volatile memory, or a combination of the volatile memory and the non-volatile memory. In addition, the storage unit 420 provides the stored data at the request of the control unit 430.

The control unit 430 controls overall operations of the core network device. For example, the control unit 430 transmits and receives a signal via the communication unit 410. In addition, the communication unit 430 writes data to the storage unit 420, and reads the data. For this, the control unit 430 may include at least one processor. According to various embodiments, the control unit 430 may control the core network device to perform operations in accordance with various embodiments described below.

Figure 5:
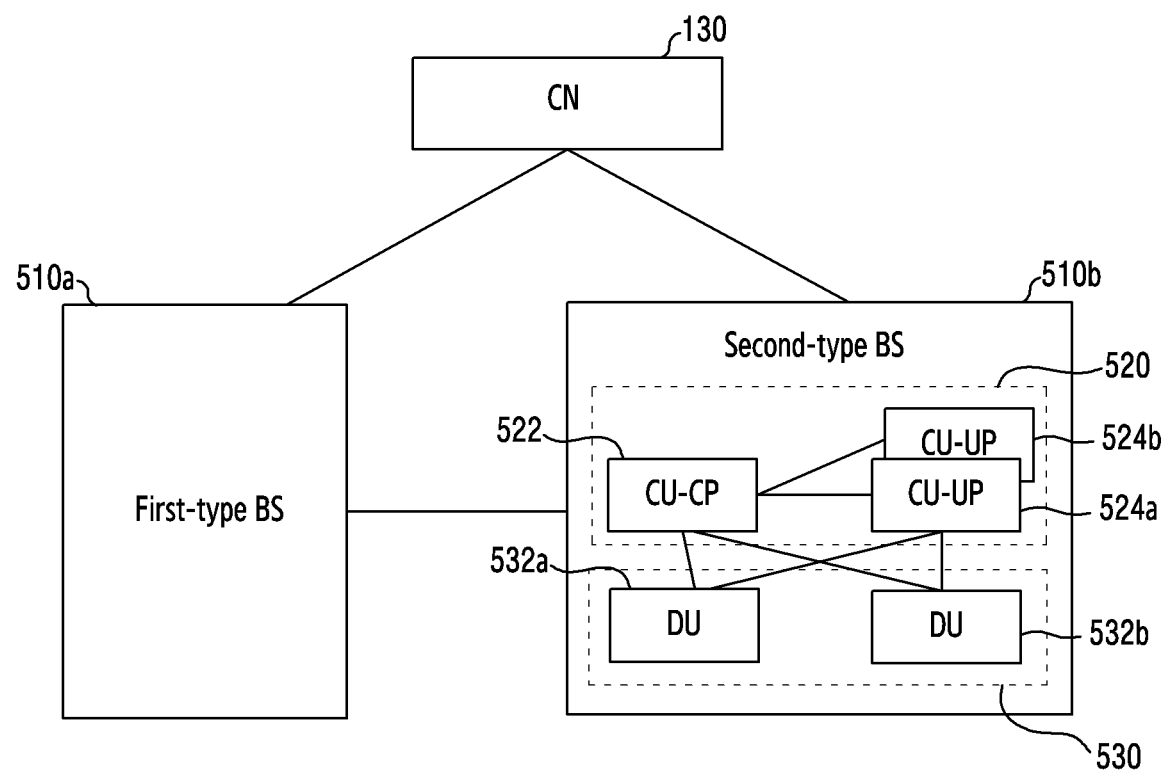
FIG. 5 illustrates various structures of a BS in a wireless communication system according to various embodiments of the disclosure.

FIG. 5 illustrates various structures of a BS in a wireless communication system according to various embodiments of the disclosure. In FIG. 5, a first-type BS 510a is constructed integrally, and a second-type BS 510b is constructed to be divided into a Centralized Unit (CU) 520 and a Distributed Unit (DU) 530. The CU 520 is divided again into a CU-Control Plane (CP) unit 522 and a CU-User Plane (UP) unit 524a or 524b. The first-type BS 510a may be referred to as an 'integral-type BS', and the second-type BS 510b may be referred to as a 'separate-type BS'.

The CU 520 and the DU 530 support a BS function in a divided manner. For example, the CU 520 may support RRC/Packet Data Convergence Protocol (PDCP) layers, and the DU 530 may support Radio Link Control (RLC)/Media Access Control (MAC)/Physical (PHY)/Radio Frequency (RF) layers. Therefore, the CU 520 and the DU 530 may be coupled through an interface, for example, an F1 interface, between internal functions of the BS. In addition, the CU 520 may be divided again into the CU-CP unit 522 and the CU-UP unit 524a or 524b. For example, the CU-CP unit 522 may support RRC/PDCP layers (e.g., for RRC), and the CU-UP unit 524a or 524b may support a PDCP layer (e.g., for user data transmission). The CU-CP unit 522 and the CU-UP unit 524a or 524b may be coupled through an interface, such as an E1 interface, between internal functions of the BS.

As shown in FIG. 5, the BS may have an integral-type or separate-type structure. A connection may be possible between BSs having the integral-type structure, between BSs having the separate-type structure, and between a BS having the integral-type structure and a BS having the separate-type structure. In addition, the plurality of CU-UP units 524*a* and 524*b* and a plurality of DUs 532*a* and 532*b* may exist in one separate-type BS. Each of the plurality of CU-UP units 524*a* and 524*b* is coupled to the CU-CP unit 522, and may be possibly coupled to the plurality of DUs 532*a* and 532*b*. Each of the DUs is coupled to the CU-CP unit 522, and may be possibly coupled to the plurality of CU-UP units 524*a* and 524*b*. The integral-type BSs are coupled through an interface between the BSs, such as an X2 or Xn interface, and are coupled to a CN through a BS-CN interface, such as an S1 or NG interface. Each of the aforementioned interfaces may be implemented in a wired or wireless manner. Various embodiments described below can be implemented when a terminal is coupled to a BS and a handover is executed between BSs when the terminal moves, irrespective of whether the BS is an integral-type BS or a separate-type BS.

As described with reference to FIG. 5, a BS having a separate-type structure such as the second-type BS 510*b* may include at least one DU, at least one CU-CP unit, and at least one CU-UP unit. Herein, since the DU processes a PHY/RF layer, the DU may have the same structure as shown in FIG. 2. The CU-CP unit or the CU-UP unit may have the same structure as shown in FIG. 2 or FIG. 3. In this case, each of components exemplified in FIG. 2 or FIG. 3 may be implemented in the form of a single chip. In particular, the CU-CP unit or the CU-UP unit may be implemented based on a general-purpose commercial server or cloud network.

In general, a handover is defined as a procedure in which a source BS determines a target BS according to an internal policy, based on measurement information transmitted by a terminal, and transmits radio configuration information received from the target BS to the terminal so that the terminal is coupled to the target BS. On the other hand, a Conditional Handover (CHO) is defined as a procedure in which one or more neighboring BSs are selected as a potential target BS or candidate BS, and when the potential target BS is measured, a handover to one of the target BSs is executed according to a CHO standard transferred by the source BS. In the following description, a 'potential target BS' and a 'candidate BS' are used interchangeably as terms referring to neighboring BSs which are not specified as a target BS, and may be referred to as a 'potential target/candidate BS' or a 'target/candidate BS'.

Figure 6:
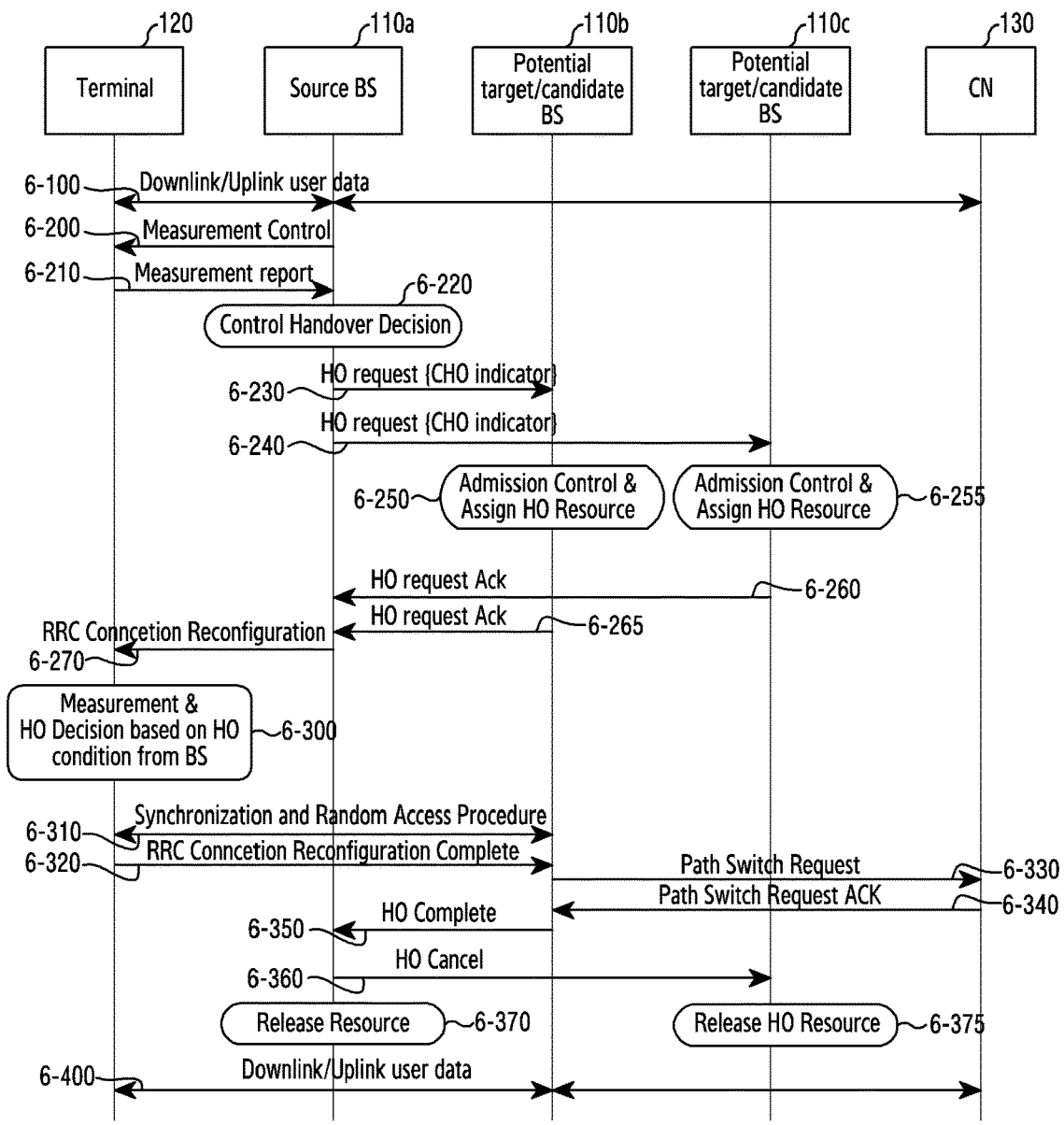
FIG. 6 illustrates a signal exchange for a Conditional Handover (hereinafter, CHO) in a wireless communication system according to various embodiments of the disclosure.

FIG. 6 illustrates a signal exchange for a CHO in a wireless communication system according to various embodiments of the disclosure.

Referring to FIG. 6, in step 6-100, the terminal 120 receives and transmits downlink and uplink user data with respect to the source BS 110*a* while accessing the source BS 110*a*. In this case, in step 6-200, a measurement control command for a handover is received from the source BS 110*a*. According to the measurement control command, the terminal 120 transmits information obtained by measuring cells of neighboring BSs to the source BS 110*a* in step 6-210. Upon receiving the measurement information from the terminal 120, in step 6-220, the source BS 110*a* decides whether to execute the CHO.

When the source BS 110*a* decides to execute the CHO, the source BS 110*a* determines potential target/candidate BSs among the neighboring BSs of the terminal 120, and transmits a handover request message to the selected potential target/candidate BSs 110*b* and 110*c* in steps 6-230 and 6-240. The handover request message includes information indicating that the handover request is for the CHO. Upon receiving the handover request message, the potential target/candidate BSs 110*b* and 110*c* determine whether to admit the handover request as in steps 6-250 and 6-255, based on current service information and information on the terminal 120, included in the handover request message. When the handover request is admitted, the potential target/candidate BSs 110*b* and 110*c* internally allocate an internal resource or the like for the handover of the terminal 120. In addition, the potential target/candidate BSs 110*b* and 110*c* transmit a handover request Acknowledgement (ACK) message to the source BS 110*a* as in steps 6-260 and 6-265. The handover request ACK message includes information on a radio connection reconfiguration message of the potential target/candidate BSs 110*b* and 110*c*, including radio configuration information allocated for a handover of the terminal 120 by the potential target/candidate BSs 110*b* and 110*c*.

Upon receiving the handover request ACK message from the potential target/candidate BSs 110*b* and 110*c*, in step 6-270, the source BS 110*a* transmits to the terminal 120 an RRC connection reconfiguration message including a radio connection configuration message, obtained from the potential target/candidate BSs 110*b* and 110*c*. Upon receiving the RRC connection reconfiguration message from the source BS 110*a*, the terminal 120 monitors cells of the potential target/candidate BSs 110*b* and 110*c* while maintaining a connected state with respect to the source BS 110*a*. In step 6-300, the terminal 120 determines that the target BS 110*b* satisfies a CHO condition included in the RRC connection reconfiguration message, and decides to execute a handover to the target BS 110*b*.

In step 6-310, the terminal 120 starts a procedure of handover to the target/candidate BS 110*b*. In this case, while continuously receiving or transmitting user data and a control message from the source BS 110*a* according to capability of the terminal, a synchronization and a random access for handover to the target BS 110*b* are performed in step 6-310. If the terminal 120 succeeds in the random access with respect to the target BS 110*b* in step 6-310, the terminal 120 transmits an RRC connection reconfiguration complete message to the target BS 110*b* in step 6-320. In step 6-330, upon receiving the RRC connection reconfiguration complete message from the terminal 120, the target BS transmits a path switch request message to the CN 130. In step 6-340, the target BS 110*b* receives a path switch request ACK message from the CN 130, and changes a path for transferring user data from the CN 130 to the target BS 110*b*.

In addition, in step 6-350, the target BS 110*b* transmits a handover complete message to the source BS 110*a* to notify that the terminal 120 has successfully completed the handover to the target BS 110*b*. In step 6-360, upon receiving the handover complete message from the target BS, the source BS 110*a* transmits a handover cancel message to the potential target/candidate BS 110*c* which is another potential target/candidate BS other than the target BS 110*b*. Thereafter, upon receiving the handover cancel message, the potential target/candidate BS 110*c* releases a radio resource allocated for the terminal 120 and context information of the terminal 120. After the terminal 120 transmits the RRC connection reconfiguration complete message to the target BS in step 6-320, the terminal 120 receives and transmits downlink and uplink user data through the target BS 110*b* in step 6-400.

Hereinafter, a normal handover and a CHO will be described with reference to FIG. 7 and FIG. 8 when a BS is a separate-type BS which is divided into a CU-CP, a CU-UP, and a DU.

Figure 7:
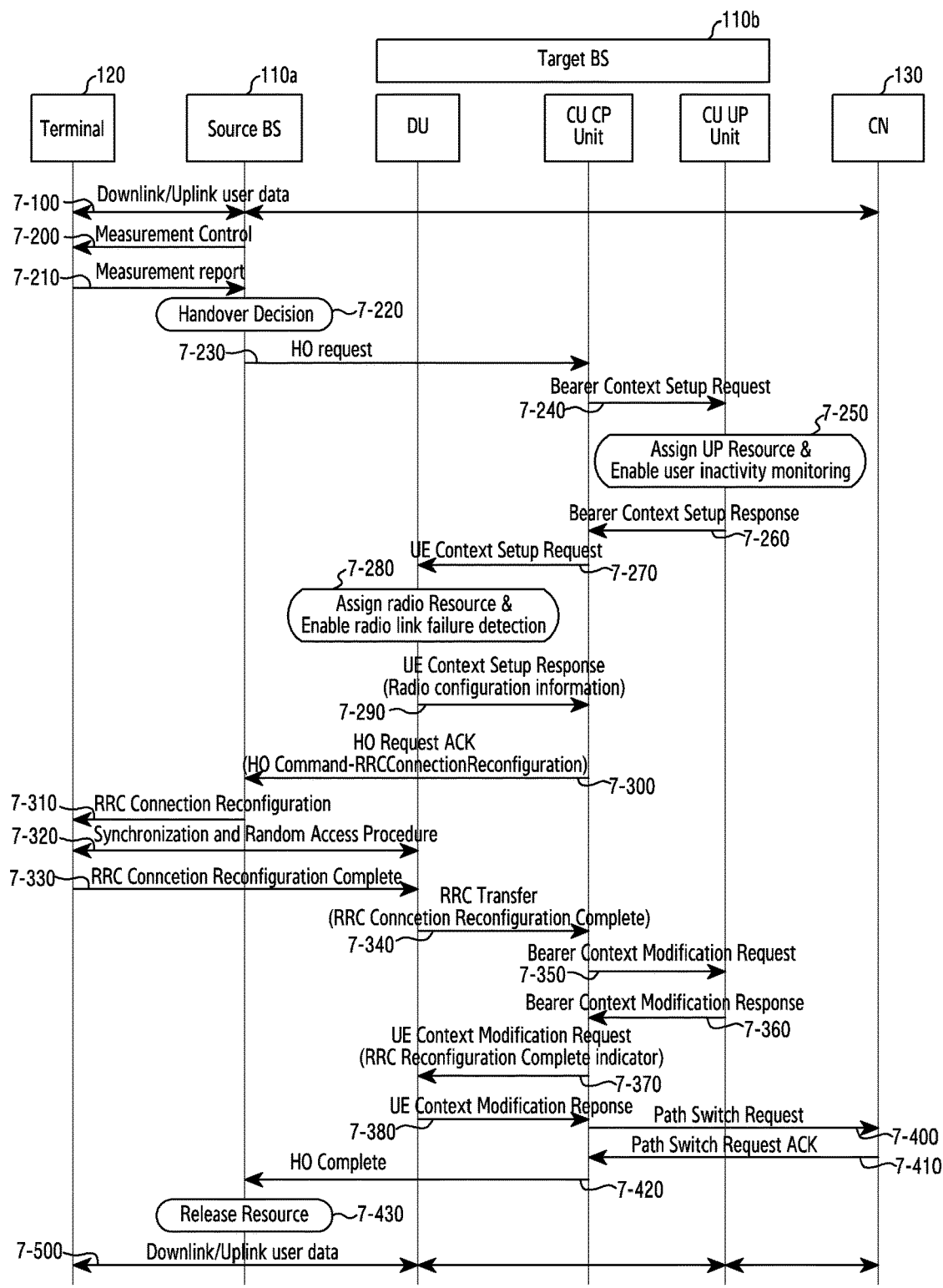
FIG. 7 illustrates a signal exchange for a normal handover in an environment in which a potential target/candidate BS is constructed to be divided into a Control Unit (CU)-Control Plane (CP), a CU-User Plane (UP), and a Distributed Unit (DU) in a wireless communication system according to various embodiments of the disclosure.

FIG. 7 illustrates a signal exchange for a normal handover in an environment in which a potential target/candidate BS is constructed to be divided into a CU-CP, a CU-UP, and a DU in a wireless communication system according to various embodiments of the disclosure.

FIG. 7 illustrates a normal handover procedure, not a CHO. After being coupled to the source BS 110*a*, in a state in which downlink and uplink user data is exchanged with respect to the source BS 110*a* in step 7-100, when a measurement command for handover is received from the source BS 110*a* in step 7-200, the terminal 120 transmits information obtained by measuring cells of neighboring cells to the source BS 110*a* in step 7-210 according to the measurement command. Upon receiving the measurement information from the terminal 120, in step 7-220, the source BS 110*a* decides whether to perform the handover. When the source BS 110*a* decides to perform the handover, in step 7-230, the source BS 110*a* transmits a handover request message to the CU-CP of the target BS 110*b*. In step 7-240, upon receiving the handover request message, the CU-CP transmits a bearer context setup request message to the CU-UP of the target BS 110*b*, based on current service information and information on the terminal 120, included in the handover request message. In step 7-250, the CU-UP allocates an internal user plane resource for supporting a service of the terminal 120, and enables and operates a function of monitoring inactivity of the terminal 120. The inactivity monitoring of the terminal 120 is used to release the terminal 120 when the terminal 120 does not transmit and receive user data for a specific time. When a resource can be allocated, the CU-UP configures the resource, and then, in step 7-260, transmits to the CU-CP a bearer context setup response message by including information related to resource allocation in the CU-UP. In step 7-270, the CU-CP transmits a UE context setup request message to the DU of the target BS 110*b* which manages a cell to which the terminal 120 executes a handover. Based on information on the terminal 120 and service related information of the terminal 120, which is included in the UE context setup request message, the DU allocates a radio resource to be used by the DU of the target BS 110*b* to serve the terminal 120, and enables and operates a Radio Link Failure (RLF) detection function of the terminal 120. The RLF detection operation of the terminal 120 is performed to support an additional operation of releasing the terminal 120 according to an RLF, in which an RLF of the terminal 120 is determined by monitoring a radio connection state when failing in detection of a random access of the terminal 120 for a specific time, or after the terminal 120 executes a handover, and the occurrence of the RLF is reported to the CU-CP and the CU-UP so that the terminal 120 is released according to the RLF. When the DU successfully allocates and configures a radio resource for serving the terminal 120, in step 7-290, the DU transmits a UE context setup response message to the CU-CP. The UE context setup response message includes radio configuration information allocated in the DU. After receiving the UE context setup response message from the DU, in step 7-300, the CU-CP transmits a handover request ACK message to the source BS 110*a*. The handover request ACK message includes RRC connection reconfiguration information including radio connection configuration information which is configured in the DU, the CU-UP, and the CU-CP of the target BS 110*b* to serve the terminal 120.

Upon receiving the handover request ACK message from the target BS 110*b*, in step 7-310, the source BS 110*a* transmits an RRC connection reconfiguration message including the RRC connection reconfiguration information of the target BS 110*b* to the terminal 120.

Upon receiving the RRC connection reconfiguration message from the source BS 110*a*, the terminal 120 performs a handover procedure with respect to the target BS 110*b*. In step 7-320, the terminal is synchronized to the target BS 110*b*, and then performs a handover access procedure with respect to the target BS 110*b*. After succeeding in the random access, in step 7-330, the terminal 120 transmits an RRC connection reconfiguration complete message to the target BS 110*b*. In step 7-340, upon receiving the RRC connection reconfiguration complement message, the DU of the target BS 110*b* transfers the RRC connection reconfiguration complete message to the CU-CP of the target BS 110*b* by using an RRC transfer message of an F1 interface. After receiving the RRC connection reconfiguration complete message from the terminal 120, the CU-CP identifies that the terminal 120 has completed the handover, and in step 7-350, transmits a bearer context modification request message to the CU-UP, thereby transferring DU's General Packet Radio Service (GPRS) Tunneling Protocol (GTP)-User plane (U) tunnel information for exchanging user data with the DU. In step 7-360, the CU-UP responds to the CU-CP by transmitting a bearer context modification response message. In step 7-370, the CU-CP transmits a UE context modification request message including RRC reconfiguration complete indication information to the DU, and thus notifies that the terminal 120 operates after a handover by using a configuration of a radio resource previously allocated by the DU of the target BS 110*b*. In step 7-380, the DU responds to the CU-CP by transmitting a UE context modification response message. Thereafter, the CU-CP transmits a path switch request message to the CN 130 in step 7-400, and receives a path switch request ACK message from the CN 130 in step 7-410. Accordingly, the CU-CP modifies a data transfer path for transferring user data from the CN 130 to the CU-UP of the target BS 110*b*. At the same time, in step 7-420, the CU-CP transmits a handover complete message to the source BS 110*a* to notify that the terminal 120 has successfully completed the handover to the target BS 110*b*. Upon receiving the handover complete message from the target BS 110*b*, the source BS 110*a* deletes a radio resource allocated for the terminal 120 and context information of the terminal 120. The terminal 120 transfers an RRC connection reconfiguration complete message to the target BS 110*b* in step 7-330, and transmits/receives downlink and uplink user data via the target BS 110*b* in step 7-500.

Figure 8:
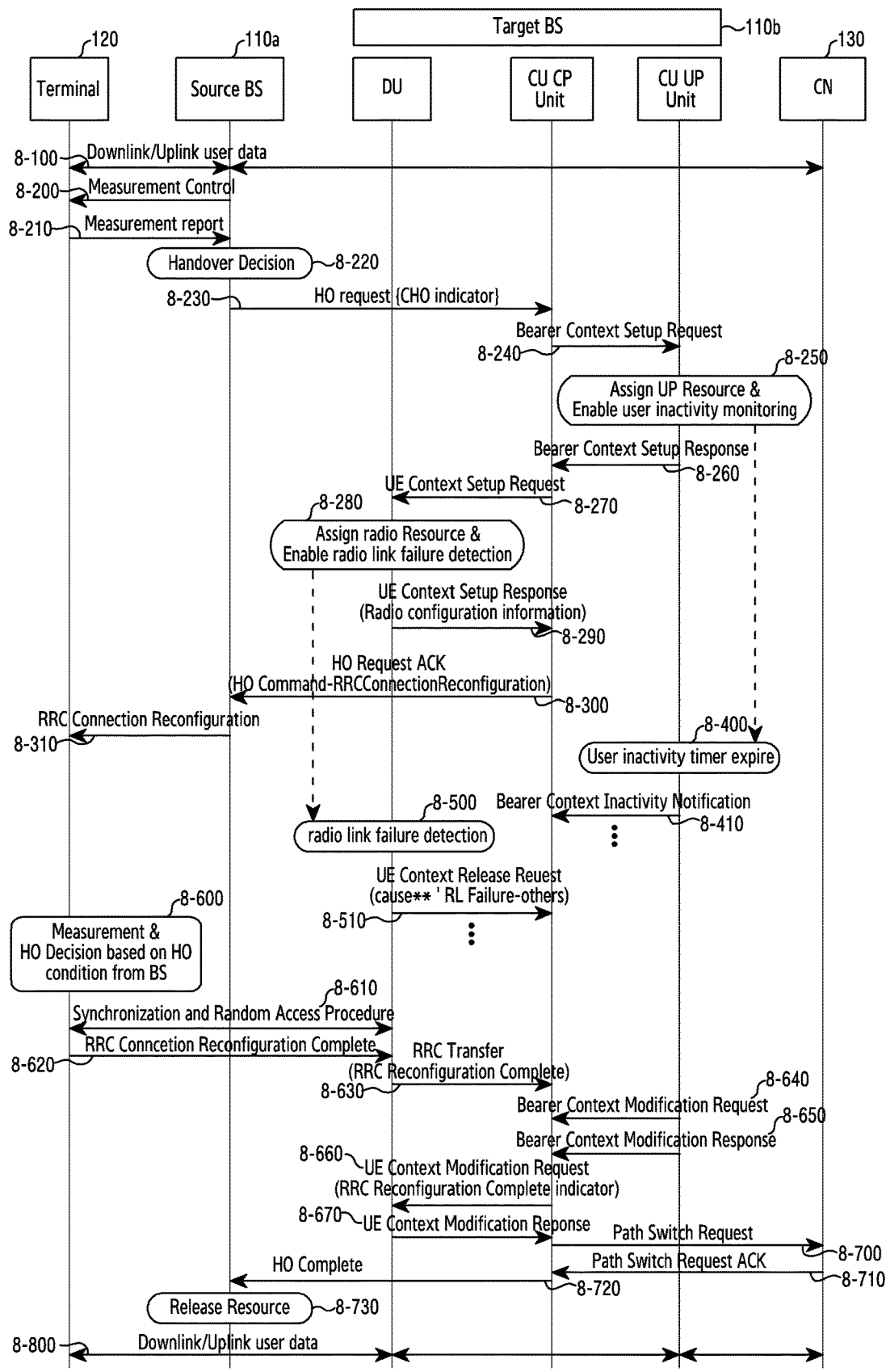
FIG. 8 illustrates a signal exchange for a CHO in an environment in which a potential target/candidate BS is constructed to be divided into a CU-CP, a CU-UP, and a DU in a wireless communication system according to various embodiments of the disclosure.

FIG. 8 illustrates a signal exchange for a CHO in an environment in which a potential target/candidate BS is constructed to be divided into a CU-CP, a CU-UP, and a DU in a wireless communication system according to various embodiments of the disclosure. Unlike in the embodiment of FIG. 6, although a procedure in which a different potential target/candidate BS is included is not exemplified in FIG. 8, there may be more different potential target/candidate BSs in addition to the target BS for the CHO.

Referring to FIG. 8, after being coupled to the source BS, in a state in which downlink and uplink user data is exchanged with respect to the source BS in step 8-100, when a measurement command for handover is received from the source BS in step 8-200, the terminal 120 transmits information obtained by measuring cells of neighboring cells to the source BS in step 8-210 according to the measurement command. Upon receiving the measurement information from the terminal 120, the source BS decides whether to execute the CHO in step 8-220. When the source BS decides to execute the CHO, in step 8-230, the source BS transmits a handover request message including a CHO indication to the CU-CP of the potential target/candidate BS.

In step 8-240, upon receiving the handover request message, the CU-CP transmits a bearer context setup request message to the CU-UP of the potential target/candidate BS, based on current service information and information on the terminal 120, included in the handover request message. In step 8-250, the CU-UP allocates an internal user plane resource for supporting a service of the terminal 120, and enables and operates a function of monitoring inactivity of the terminal 120. The inactivity monitoring of the terminal 120 is used to release the terminal 120 when the terminal 120 does not transmit and receive user data for a specific time. When a resource can be allocated, the CU-UP configures the resource, and then, in step 8-260, transmits to the CU-CP a bearer context setup response message by including information related to resource allocation in the CU-UP. In step 8-270, the CU-CP transmits a UE context setup request message to the DU of the potential target/candidate BS which manages a cell to which the terminal 120 executes a handover. Based on information on the terminal 120 and service related information of the terminal 120, which is included in the UE context setup request message, in step 8-280, the DU allocates a radio resource to be used by the DU to serve the terminal 120, and enables and operates an RLF detection function of the terminal 120. The RLF detection operation of the terminal 120 is performed to support an additional operation of releasing the terminal 120 according to an RLF, in which an RLF of the terminal 120 is determined by monitoring a radio connection state when the BS fails in detection of a random access of the terminal 120 for a specific time, or after the terminal 120 executes a handover, and the occurrence of the RLF is reported to the CU-CP and the CU-UP so that the terminal 120 is released according to the RLF. When the DU successfully allocates and configures a radio resource for serving the terminal 120, in step 8-290, the DU transmits a UE context setup response message to the CU-CP. This message includes radio configuration information allocated in the DU of the potential target/candidate BS. After receiving the UE context setup response message from the DU, in step 8-300, the CU-CP transmits a handover request ACK message to the source BS. This message includes RRC connection reconfiguration information including radio connection configuration information which is configured in the DU, the CU-UP, and the CU-CP of the potential target/candidate BS to serve the terminal 120. Upon receiving the handover request ACK message from the potential target/candidate BSs, in step 8-310, the source BS transmits an RRC connection reconfiguration message including the RRC connection reconfiguration information of the potential target/candidate BSs to the terminal 120.

If the CU-UP starts an internal timer for user inactivity monitoring in step 8-250 and if there is no occurrence of user data for a specific time in step 8-400, the CU-UP transmits a bearer context inactivity notification message to the CU-CP in step 8-410. This message is transmitted to the CU-UP whenever a user inactivity monitoring event continuously occurs in the CU-UP. When the CHO is used, the terminal 120 does not know when to execute a handover to the potential target/candidate BS. Therefore, the CU-CP of the potential target/candidate BS may ignore the bearer context inactivity notification message transmitted by the CU-UP, or use it only for the purpose of inner usage, thereby causing an unnecessary message.

In addition, if the DU of the potential target/candidate BS operates an RLF detection function of the terminal 120 in step 8-280 and thus an event determined an RLF of the terminal 120 occurs in the DU in step 8-500, a UE context release request message is transmitted to the CU-CP in step 8-510. When the CHO is used, the terminal 120 does not know when to execute a handover to the potential target/candidate BS. Therefore, the CU-CP of the potential target/candidate BS may ignore the UE context release request message transmitted by the DU, or use it only for the purpose of inner usage, thereby causing an unnecessary message.

Upon receiving the RRC connection reconfiguration message from the source BS in step 8-310, the terminal 120 monitors cells of the potential target/candidate BSs while maintaining a connected state with respect to the source BS. In step 8-600, upon discovering a cell of a potential target/candidate BS which satisfies a CHO condition included in the RRC connection reconfiguration message, the terminal 120 decides a handover to the potential target/candidate BS. In step 8-610, the terminal 120 starts a handover procedure by using the BS determined in step 8-600 as the target BS. In this case, while continuously receiving or transmitting user data and a control message from the source BS according to capability of the terminal 120, the terminal 120 performs a synchronization and a random access for handover to the target BS in step 8-610. If the terminal 120 succeeds in the random access with respect to the target BS in step 8-610, the terminal 120 transmits an RRC connection reconfiguration complete message to the target BS in step 8-620. In step 8-630, upon receiving this message, the DU of the target BS transfers the message to the CU-CP of the target BS by using an RRC transfer message of an F1 interface. After receiving the RRC connection reconfiguration complete message from the terminal 120, the CU-CP identifies that the terminal 120 has completed the handover, and in step 8-640, transmits a bearer context modification request message to the CU-UP, thereby transferring DU's GTP-U tunnel information for exchanging user data with the DU. In step 8-650, the CU-UP responds to the CU-CP by using a bearer context modification response message. In step 8-660, the CU-CP transmits a UE context modification request message including RRC reconfiguration complete indication information to the DU, and thus notifies that the terminal 120 operates after a handover by using a configuration of a radio resource previously allocated by the DU of the target BS. In step 8-670, the DU responds to the CU-CP by transmitting a UE context modification response message. Thereafter, the CU-CP transmits a path switch request message to the core network in step 8-700, and receives a path switch request ACK message from the core network in step 8-710, thereby modifying a data transfer path for transferring user data from the core network to the CU-UP of the target BS. At the same time, in step 8-720, the CU-CP transfers a handover complete message to the source BS to notify that the terminal 120 has successfully completed the handover to the target BS. Upon receiving the handover complete message from the target BS, the source BS deletes a radio resource allocated for the terminal 120 and context information of the terminal 120. In the presence of different potential target/candidate BSs configured for the terminal 120, a handover cancel message is transmitted to the different potential target/candidate BSs to delete the resource allocated to support the terminal 120 and the context information of the terminal 120. After transmitting an RRC connection reconfiguration complete message to the target BS in step 8-620, the terminal 120 transmits/receives downlink and uplink user data via the target BS in step 8-800.

The disclosure is to prevent an unnecessary signaling message from being generated in the CU-UP and DU in the potential target/candidate BS, when the CHO is executed as shown in FIG. 8. Specifically, for efficient resource management, for example, management for decreasing a priority of internal resource processing or decreasing a priority of buffer allocation according to the CHO in the CU-UP and DU of the potential target/candidate BS, the disclosure proposes a method of instructing not to unnecessarily perform a user inactivity monitoring operation and an RLF detection operation while transferring CHO information to the CU-UP and DU of the potential target/candidate BS, when the CHO is recognized in the CU-CP of the potential target/candidate BS.

Figure 9:
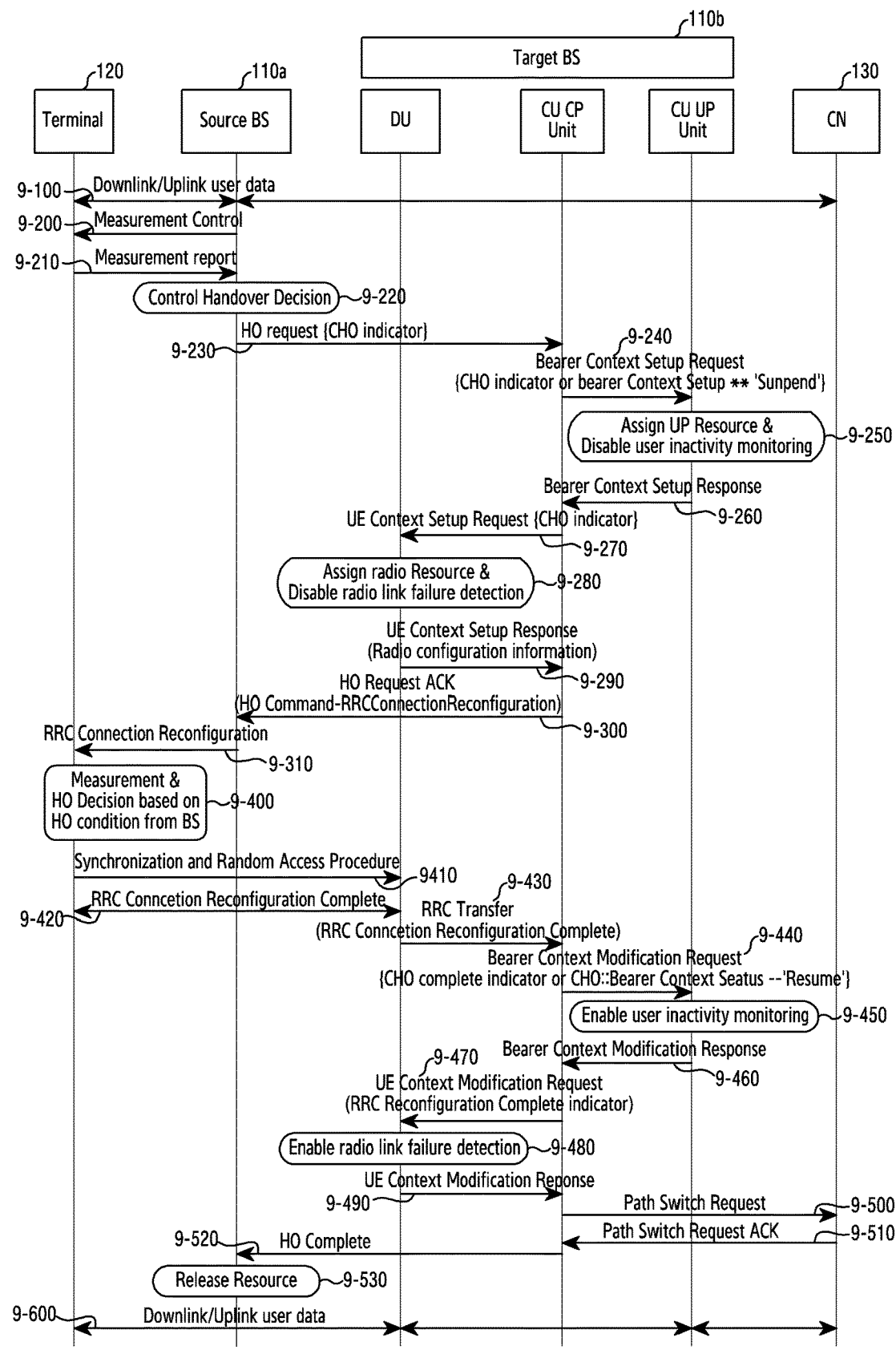
FIG. 9 illustrates a signal exchange for preventing a CU-UP and DU of a potential target/candidate BS from unnecessarily performing user inactivity monitoring and radio link failure detection operation and for preventing a control message from being unnecessarily generated in a wireless communication system according to various embodiments of the disclosure.

FIG. 9 illustrates a signal exchange for preventing a CU-UP and DU of a potential target/candidate BS from unnecessarily performing user inactivity monitoring and radio link failure detection operation and for preventing a control message from being unnecessarily generated in a wireless communication system according to various embodiments of the disclosure. Unlike in the embodiment of FIG. 6, although a procedure in which a different potential target/candidate BS is included is not exemplified in FIG. 9, there may be more different potential target/candidate BSs in addition to the target BS for a CHO.

Referring to FIG. 9, after being coupled to the source BS, in a state in which downlink and uplink user data is exchanged with respect to the source BS in step 9-100, when a measurement command for handover is received from the source BS in step 9-200, the terminal 120 transmits information obtained by measuring cells of neighboring cells to the source BS in step 9-210 according to the measurement command. Upon receiving the measurement information from the terminal 120, the source BS decides whether to execute the CHO in step 9-220. When the source BS decides to execute the CHO, in step 9-230, the source BS transmits a handover request message including a CHO indication to the CU-CP of the potential target/candidate BS. In step 9-240, upon receiving the handover request message, the CU-CP transmits a bearer context setup request message to the CU-UP of the potential target/candidate BS, based on current service information and information on the terminal 120, included in the handover request message. In step 9-250, the CU-UP allocates an internal user plane resource for supporting a service of the terminal 120. In this case, if CHO indication information is included in the bearer context setup request message transmitted in step 9-240 or if a bearer context status IE value included in the bearer context setup request message is set to 'suspend' or if DU's GTP-U tunnel information to be used by the CU-UP to transmit a downlink packet to the DU of the potential target/candidate BS is not included in the bearer context setup request message, in step 9-250, the CU-UP does not enable nor operate the inactivity monitoring function of the terminal 120. Accordingly, the CU-UP does not produce an unnecessary user inactivity monitoring operation and an unnecessary signaling message while the CHO is executed, and resource management may be efficiently performed inside the CU-UP. When a resource can be allocated, the CU-UP configures the resource, and then, in step 9-260 transmits to the CU-CP a bearer context setup response message by including information related to resource allocation in the CU-UP. In step 9-270, the CU-CP transmits a UE context setup request message to the DU of the potential target/candidate BS which manages a cell to which the terminal 120 executes a handover. Based on information on the terminal 120 and service related information of the terminal 120, which is included in the UE context setup request message, in step 9-280, the DU allocates a radio resource to be used by the DU to serve the terminal 120. In this case, if CHO indication information is included in the UE context setup request message transmitted in step 9-270, the DU does not enable nor operate the RLF detection function of the terminal 120 in step 9-280. Accordingly, the DU of the target BS does not produce an unnecessary RLF detection operation and an unnecessary signaling message while the CHO is executed, and resource management may be efficiently performed inside the DU. When the DU successfully allocates and configures a radio resource for serving the terminal 120, in step 9-290, the DU transmits a UE context setup response message to the CU-CP. This message includes radio configuration information allocated in the DU of the potential target/candidate BS. After receiving the UE context setup response message from the DU, in step 9-300, the CU-CP transmits a handover request ACK message to the source BS. This message includes RRC connection reconfiguration information including radio connection configuration information which is configured in the DU, the CU-UP, and the CU-CP to serve the terminal 120. Upon receiving the handover request ACK message from the potential target/candidate BSs, in step 9-310, the source BS transmits an RRC connection reconfiguration message including the RRC connection reconfiguration information of the potential target/candidate BSs to the terminal 120. Upon receiving the RRC connection reconfiguration message from the source BS in step 9-310, the terminal 120 monitors cells of the potential target/candidate BSs while maintaining a connected state with respect to the source BS. In step 9-400, upon discovering a cell of a potential target/candidate BS which satisfies a CHO condition included in the RRC connection reconfiguration message, a handover to the potential target/candidate BS is determined. In step 9-410, the terminal 120 starts a handover procedure by using the BS determined in step 9-400 as the target BS. In this case, while continuously receiving or transmitting user data and a control message from the source BS according to capability of the terminal 120, a synchronization and a random access for handover to the target BS are performed in step 9-410. If the terminal 120 succeeds in the random access with respect to the target BS in step 9-410, the terminal 120 transmits an RRC connection reconfiguration complete message to the target BS in step 9-420. In step 9-430, upon receiving this message, the DU of the target BS transfers the message to the CU-CP of the target BS by using an RRC transfer message of an F1 interface. After receiving the RRC connection reconfiguration complete message from the terminal 120, the CU-CP identifies that the terminal 120 has completed the handover, and in step 9-440, transmits a bearer context modification request message to the CU-UP of the target BS. In this case, when CHO complete indication information is included in the bearer context modification request message transmitted in step 9-440 or a bearer context status IE value included in the bearer context modification request message is set to 'resume' or DU's GTP-U tunnel information to be used by the CU-UP to transmit a downlink packet is included in the bearer context modification request message, in step 9-450, the CU-UP enables and operates a function of monitoring inactivity of the terminal 120 to trigger release of a radio connection of the terminal 120 during user data of the terminal 120 is not present for a specific time and to process resource management inside the CU-UP in association with the terminal 120 being served. In step 9-460, the CU-UP responds to the CU-CP by using a bearer context modification response message. In step 9-470, the CU-CP transmits a UE context modification request message including RRC reconfiguration complete indication information to the DU, and thus notifies that the terminal 120 operates after a handover by using a configuration of a radio resource previously allocated by the DU of the target BS. In addition, when RRC reconfiguration complete indication information is included in the UE context modification request message, in step 9-480, the DU enables and operates an RLF detection function of the terminal 120 to trigger the target BS to perform an RLF procedure of the terminal 120 upon determining an RLF of the terminal 120 and to process resource management inside the DU in association with the terminal 120 being served. In step 9-490, the DU responds to the CU-CP by transmitting a UE context modification response message. Thereafter, the CU-CP transmits a path switch request message to the core network in step 9-500, and receives a path switch request ACK message from the core network in step 9-510, thereby modifying a data transfer path for transferring user data from the core network to the CU-UP of the target BS. At the same time, in step 9-520, the CU-CP transfers a handover complete message to the source BS to notify that the terminal 120 has successfully completed the handover to the target BS. Upon receiving the handover complete message from the target BS, the source BS deletes a radio resource allocated for the terminal 120 and context information of the terminal 120. In the presence of different potential target/candidate BSs configured for the terminal 120, a handover cancel message is transmitted to the different potential target/candidate BSs to delete the resource allocated to support the terminal 120 and the context information of the terminal 120. After transmitting an RRC connection reconfiguration complete message to the target BS in step 9-420, the terminal 120 transmits/receives downlink and uplink user data via the target BS in step 9-600.

The disclosure is for a case where a CHO is in progress, and bearer or PDU session information is modified by a terminal or a core network before the terminal completes a handover to a target BS or a case where a decision is internally made by the source BS or a potential target/candidate BS, for example, when there is a need to change a resource allocated to the CHO due to insufficient resources. Accordingly, the disclosure proposes a method of modifying resources of potential target/candidate BSs, which are allocated for a CHO resource, and a method in which radio configuration setup information to be used between a terminal and a target BS after a handover of the terminal is identified by the target BS and then a radio configuration of the target BS is allowed to be used in accordance with a radio configuration used by the terminal.

Figure 10A:
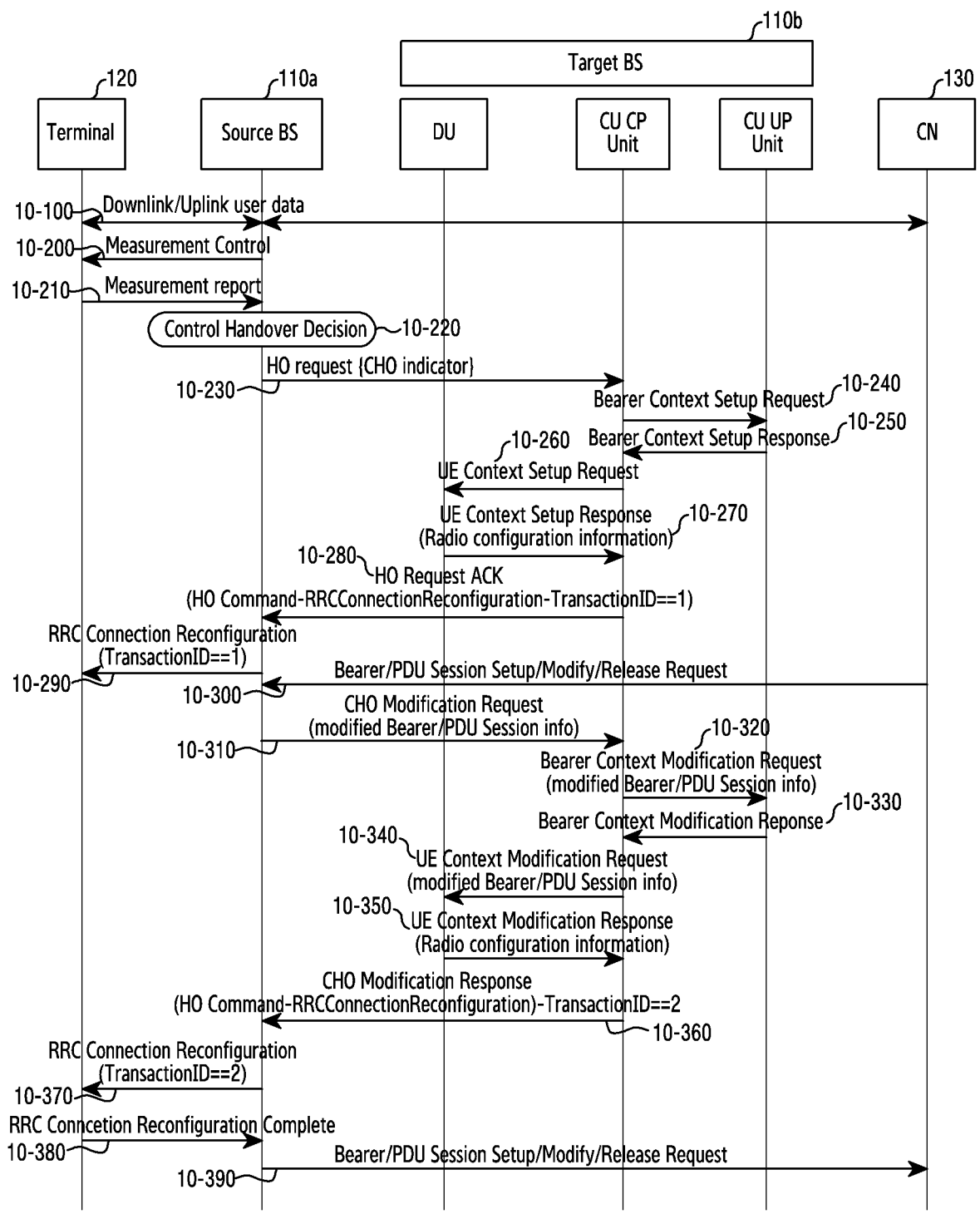
FIG. 10A illustrates a signal exchange for supporting a CHO modification in a wireless communication system according to various embodiments of the disclosure.
Figure 10B:
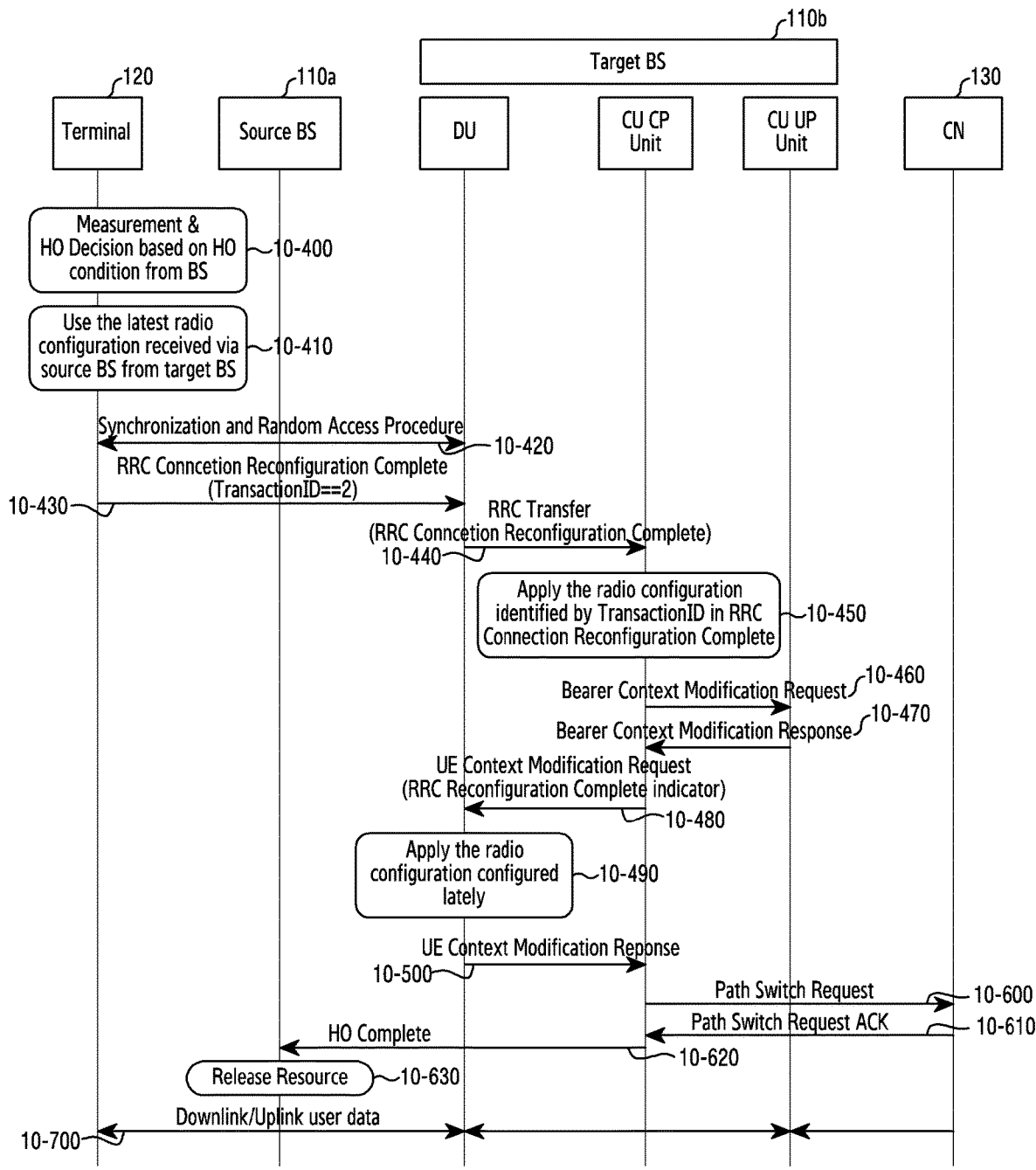
FIG. 10B illustrates a signal exchange for supporting a CHO modification in a wireless communication system according to various embodiments of the disclosure.
Figure 11A:
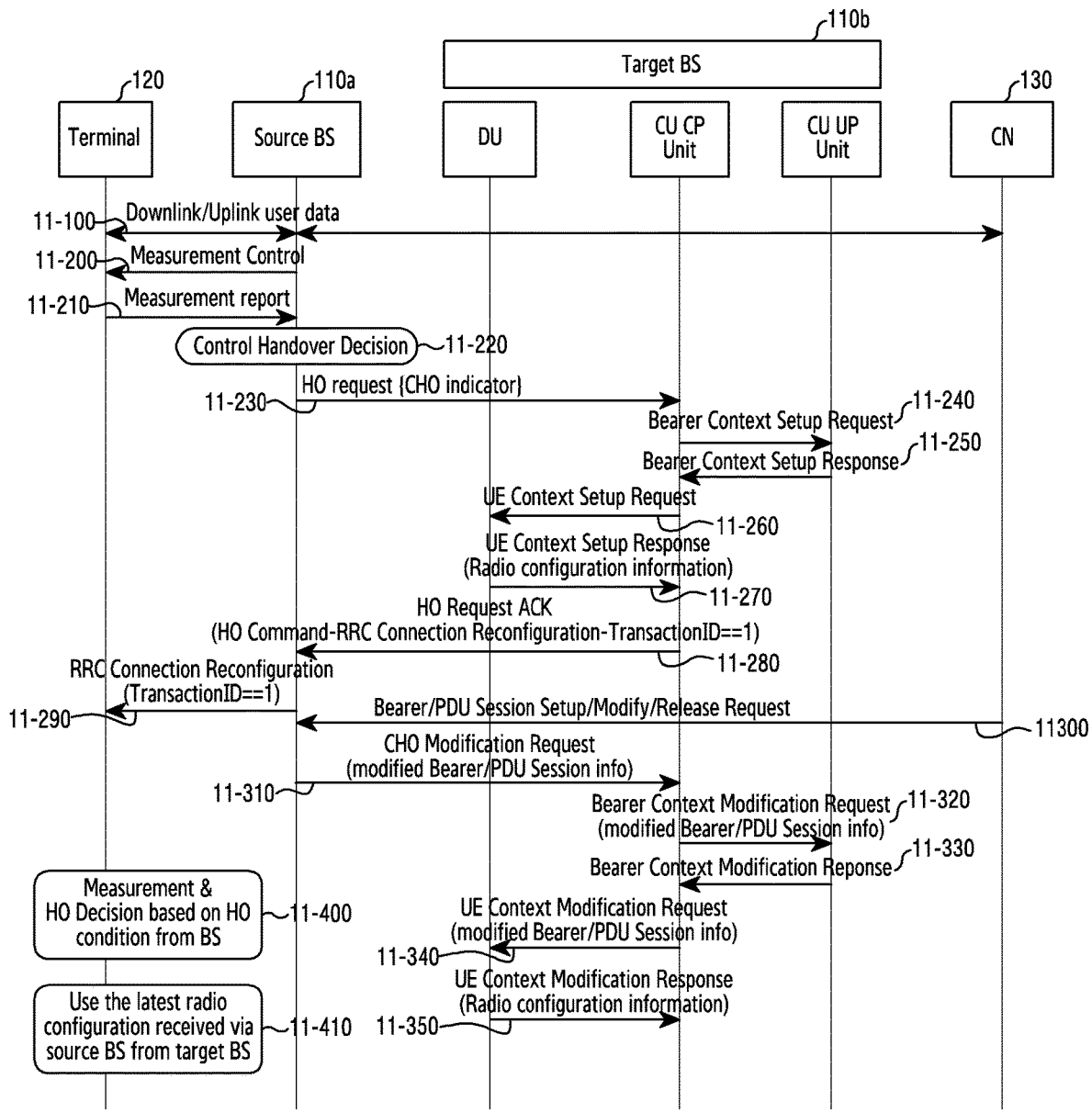
FIG. 11A illustrates another signal exchange for supporting a CHO modification in a wireless communication system according to various embodiments of the disclosure.
Figure 11B:
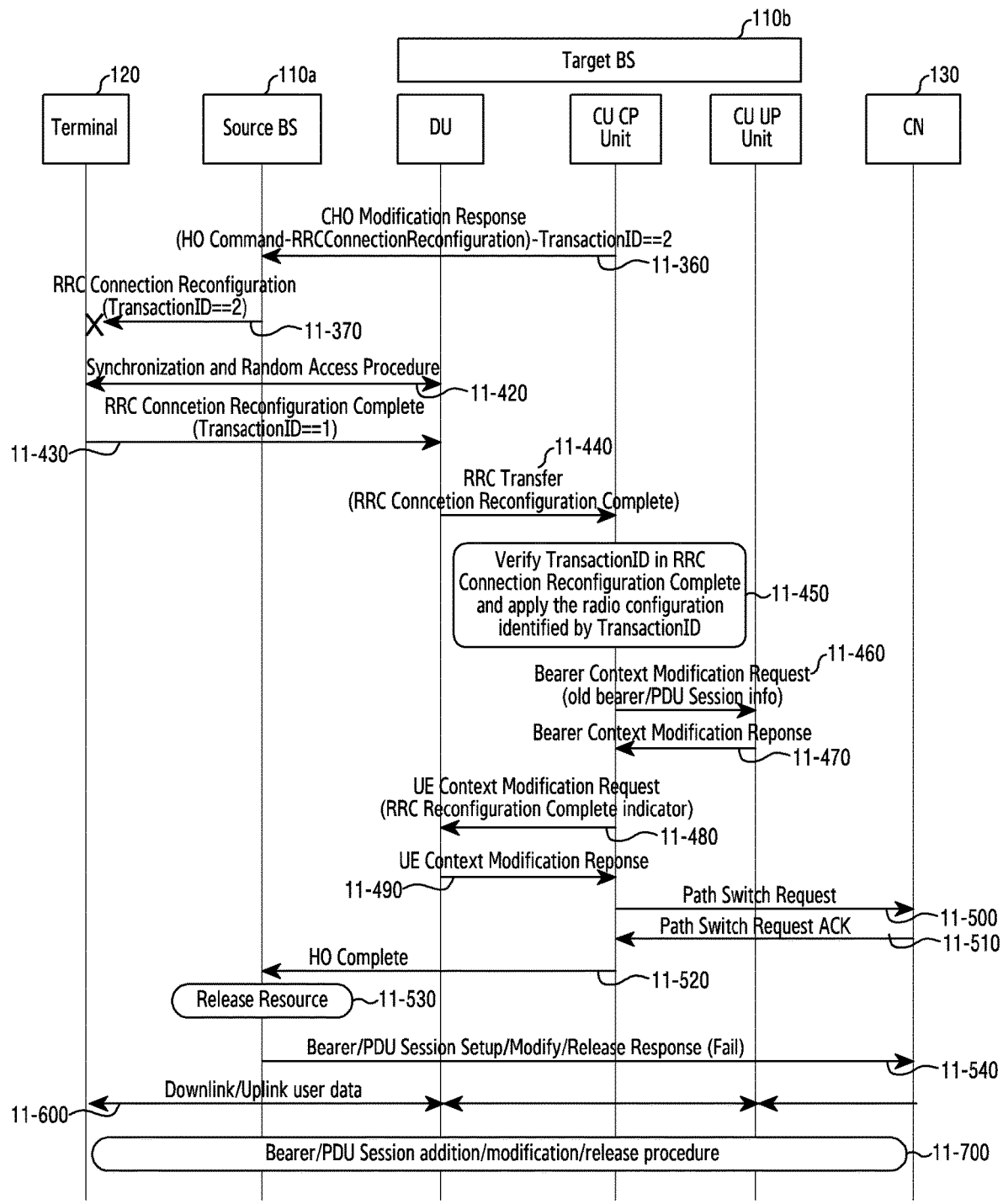
FIG. 11B illustrates another signal exchange for supporting a CHO modification in a wireless communication system according to various embodiments of the disclosure.

FIGS. 10A and 10B and FIGS. 11A and 11B are embodiments for supporting a case where bearer or PDU session information is modified by a terminal or a core network. Even if the bearer or PDU session information is not modified, when a CHO configuration is modified according to a decision of a source BS or a target/candidate BS, the remaining procedure except for signaling between the source BS and the core network may also be directly used. FIG. 10A and FIG. 10B are embodiments for a case where a CHO modification setup is complete before the terminal executes a handover to the target BS after the terminal is set to the CHO. FIG. 11A and FIG. 11B are embodiments for a case where a CHO modification setup is in progress in the meantime before the terminal completes the handover to the target BS after the terminal is set to the CHO. Unlike in the embodiment of FIG. 6, although a procedure in which a different potential target/candidate BS is included is not exemplified in FIGS. 10A and 10B and FIGS. 11A and 11B, there may be more different potential target/candidate BSs in addition to the target BS for the CHO. The different potential target/candidate BS may perform a procedure for modifying a CHO configuration with respect to a source BS, similarly to the target BS included in FIGS. 10A and 10B and FIGS. 11A and 11B.

FIG. 10A and FIG. 10B illustrate a signal exchange for supporting a CHO modification in a wireless communication system according to various embodiments of the disclosure. Specifically, FIG. 10A and FIG. 10B illustrate an embodiment for a case where a CHO modification setup is complete before the terminal 120 executes a handover to a target BS.

Referring to FIG. 10A and FIG. 10B, after being coupled to the source BS 110a, in a state in which downlink and uplink user data is exchanged with respect to the source BS 110a in step 10-100, when a measurement command for handover is received from the source BS 110a in step 10-200, the terminal 120 transmits information obtained by measuring cells of neighboring cells to the source BS 110a in step 10-210 according to the measurement command. Upon receiving the measurement information from the terminal 120, in step 10-220, the source BS 110a decides whether to execute a CHO. When the source BS 110a decides to execute the CHO, in step 10-230, the source BS 110a transmits a handover request message including a CHO indication to the CU-CP of the potential target/candidate BS. In step 10-240, upon receiving the handover request message, the CU-CP transmits a bearer context setup request message to the CU-UP of the potential target/candidate BS, based on current service information and information on the terminal 120, included in the handover request message. The CU-UP allocates an internal user plane resource for supporting a service of the terminal 120. When a resource can be allocated, the CU-UP configures the resource, and then, in step 10-250, transmits to the CU-CP a bearer context setup response message by including information related to resource allocation in the CU-UP. In step 10-260, the CU-CP transmits a UE context setup request message to the DU of the potential target/candidate BS which manages a cell to which the terminal 120 executes a handover. Based on information on the terminal 120 and service related information of the terminal, which is included in the UE context setup request message, the DU allocates a radio resource to be used by the DU to serve the terminal 120. When the DU successfully allocates and configures a radio resource for serving the terminal 120, in step 10-270, the DU transmits a UE context setup response message to the CU-CP. This message includes radio configuration information allocated in the DU of the potential target/candidate BS. After receiving the UE context setup response message from the DU, in step 10-280, the CU-CP transmits a handover request ACK message to the source BS 110a. This message includes RRC connection reconfiguration information including radio connection configuration information which is configured in the DU, CU-UP, and CU-CP of the potential target/candidate BS to serve the terminal 120, and sets and includes an RRC transaction Identifier (ID) value to be used as an index for this radio configuration. Upon receiving the handover request ACK message from the potential target/candidate BSs, in step 10-290, the source BS 110a transmits an RRC connection reconfiguration message including the RRC connection reconfiguration information of the potential target/candidate BSs to the terminal 120.

When bearer or PDU session information changes at the request of the terminal 120 or the CN 130, in step 10-300, the CN 130 requests the source BS 110*a* to change the bearer or PDU session information. Some operations of a procedure for a bearer or PDU session modification request in the terminal 120 and the CN 130 before step 10-300 are irrelevant to the disclosure, and thus are not included in the embodiment. After receiving a message related to the bearer or PDU session modification from the CN 130, the source BS 110*a* transmits a CHO modification request message to the potential target/candidate BSs in step 10-310 while performing related resource modification of the source BS 110*a*. The CHO modification request message may include modified bearer or PDU session information. In addition thereto, when different information, e.g., an Aggregated Maximum Bit Rate (AMBR) or the like of the terminal 120, received from the CN 130 is modified or when the modification is requested by the need of the source BS 110*a*, for example, information on a change of a target cell or the like may be included. Upon receiving the CHO modification request message from the source BS 110*a*, the CU-CP of the potential target/candidate BS transmits a bearer context modification request message to the CU-UP in step 10-320, based on modification service information and information on the terminal 120, included in the CHO modification request message. The CU-UP modifies an internal user plane resource for supporting a service of the terminal 120. When resource allocation can be modified, the CU-UP configures the resource, and then, in step 10-330, transmits to the CU-CP a bearer context modification response message by including information related to resource allocation in the CU-UP. In step 10-340, the CU-CP transmits a UE context modification request message to a DU which manages a cell to which the terminal 120 executes a handover. Based on information on the terminal 120 and service related information of the terminal 120, which is included in the UE context modification request message, the DU modifies a radio resource used by the DU to serve the terminal 120. When the DU successfully modifies and configures a radio resource for serving the terminal 120, in step 10-350, the DU transmits a UE context modification response message to the CU-CP. This message includes radio configuration information allocated in the DU of the potential target/candidate BS. If a target cell included in the CHO modification request message transmitted in step 10-310 is a cell which manages a DU different from the DU which allocates a resource for a previous CHO, the CU-CP requests an old DU for a UE context release and performs a UE context setup procedure in a new DU in steps 10-260 and 10-270. When the resource for the CHO is successfully modified in the CU-UP and the DU, in step 10-360, the CU-CP transmits a CHO modification response message to the source BS 110*a*. This message includes RRC connection reconfiguration information including radio connection configuration information which is newly configured in the DU, CU-UP, and CU-CP of the potential target/candidate BS to serve the terminal 120, and sets and includes a new RRC transaction ID value to be used as an index for this radio configuration. Upon receiving the CHO modification response message from the potential target/candidate BSs, in step 10-370, the source BS 110*a* transmits an RRC connection reconfiguration message including the RRC connection reconfiguration information of the potential target/candidate BSs to the terminal 120. If the modified RRC connection reconfiguration information of the source BS 110*a* is included in the RRC connection reconfiguration message transmitted to the terminal 120, in step 10-380, the terminal 120 transmits an RRC connection reconfiguration complete message to the source BS 110*a*. If the source BS 110*a* which has received this message receives a bearer or PDU session modification request from the CN 130 in step 10-300, a bearer or PDU session modification complete message is transmitted to the CN 130 in step 10-390.

Upon receiving the RRC connection reconfiguration message from the source BS 110*a* in step 10-370, the terminal 120 monitors cells of the potential target/candidate BSs while maintaining a connected state with respect to the source BS 110*a*. In step 10-400, upon discovering a cell of a potential target/candidate BS which satisfies a CHO condition included in the RRC connection reconfiguration message, a handover to the potential target/candidate BS is determined. The terminal 120 starts a handover procedure by using the BS determined in step 10-400 as the target BS. In step 10-410, the handover is executed based on the radio resource configuration of the target BS 110*b*, which is last received by the terminal 120 via the source BS 110*a*. In addition, while continuously receiving or transmitting user data and a control message from the source BS 110*a* according to capability of the terminal 120, a synchronization and a random access for handover to the target BS 110*b* are performed in step 10-420. If the terminal 120 succeeds in the random access with respect to the target BS 110*b* in step 10-420, the terminal 120 transmits an RRC connection reconfiguration complete message to the target BS 110*b* in step 10-430. The RRC connection reconfiguration complete message is transmitted by including an RRC transaction ID value capable of indexing a radio configuration used by the terminal 120 so that the radio configuration used by the terminal 120 can be notified to the target BS 110*b*. In step 10-440, upon receiving this message, the DU of the target BS 110*b* transfers the message to the CU-CP of the target BS 110*b* by using an RRC transfer message of an F1 interface. After receiving the RRC connection reconfiguration complete message from the terminal 120, in step 10-450, the CU-CP identifies that the terminal 120 has completed the handover, and identifies a radio configuration used by the terminal 120 by using the RRC transaction ID value included in the RRC connection reconfiguration complete message. If the CU-CP, CU-UP, and DU of the target BS 110*b* are already set based on the radio configuration used by the terminal 120, in step 10-460, the bearer context modification request message is transmitted to the CU-UP of the target BS 110*b*. This message includes DU's GTP-U tunnel information to be used by the CU-UP to transmit a downlink packet to the DU. In step 10-470, the CU-UP responds to the CU-CP by using a bearer context modification response message. In step 10-480, the CU-CP transmits a UE context modification request message including RRC reconfiguration complete indication information to the DU, and thus notifies that the terminal 120 operates after a handover by using a configuration of a radio resource previously allocated by the DU of the target BS 110*b*. When the RRC reconfiguration complete indication information is included in the UE context modification request message, the DU starts a service for the terminal 120 by using radio configuration information which is set previously but is not applied. In addition, in step 10-500, the DU responds to the CU-CP by transmitting a UE context modification response message. Thereafter, the CU-CP transmits a path switch request message to the CN 130 in step 10-600, and receives a path switch request ACK message from the CN 130 in step 10-610, thereby modifying a data transfer path for transferring user data from the CN 130 to the CU-UP of the target BS 110*b*. At the same time, in step 10-620, the CU-CP transfers a handover complete message to the source BS 110*a* to notify that the terminal 120 has successfully completed the handover to the target BS 110*b*. Upon receiving the handover complete message from the target BS 110*b*, the source BS 110*a* deletes a radio resource allocated for the terminal 120 and context information of the terminal 120. In the presence of different potential target/candidate BSs configured for the terminal 120, a handover cancel message is transmitted to the different potential target/candidate BSs to delete the resource allocated to support the terminal 120 and the context information of the terminal 120. After transmitting an RRC connection reconfiguration complete message to the target BS 110*b* in step 10-430, the terminal 120 transmits/receives downlink and uplink user data via the target BS 110*b* in step 10-700.

FIG. 11A and FIG. 11B illustrate another signal exchange for supporting a CHO modification in a wireless communication system according to various embodiments of the disclosure. Specifically, FIG. 11A and FIG. 11B illustrate an embodiment for a case where a CHO modification setup is performed in the meantime before the terminal 120 executes a handover to a target BS.

Referring to FIG. 11A and FIG. 11B, after being coupled to the source BS 110*a*, in a state in which downlink and uplink user data is exchanged with respect to the source BS 110*a* in step 11-100, when a measurement command for handover is received from the source BS 110*a* in step 11-200, the terminal 120 transmits information obtained by measuring cells of neighboring cells to the source BS 110*a* in step 11-210 according to the measurement command. Upon receiving the measurement information from the terminal 120, in step 11-220, the source BS 110*a* decides whether to execute a CHO. When the source BS 110*a* decides to execute the CHO, in step 11-230, the source BS 110*a* transmits a handover request message including a CHO indication to the CU-CP of the potential target/candidate BS. In step 11-240, upon receiving the handover request message, the CU-CP transmits a bearer context setup request message to the CU-UP of the potential target/candidate BS, based on current service information and information on the terminal 120, included in the handover request message. The CU-UP allocates an internal user plane resource for supporting a service of the terminal 120. When a resource can be allocated, the CU-UP configures the resource, and then, in step 11-250 transmits to the CU-CP a bearer context setup response message by including information related to resource allocation in the CU-UP. In step 11-260, the CU-CP transmits a UE context setup request message to the DU of the potential target/candidate BS which manages a cell to which the terminal 120 executes a handover. Based on information on the terminal 120 and service related information of the terminal 120, which is included in the UE context setup request message, the DU of the potential target/candidate BS allocates a radio resource to be used by the DU to serve the terminal 120. When the DU successfully allocates and configures a radio resource for serving the terminal 120, in step 11-270, the DU transmits a UE context setup response message to the CU-CP. This message includes radio configuration information allocated in the DU. After receiving the UE context setup response message from the DU, in step 11-280, the CU-CP transmits a handover request ACK message to the source BS 110*a*. This message includes RRC connection reconfiguration information including radio connection configuration information which is configured in the DU, CU-UP, and CU-CP of the potential target/candidate BS to serve the terminal 120, and sets and includes an RRC transaction Identifier (ID) value to be used as an index for this radio configuration. Upon receiving the handover request ACK message from the potential target/candidate BSs, in step 11-290, the source BS 110*a* transmits an RRC connection reconfiguration message including the RRC connection reconfiguration information of the potential target/candidate BSs to the terminal 120.

After the terminal 120 receives the RRC connection reconfiguration message from the source BS 110*a* in step 11-290, the terminal 120 monitors cells of the potential target/candidate BSs while maintaining a connected state with respect to the source BS 110*a*. In step 11-400, upon discovering a cell of a potential target/candidate BS which satisfies a CHO condition included in the RRC connection reconfiguration message, a handover to the potential target/candidate BS is determined. The terminal 120 starts a handover procedure by using the BS determined in step 11-400 as the target BS 110*b*. In step 11-410, the handover is executed based on the radio resource configuration of the target BS 110*b*, which is last received by the terminal 120 via the source BS 110*a*. In addition, while continuously receiving or transmitting user data and a control message from the source BS 110*a* according to capability of the terminal 120, a synchronization and a random access for handover to the target BS 110*b* are performed in step 11-420.

While the terminal 120 decides a handover to the target BS 110*b* and performs a synchronization and a random access for handover to target BS 110*b* in step 11-420, when bearer or PDU session information changes at the request of the terminal 120 or the CN 130, in step 11-300, the CN 130 requests the source BS 110*a* to change the bearer or PDU session information. Some operations of a procedure for a bearer or PDU session modification request in the terminal 120 and the CN 130 before step 11-300 are irrelevant to the disclosure, and thus are not included in the embodiment. After receiving a message related to the bearer or PDU session modification from the CN 130, the source BS 110*a* transmits a CHO modification request message to the potential target/candidate BSs in step 11-310 while performing related resource modification of the source BS 110*a*. This message may include modified bearer or PDU session information. In addition thereto, when different information, e.g., an AMBR or the like of the terminal 120, received from the CN 130 is modified or when the modification is requested by the need of the source BS 110*a*, for example, information on a change of a target cell or the like may be included. Upon receiving the CHO modification request message from the source BS 110*a*, the CU-CP of the potential target/candidate BS transmits a bearer context modification request message to the CU-UP of the potential target/candidate BS in step 11-320, based on modification service information and information on the terminal 120, included in the CHO modification request message. The CU-UP modifies an internal user plane resource for supporting a service of the terminal 120. When resource allocation can be modified, the CU-UP configures the resource, and then, in step 11-330 transmits to the CU-CP a bearer context modification response message by including information related to resource allocation in the CU-UP of the potential target BS 110*b*. In step 11-340, the CU-CP transmits a UE context modification request message to a DU of the potential target/candidate BS which manages a cell to which the terminal 120 executes a handover. Based on information on the terminal 120 and service related information of the terminal 120, which is included in the UE context modification request message, the DU of the target BS 110*b* modifies a radio resource used by the DU to serve the terminal 120. When the DU of the potential target/candidate BS successfully modifies and configures a radio resource for serving the terminal 120, in step 11-350, the DU transmits a UE context modification response message to the CU-CP. This message includes radio configuration information allocated in the DU of the potential target/candidate BS. If a target cell included in the CHO modification request message transmitted in step 11-310 is a cell which manages a DU different from the DU which allocates a resource for a previous CHO, the CU-CP requests an old DU for a UE context release and performs a UE context setup procedure in a new DU in steps 11-260 and 11-270. When the resource for the CHO is successfully modified in the CU-UP and the DU, in step 11-360, the CU-CP transmits a CHO modification response message to the source BS 110*a*. This message includes RRC connection reconfiguration information including radio connection configuration information which is newly configured in the DU, CU-UP, and CU-CP of the potential target/candidate BS to serve the terminal 120, and sets and includes a new RRC transaction ID value to be used as an index for this radio configuration. Upon receiving the CHO modification response message from the potential target/candidate BSs, in step 11-370, the source BS 110*a* transmits an RRC connection reconfiguration message including the RRC connection reconfiguration information of the potential target/candidate BSs to the terminal 120.

However, if the terminal 120 succeeds in the random access for synchronization and handover to the target BS 110*b* in step 11-420 before the terminal 120 receives the RRC connection reconfiguration message transmitted from the source BS 110*a* in step 11-370, the terminal 120 stops an operation of reception from the source BS 110*a*, and thus cannot receive the RRC connection reconfiguration message transmitted from the source BS 110*a* in step 11-370. In this case, after succeeding in the random access to the target BS 110*b*, the terminal 120 transmits an RRC connection reconfiguration complete message to the target BS 110*b* in step 11-430. The RRC connection reconfiguration complete message is transmitted by including an RRC transaction ID value capable of indexing a radio configuration used by the terminal 120 so that the radio configuration used by the terminal 120 can be notified to the target BS 110*b*. In step 11-440, upon receiving this message, the DU of the target BS 110*b* transfers the message to the CU-CP of the target BS 110*b* by using an RRC transfer message of an F1 interface. After receiving the RRC connection reconfiguration complete message from the terminal 120, in step 11-450, the CU-CP of the target BS 110*b* identifies that the terminal 120 has completed the handover, and identifies a radio configuration used by the terminal 120 by using the RRC transaction ID value included in the RRC connection reconfiguration complete message. If the CU-CP, CU-UP, and DU of the target BS 110*b* are already set based on the radio configuration used by the terminal 120, in step 11-460, the bearer context modification request message is transmitted to the CU-UP of the target BS 110*b*. This message includes previous bearer or PDU session information so that the CU-UP configures a resource or information which needs to be modified in the CU-UP, based on the bearer or PDU session used before the CHO modification procedure, rather than information modified according to a previous CHO modification procedure. GTP-U tunnel information used by the CU-UP to transmit a downlink packet to the DU is also included in the bearer context modification request message used in step 11-460. In step 11-470, the CU-UP responds to the CU-CP by using a bearer context modification response message. In step 11-480, the CU-CP transmits a UE context modification request message including RRC reconfiguration complete fail indication information to the DU, and thus notifies that a configuration of the terminal 120 has failed, so that the terminal 120 operates with a radio resource configuration which is newly allocated previously by the DU of the target BS 110*b*. When the RRC reconfiguration complete fail indication information is included in the UE context modification request message, the DU starts a service for the terminal 120 by using a radio configuration currently in use, without having to apply the previous radio configuration newly configured. In addition, in step 11-490, the DU responds to the CU-CP by transmitting a UE context modification response message. Thereafter, the CU-CP transmits a path switch request message to the CN 130 in step 11-500, and receives a path switch request ACK message from the CN 130 in step 11-510, thereby modifying a data transfer path for transferring user data from the CN 130 to the CU-UP of the target BS 110*b*. At the same time, in step 11-520, the CU-CP transfers a handover complete message to the source BS 110*a* to notify that the terminal 120 has successfully completed the handover to the target BS 110*b*. Upon receiving the handover complete message from the target BS 110*b*, the source BS 110*a* deletes a radio resource allocated for the terminal 120 and context information of the terminal 120. In the presence of different potential target/candidate BSs configured for the terminal 120, a handover cancel message is transmitted to the different potential target/candidate BSs to delete the resource allocated to support the terminal 120 and the context information of the terminal 120. In addition, in step 11-540, the source BS 110*a* transmits to the CN 130 a response message which notifies that the bearer or PDU session modification has failed. After transmitting an RRC connection reconfiguration complete message to the target BS 110*b* in step 11-430, the terminal 120 transmits/receives downlink and uplink user data via the target BS 110*b* in step 11-600. Thereafter, optionally, in step 11-700, a procedure for the bearer or PDU session modification may be additionally performed in the terminal 120, the BS, and the CN 130.

Hereinafter, operations of a CU-CP of a target BS or a potential target/candidate BS when a message is received for CHO processing and when a terminal performs a handover access are described with reference to FIG. 12 to FIG. 14.

Figure 12:
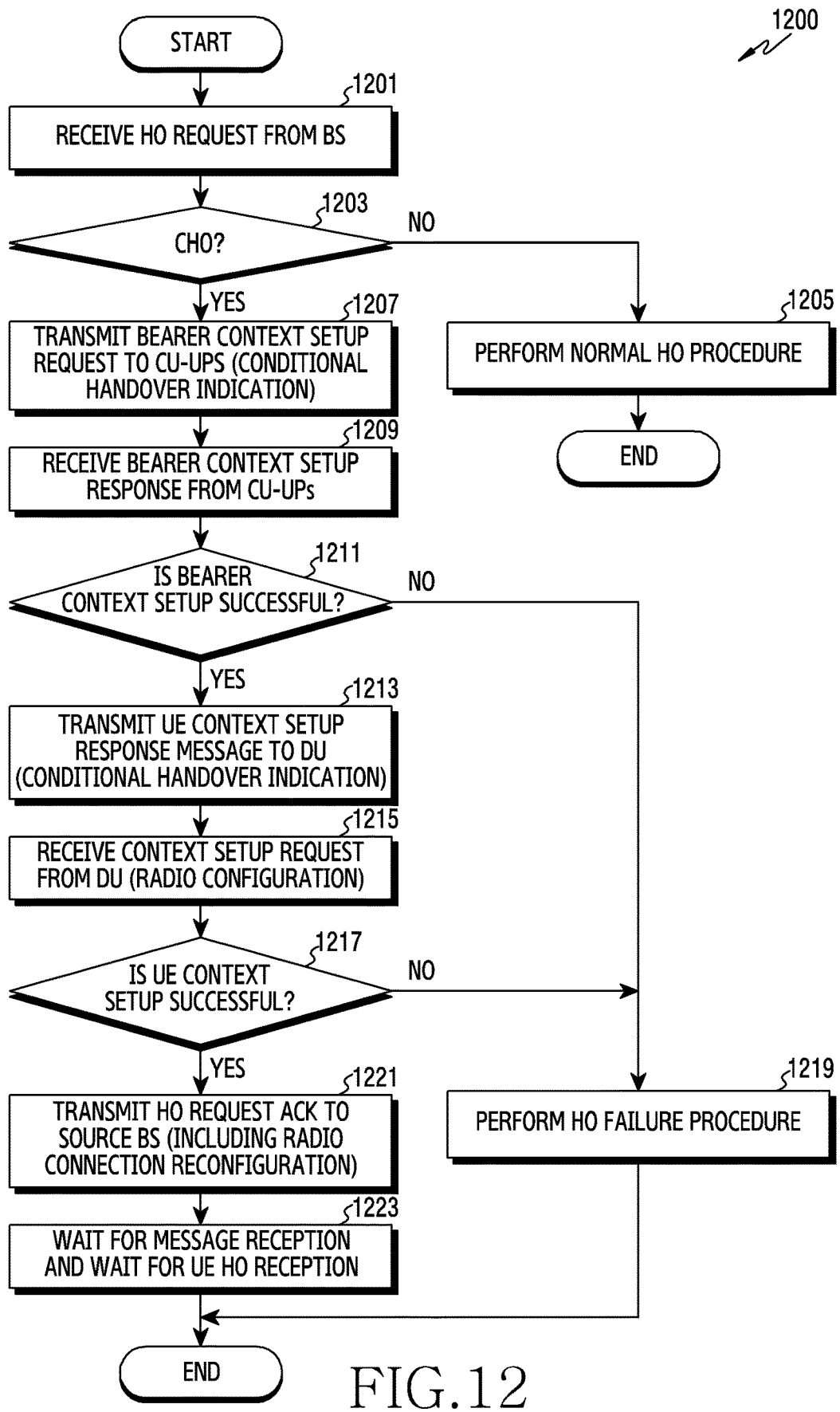
FIG. 12 illustrates a flowchart of a CU-CP unit for an operation based on receiving of a handover request message in a wireless communication system according to various embodiments of the disclosure.

FIG. 12 illustrates a flowchart 1200 of a CU-CP unit for an operation based on receiving of a handover request message in a wireless communication system according to various embodiments of the disclosure. A method of operating the CU-CP unit 522 is exemplified in FIG. 12.

Referring to FIG. 12, in step 1201, the CU-CP unit receives a handover request message. In step 1203, the CU-CP unit identifies whether it is a handover request for a CHO. In case of a normal handover request, in step 1205, the CU-CP unit performs a normal handover procedure. If the handover request is for the CHO, at least one of CU-UP in a potential target/candidate BS or a target BS is selected according to PDU session information or a bearer configured for a service of a terminal. In step 1207, the CU-CP unit additionally transmits to the CU-UPs a bearer context setup request message including a CHO indication together with information for configuring a CU-UP resource. The CHO indication may be achieved in such a manner that a separate CHO indicator is added to the bearer context setup request message, or a bearer context status is set to 'suspend', or DU's GTP tunnel information for transmitting a downlink packet to a DU is not included. The CHO indication may be used when user inactivity monitoring is not performed in the CU-UP or may be used to efficiently manage a CU-UP resource pre-allocated for the CHO.

In step 1209, the CU-CP unit receives a bearer context setup response related message from the CU-UPs. In step 1211, the CU-CP unit identifies whether a bearer context is successfully set up. If every bearer context setup fails, in step 1219, the CU-CP unit performs the existing handover failure procedure. Otherwise, if there is a successful bearer context setup, in step 1213, the CU-CP unit transmits a UE context setup request message to a DU of a target BS or a potential target/candidate BS which manages a target cell for a handover of the terminal according to the successful bearer context. The UE context setup request message additionally includes a CHO indication in addition to the existing terminal and Data Radio Bearer (DRB) information. The CHO indication may be used when the DU does not perform an RLF detection operation of a corresponding terminal or may be used to efficiently manage a DU resource pre-allocated for the CHO.

In step 1215, the CU-CP unit receives a UE context setup related response message from the DU. In step 1217, the CU-CP unit identifies whether UE context is successfully set up in the DU. If the UE context setup fails, in step 1219, the CU-CP unit performs a handover failure procedure. Otherwise, if the UE context setup succeeds, in step 1221, the CU-CP unit transmits a handover request ACK message to a source BS. The handover request ACK message includes radio connection reconfiguration information of the potential target/candidate BS, including a radio configuration received from the DU in step 1215. In step 1223, the CU-CP unit waits for receiving of another message or waits for receiving of a handover access of the terminal.

Figure 13:
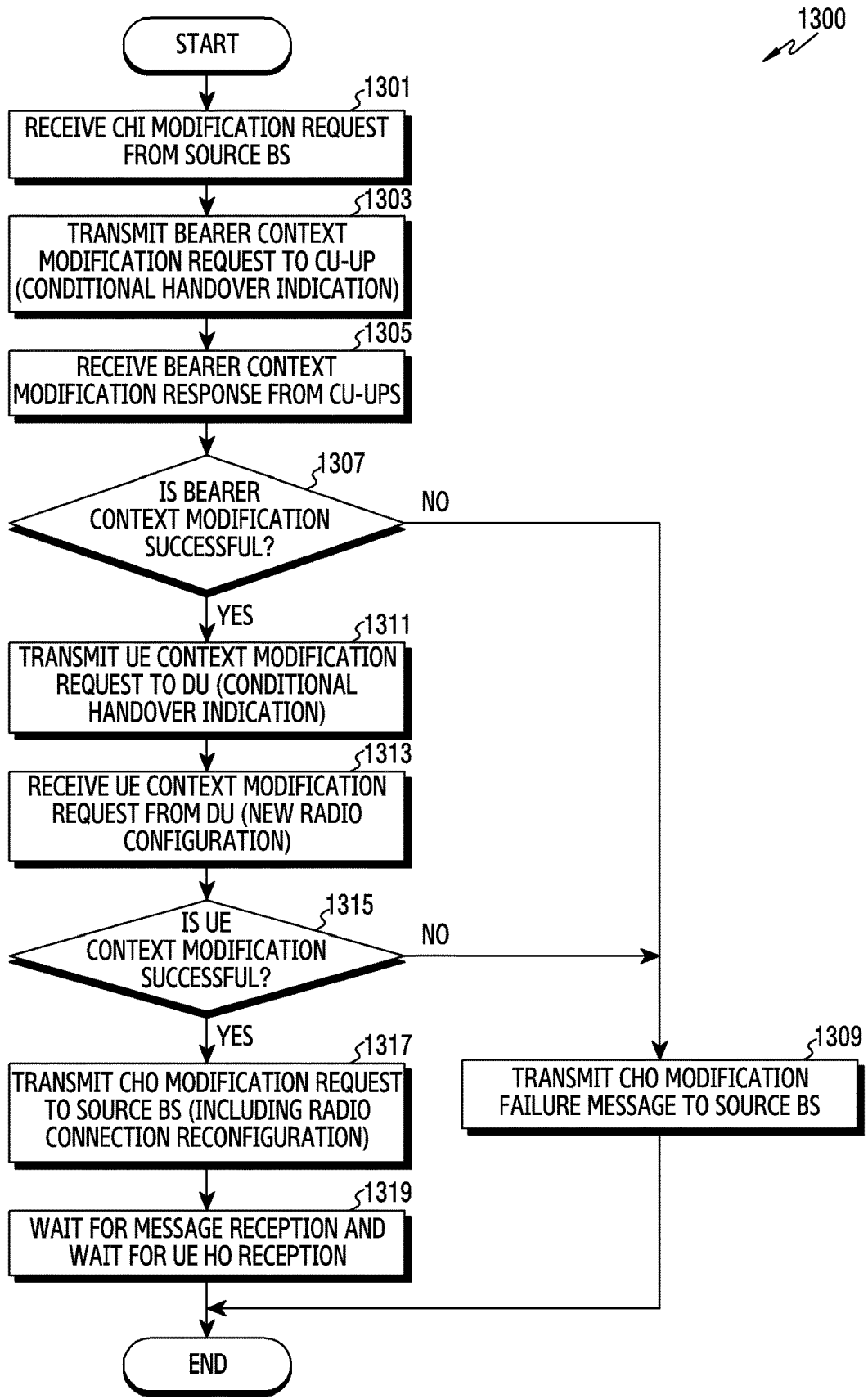
FIG. 13 illustrates a flowchart of a CU-CP unit for an operation based on receiving of a CHO modification request message in a wireless communication system according to various embodiments of the disclosure.

FIG. 13 illustrates a flowchart 1300 of a CU-CP unit for an operation based on receiving of a CHO modification request message in a wireless communication system according to various embodiments of the disclosure. A method of operating the CU-CP unit 522 is exemplified in FIG. 13.

Referring to FIG. 13, in step 1301, the CU-CP unit receives a CHO modification request message. In step 1303, the CU-CP unit additionally transmits a bearer context modification request message including an CHO indication to CU-UPs of the potential target/candidate BS or target BS previously selected for a corresponding terminal, together with information for a CU-UP resource medication configuration. The CHO indication may be achieved in such a manner that a separate CHO indicator is added to the bearer context setup request message, or a bearer context status is set to 'suspend', or DU's GTP tunnel information for transmitting a downlink packet to a DU is not included. The CHO indication may be used when user inactivity monitoring is not performed in the CU-UP or may be used to efficiently manage a CU-UP resource pre-allocated for the CHO.

In step 1305, the CU-CP unit receives a bearer context modification related response message from the CU-UPs. In step 1307, the CU-CP unit identifies whether a bearer context is successfully modified. If every bearer context modification fails, in step 1309, the CU-CP unit transmits a CHO modification failure message to the source BS. Otherwise, if there is a successful bearer context modification, in step 1311, the CU-CP unit transmits a UE context modification request message to the potential target/candidate BS previously selected for a corresponding terminal or a DU of the target BS. The UE context modification request message additionally includes a CHO indication in addition to the existing modification information. The CHO indication may be used when the DU does not perform an RLF detection operation of a corresponding terminal or may be used to efficiently manage a DU resource pre-allocated for the CHO.

In step 1313, the CU-CP unit receives a UE context modification related response message from the DU. In step 1315, the CU-CP unit identifies whether UE context is successfully modified in the DU. If the UE context modification fails, in step 1309, the CU-CP unit transmits a CHO modification failure message to the source BS. Otherwise, if the UE context modification succeeds, in step 1317, the CU-CP unit transmits a CHO modification response message to the source BS. If the DU transfers the radio configuration information in step 1313, the CHO modification response message includes the radio connection reconfiguration information of the target/candidate BS, including radio configuration information obtained from the DU. In step 1319, the CU-CP unit waits for receiving of another message or waits for receiving of a handover access of the terminal.

Figure 14:
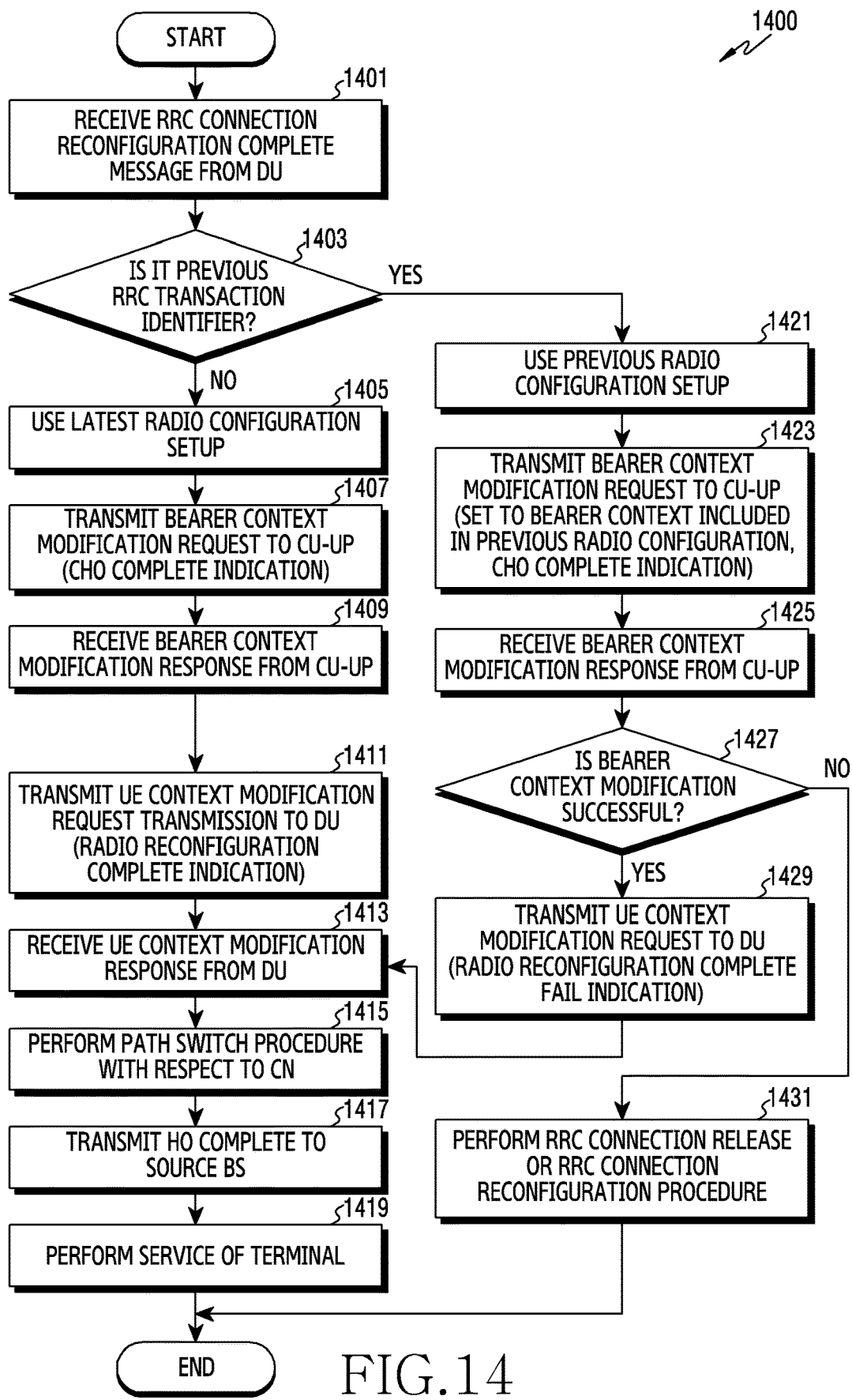
FIG. 14 illustrates a flowchart of a CU-CP unit for an operation based on receiving of an RRC connection reconfiguration complete message from a terminal in a wireless communication system according to various embodiments of the disclosure.

FIG. 14 illustrates a flowchart 1400 of a CU-CP unit for an operation based on receiving of an RRC connection reconfiguration complete message from a terminal in a wireless communication system according to various embodiments of the disclosure. In an example of FIG. 14, a potential target/candidate BS is a target BS to which a terminal executes a handover. A method of operating the CU-CP unit 522 is exemplified in FIG. 14.

Referring to FIG. 14, in step 1401, the CU-CP unit receives from a DU an RRC connection reconfiguration complete message transmitted by the terminal. In step 1403, the CU-CP unit identifies an RRC transaction ID value included in the RRC connection reconfiguration complete message. If the RRC transaction ID includes a value for indexing content configured immediately before in the DU and CU-UPs of a target BS, in step 1405, the CU-CP unit operates based on a last-set radio configuration. In step 1407, the CU-CP unit transmits a bearer context modification request message including a CHO complete indication to the CU-UPs in the target BS previously selected for the terminal. The CHO complete indication may be achieved in such a manner that a separate CHO indicator is added to the bearer context modification request message, or a bearer context status is set to 'resume, or DU's GTP tunnel information for transmitting a downlink packet to the DU is included. The CHO complete indication may be used when the CU-UPs start to perform user inactivity monitoring or may be used for efficient management for the purposes of a service of the terminal so that a resource of the terminal is managed in the CU-UP.

In step 1409, the CU-CP unit receives a bearer context modification related response message from the CU-UPs. In step 1411, the CU-CP unit transmits a UE context modification request message to the DU of the target BS previously selected for the terminal according to the successful bearer context. The UE context modification request message includes a radio reconfiguration complete indication, and may notify that it is operable with the last radio configuration previously set by the DU or instruct to perform a radio failure detection function, or may be used for efficient management for the purposes of a service of the terminal so that a resource of the terminal is managed in the DU If it is identified in step 1403 that the RRC transaction ID includes not the value for indexing the content configured immediately before in the CU-UPs and the DU but a previous value thereof, in step 1421, the CU-CP unit operates based on a pre-set radio configuration. In step 1423, the CU-CP unit additionally transmits to the CU-UPs previously selected for the terminal a bearer context modification request message including a CHO complete indication together with information for reconfiguring a CU-UP resource for supporting a DRB included in a previous radio configuration. The CHO complete indication may be achieved in such a manner that a separate CHO indicator is added to the bearer context modification request message, or a bearer context status is set to 'resume, or DU's GTP tunnel information for transmitting a downlink packet to the DU is included. The CHO complete indication may be used when the CU-UPs start to perform user inactivity monitoring or may be used for efficient management for the purposes of a service of the terminal so that a resource of the terminal is managed in the CU-UP.

In step 1425, the CU-CP unit receives a bearer context modification related response message from the CU-UPs. In step 1427, the CU-CP unit identifies whether a bearer context is successfully modified. If every bearer context modification fails, in step 1431, the CU-CP unit performs an RRC connection release procedure. Alternatively, if the bearer context modification fails in part, the CU-CP unit performs an additional RRC connection reconfiguration procedure. Otherwise, if every bearer context modification succeeds, in step 1429, the CU-CP unit transmits a UE context modification request message to the DU previously selected for the terminal according to the successful bearer context. The UE context modification request message includes a radio reconfiguration complete fail indication. The UE context modification request message may notify that it is operable with a previous radio configuration due to a failure in the last radio configuration previously set by the DU or instruct to perform a radio failure detection function, or may be used for efficient management for the purposes of a service of the terminal so that a resource of the terminal is managed in the DU After step 1411 or step 1429, upon receiving the UE context modification related response message from the DU in step 1413, the CU-CP unit performs a path switch procedure to modify a GTP-U tunnel for transferring data between a core network and a target BS for a service of the terminal and the core network in step 1415. Subsequently, in step 1417, the CU-CP unit transmits a handover complete message to the source BS to notify that the terminal has successfully performed a handover. In step 1419, the CU-CP unit provides a service so that user data of the terminal is transmitted/received in the target BS.

Hereinafter, operations of a CU-UP of a potential target/candidate BS when a message is received for CHO processing and when a terminal performs a handover access are described with reference to FIG. 15 and FIG. 16.

Figure 15:
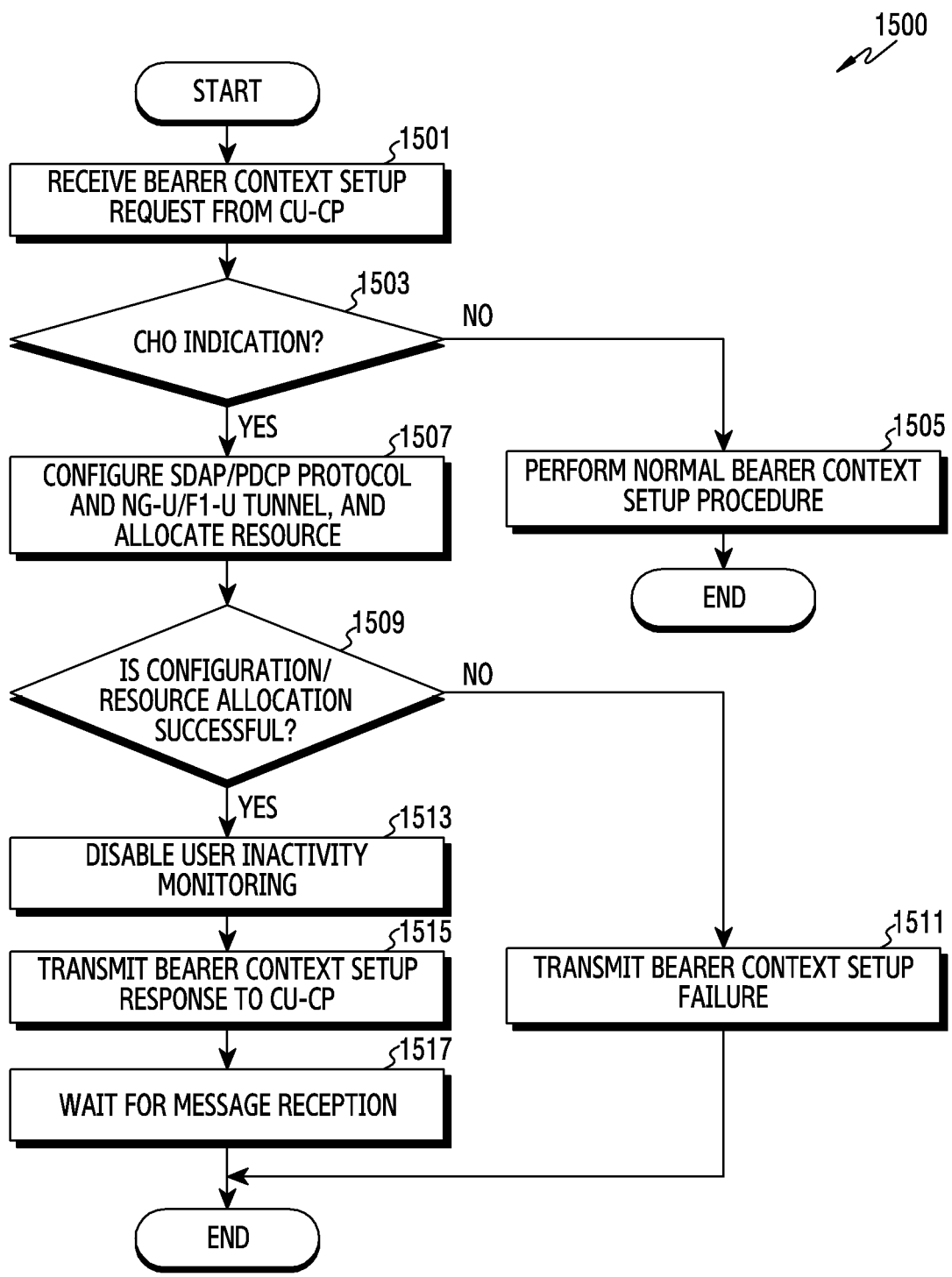
FIG. 15 illustrates a flowchart of a CU-UP unit for an operation based on receiving of a bearer context setup request message in a wireless communication system according to various embodiments of the disclosure.

FIG. 15 illustrates a flowchart 1500 of a CU-UP unit for an operation based on receiving of a bearer context setup request message in a wireless communication system according to various embodiments of the disclosure. A method of operating the CU-UP unit 520 is exemplified in FIG. 15.

Referring to FIG. 15, in step 1501, the CU-UP unit receives a bearer context setup request message from a CU-CP. In step 1503, the CU-UP unit identifies whether it is a bearer context setup request for a CHO. Whether it is the bearer context setup request for the CHO may be identified by identifying whether a separate CHO indicator is added to the bearer context setup request message, or a bearer context status is set to 'suspend', or DU's GTP tunnel information for transmitting a downlink packet to a DU is not included.

If it is a normal bearer context setup request or if a CHO complete indication is included, in step 1505, the CU-UP unit performs the existing bearer context setup process. Otherwise, if the bearer context setup request is for the CHO, in step 1507, according to bearer or PDU session information configured for a service of a terminal, the CU-UP unit configures a Service Data Protocol (SDAP) to be processed in the CU-UP and an NG-U/F1-U tunnel for transmitting/receiving user data with respect to the core network/DU, and configures an internal resource in the CU-UP for the CHO. In step 1509, the CU-UP unit identifies whether the internal resource is successfully allocated. If the internal resource cannot be allocated, in step 1511, the CU-UP unit transmits a bearer context setup failure message to the CU-CP. Otherwise, if the resource is successfully allocated in step 1509, instead of operating the user inactivity monitoring function of the terminal in step 1513, the CU-UP unit transmits a bearer context setup response message to the CU-CP in step 1515. In step 1517, the CU-UP unit waists for receiving of an additional message from the CU-CP.

Figure 16:
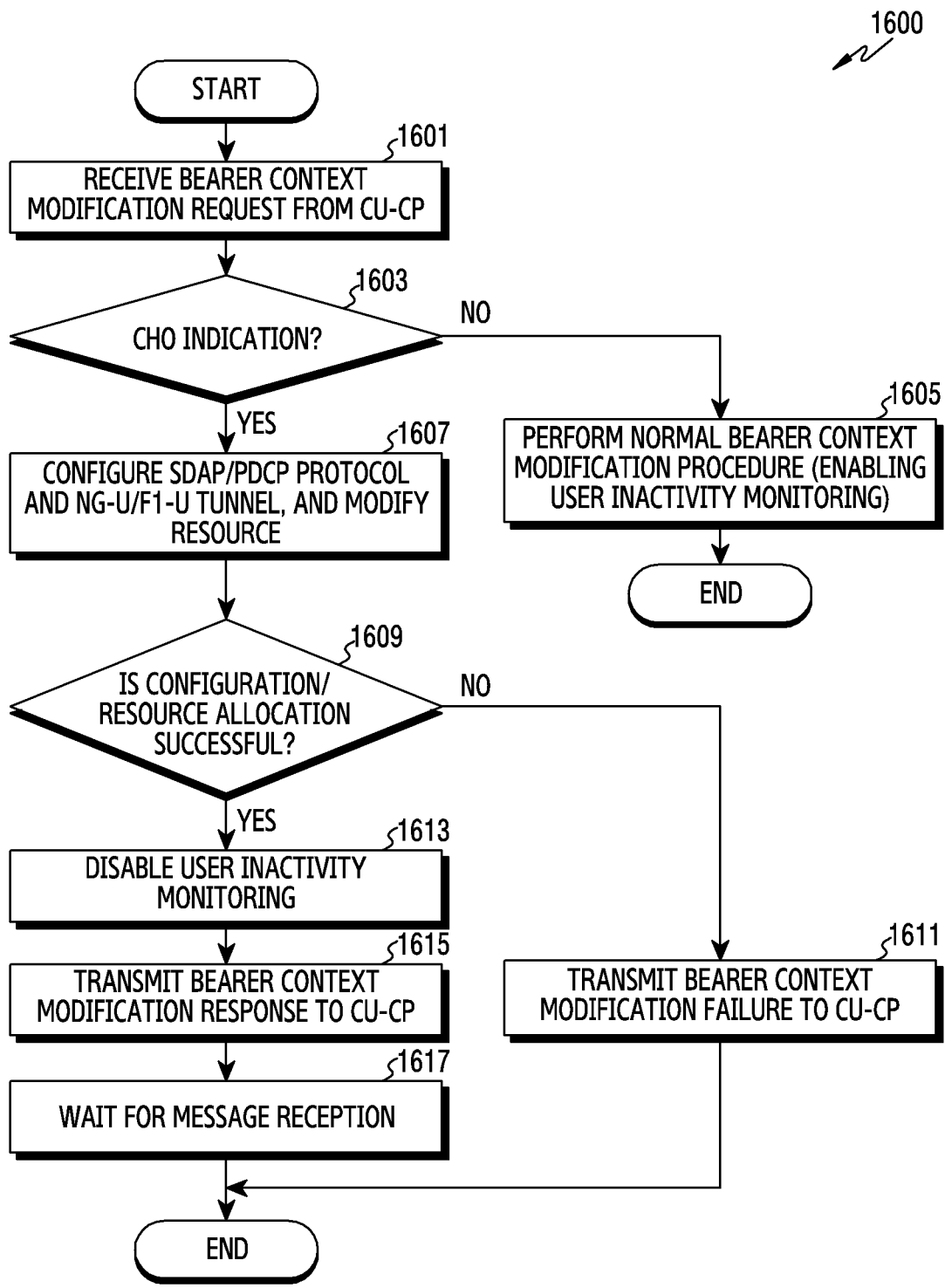
FIG. 16 illustrates a flowchart of a CU-UP unit for an operation based on receiving of a bearer context modification request message in a wireless communication system according to various embodiments of the disclosure.

FIG. 16 illustrates a flowchart 1600 of a CU-UP unit for an operation based on receiving of a bearer context modification request message in a wireless communication system according to various embodiments of the disclosure. A method of operating the CU-UP unit 520 is exemplified in FIG. 16.

Referring to FIG. 16, in step 1601, the CU-UP unit receives a bearer context modification request message from a CU-CP. In step 1603, the CU-UP unit identifies whether it is a bearer context modification setup request for a CHO. A CHO complete indication may be determined by adding a separate CHO complete indicator to the bearer context modification request message, setting a bearer context status to 'resume', or identifying whether DU's GTP tunnel information for transmitting a downlink packet to the DU is included.

If it is a normal bearer context modification request or if a CHO complete indication is included, in step 1605, the CU-UP unit performs the existing bearer context modification process. Otherwise, if the bearer context setup request is for the CHO, in step 1607, according to bearer or PDU session information configured for a service of a terminal, the CU-UP unit configures a Service Data Protocol (SDAP) to be processed in the CU-UP and an NG-U/F1-U tunnel for transmitting/receiving user data with respect to the core network/DU, and allocates an internal resource in the CU-UP for the CHO. The CHO indication may be achieved in such a manner that a separate CHO indicator is added to the bearer context modification request message, or a bearer context status is set to 'suspend', or DU's GTP tunnel information for transmitting a downlink packet to a DU is not included.

In step 1609, the CU-UP unit identifies whether the internal resource is successfully allocated. If the internal resource cannot be allocated, in step 1611, the CU-UP unit transmits a bearer context modification failure message to the CU-CP. Otherwise, if a resource is successfully allocated, in step 1613, the CU-UP unit disables a user inactivity monitoring function of a corresponding terminal. In step 1615, the CU-UP unit transmits a bearer context modification response message to the CU-CP. In step 1617, the CU-UP unit waists for receiving of an additional message from the CU-CP.

Hereinafter, operations of a DU of a potential target/candidate BS when a message is received for CHO processing and when a terminal performs a handover access are described with reference to FIG. 17 and FIG. 18.

Figure 17:
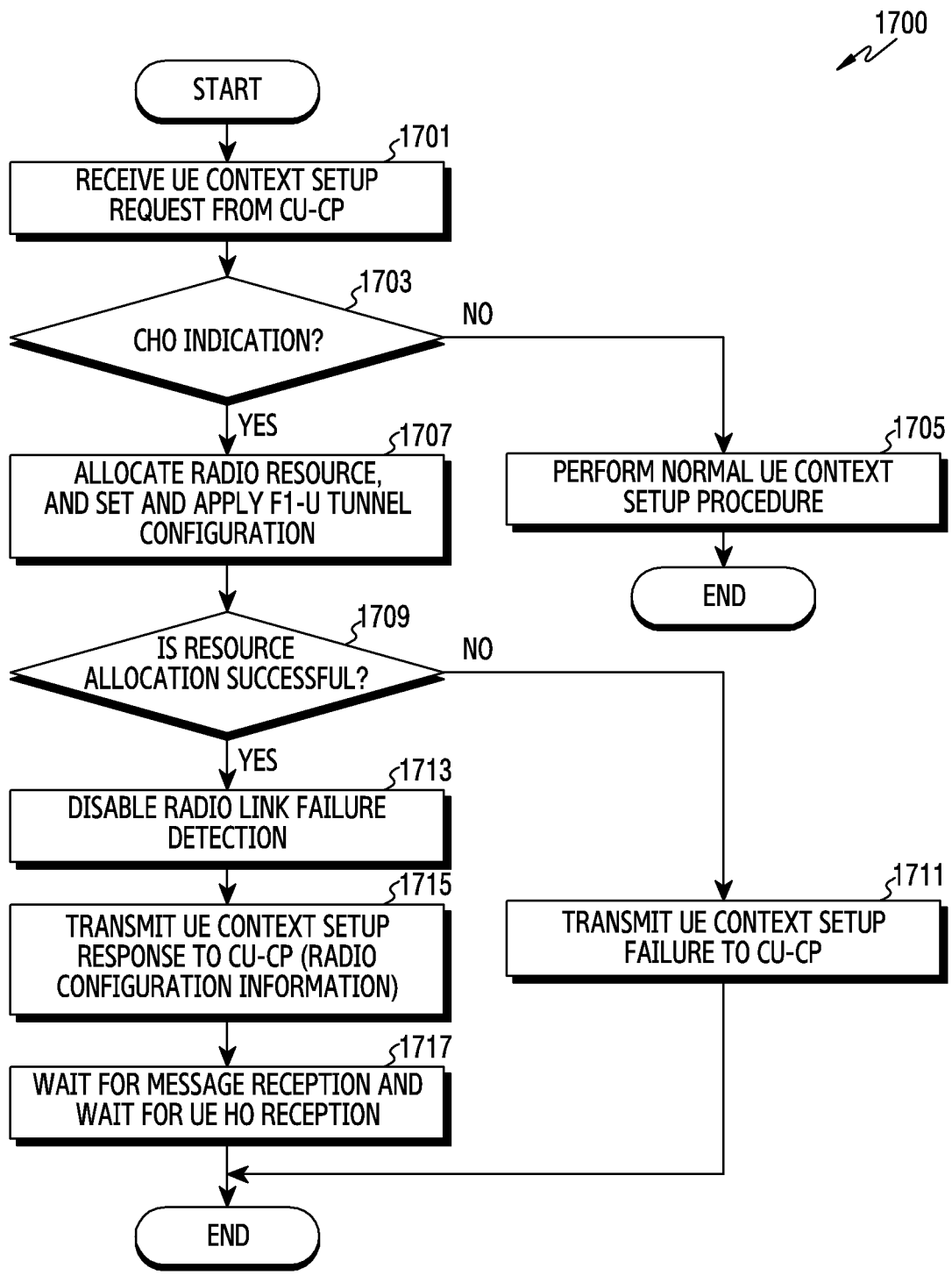
FIG. 17 illustrates a flowchart of a DU for an operation based on receiving of a UE context setup request message in a wireless communication system according to various embodiments of the disclosure.

FIG. 17 illustrates a flowchart 1700 of a DU for an operation based on receiving of a UE context setup request message in a wireless communication system according to various embodiments of the disclosure. A method of operating the DU 530 is exemplified in FIG. 17.

Referring to FIG. 17, in step 1701, the DU receives a UE context setup request message from a CU-CP. In step 1703, the DU identifies whether it is a bearer context setup request for a CHO. In case of a normal UE context setup request, in step 1705, the DU performs the existing UE context setup process. If the UE context setup request is for the CHO, in step 1707, according to bearer or PDU session information configured for a service of a terminal, the DU configures and uses a radio resource to be processed in the DU and an F1-U tunnel for transmitting/receiving user data with respect to the CU-UP, and configures an internal resource in the DU for the CHO.

In step 1709, the DU identifies whether the internal resource is successfully configured and used. If the internal resource cannot be configured and used, in step 1711, the DU transmits a UE context setup failure message to the CU-CP. Otherwise, if the resource is successfully configured, in step 1713, the DU does not operate an RLF detection function of a corresponding terminal. In step 1715, the DU transmits a UE context setup response message to the CU-CP. In step 1717, the DU waits for receiving of another message from the CU-CP or waits for receiving of a random access for a handover of the terminal.

Figure 18:
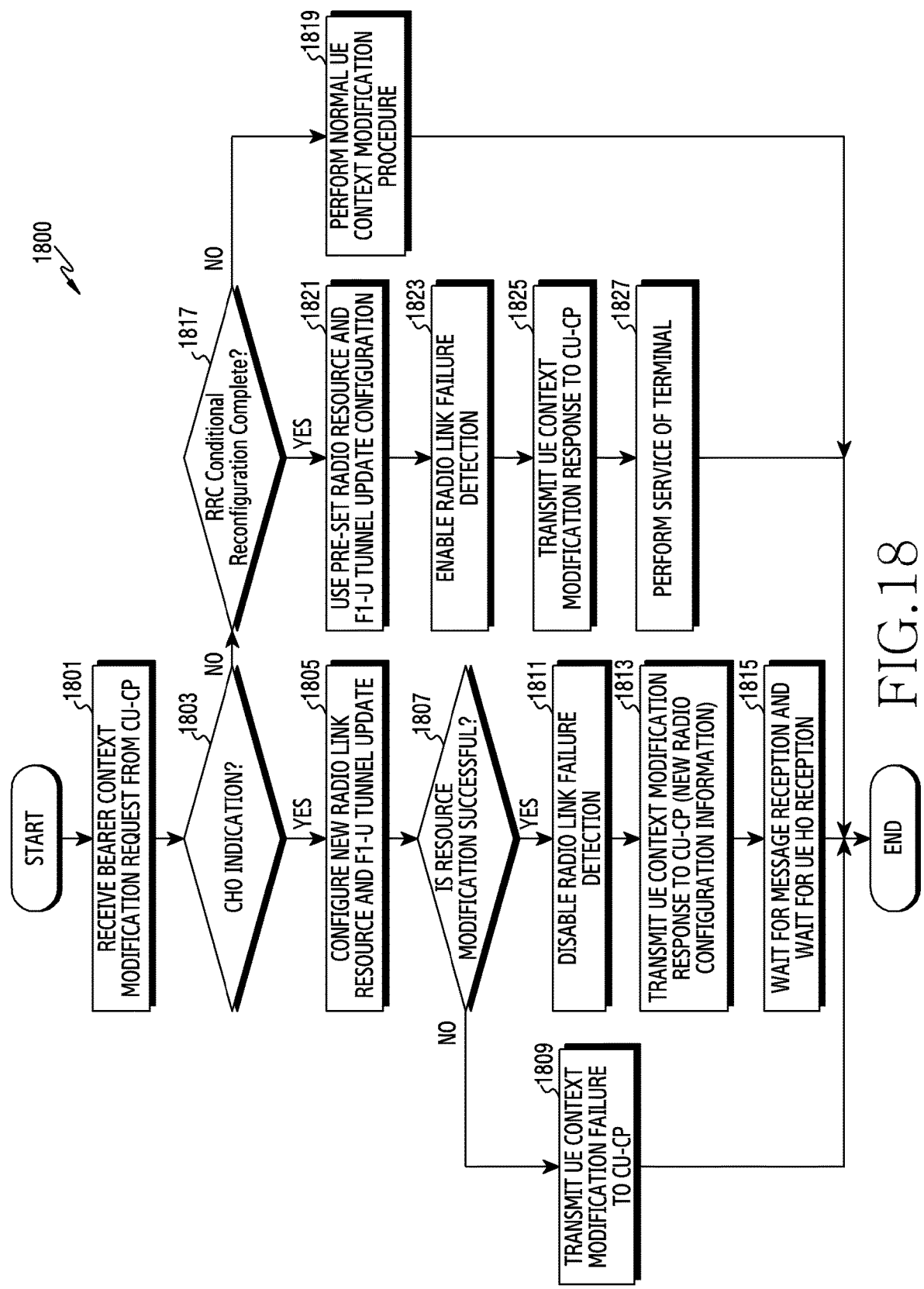
FIG. 18 illustrates a flowchart of a DU for an operation based on receiving of a UE context modification request message in a wireless communication system according to various embodiments of the disclosure.

FIG. 18 illustrates a flowchart 1800 of a DU for an operation based on receiving of a UE context modification request message in a wireless communication system according to various embodiments of the disclosure. A method of operating the DU 530 is exemplified in FIG. 18.

Referring to FIG. 18, in step 1801, the DU receives a UE context modification request message from a CU-CP. In step 1803, the DU identifies whether it is a UE context modification setup request for a CHO. If a CHO indication is not included, in step 1817, the DU identifies whether an RRC connection reconfiguration complete indicator is included. If the RRC connection reconfiguration complete indicator is not included, in step 1819, the DU proceeds the existing UE context modification process.

If the RRC connection reconfiguration complete indication is included in step 1817, in step 1821, the DU uses a previously configured radio resource and F1-U tunnel setup information for a service of a terminal. In step 1823, the DU enables an RLF detection function. In step 1825, the DU transmits a UE context modification response message to the CU-CP. In step 1827, the DU performs a user data transmission/reception service of the terminal.

If the UE context modification setup request for the CHO is determined in step 1803, in step 1805, the DU updates a radio resource and F1-U tunnel information for transmitting/receiving user data with respect to the CU-UP according to information included in the UE context modification request message, and does not use the resource and the information. In step 1807, the DU determines whether a resource is successfully modified. If the resource modification fails, in step 1809, the DU transmits a UE context modification failure message to the CU-CP. Otherwise, if the resource modification succeeds, in step 1811, the DU disables the RLF detection function. In step 1813, if a new radio configuration is set, the DU transmits to the CU-CP a UE context modification response message including information on the new radio configuration. Thereafter, in step 1815, the DU waits for receiving of another message from the CU-CP or waits for receiving of a random access for a handover of the terminal.

Figure 19A:
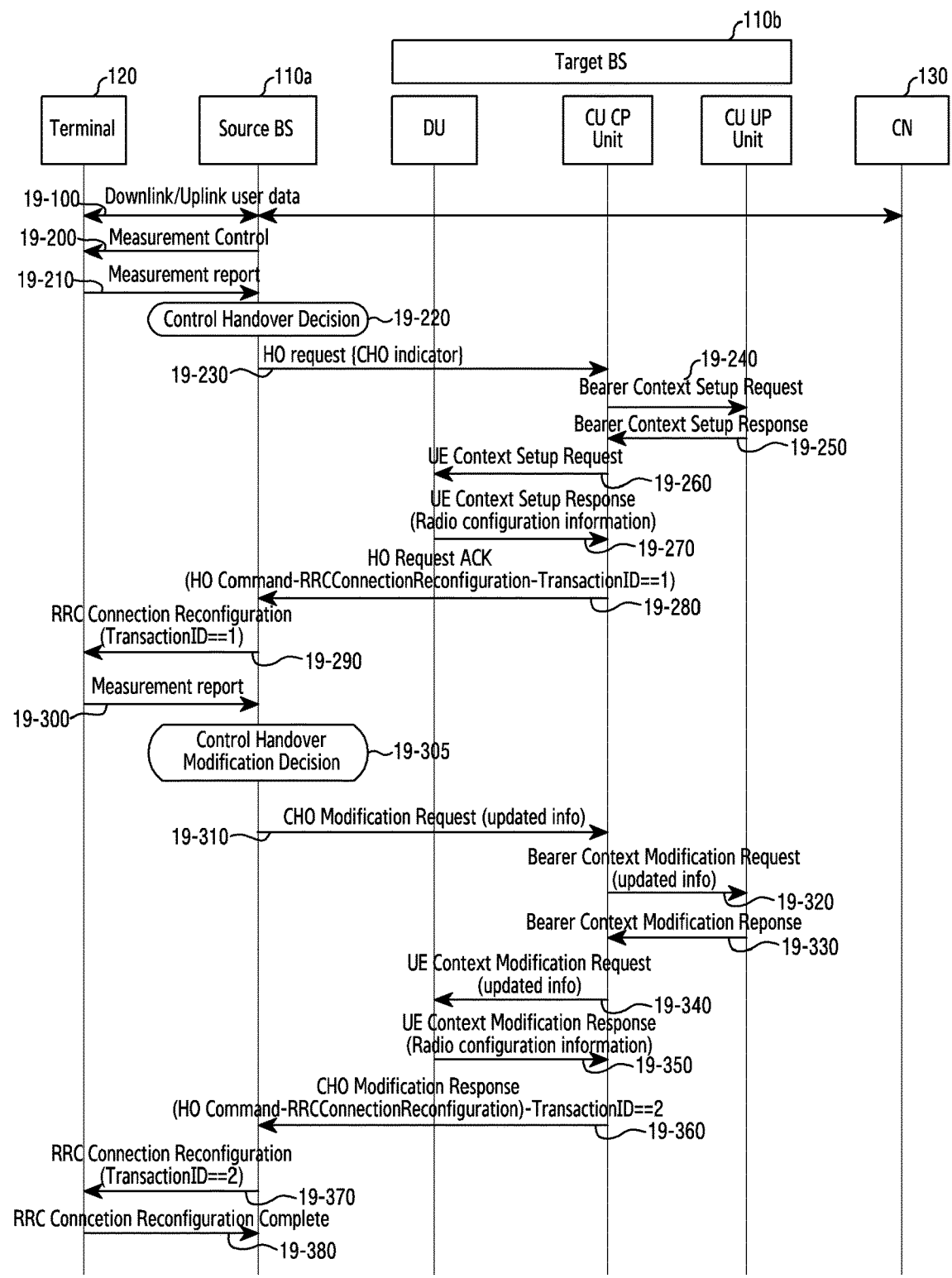
FIG. 19A illustrates a signal exchange for modifying a CHO by a decision of a source BS in a wireless communication system according to various embodiments of the disclosure.
Figure 19B:
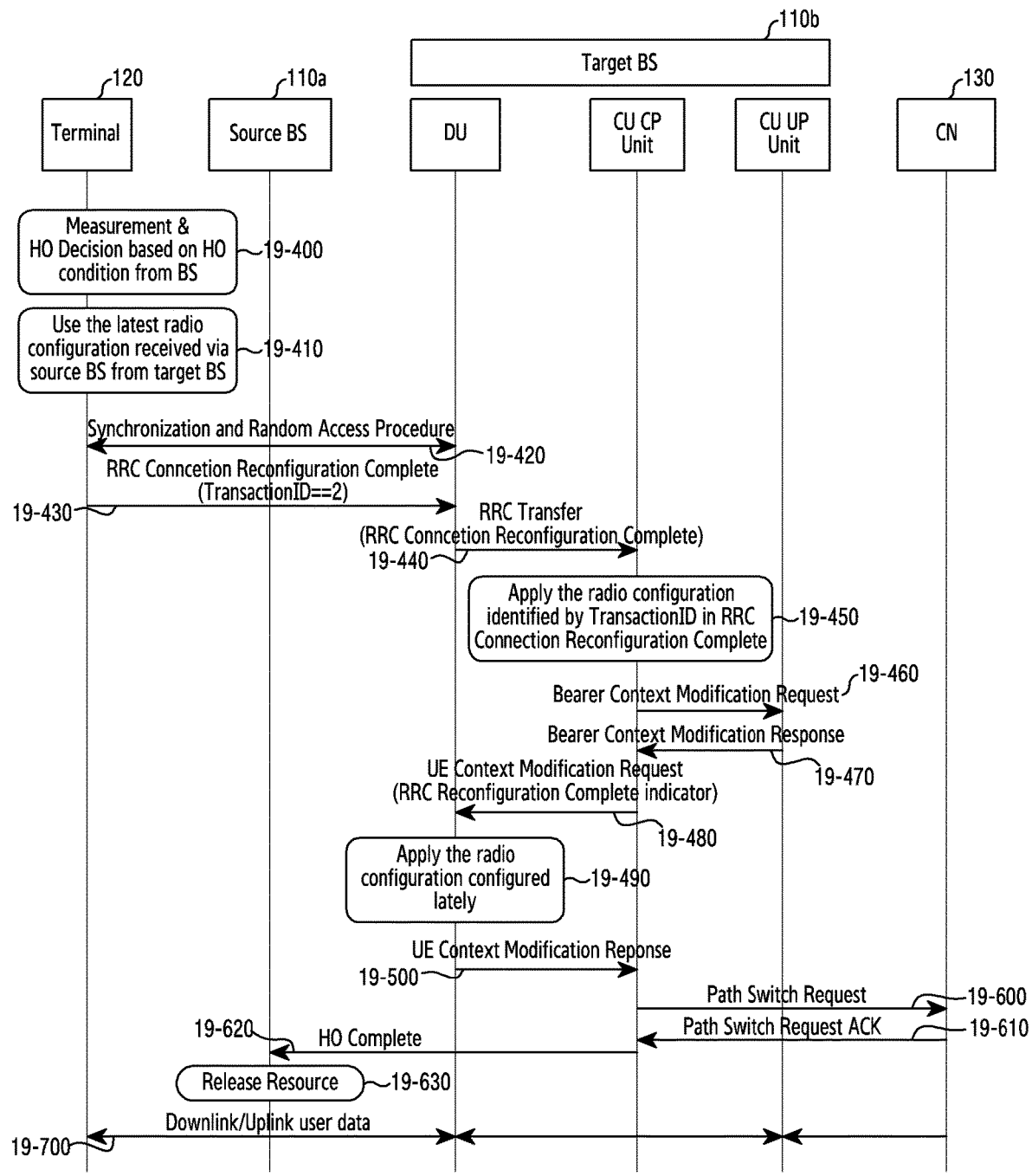
FIG. 19B illustrates a signal exchange for modifying a CHO by a decision of a source BS in a wireless communication system according to various embodiments of the disclosure.
Figure 20A:
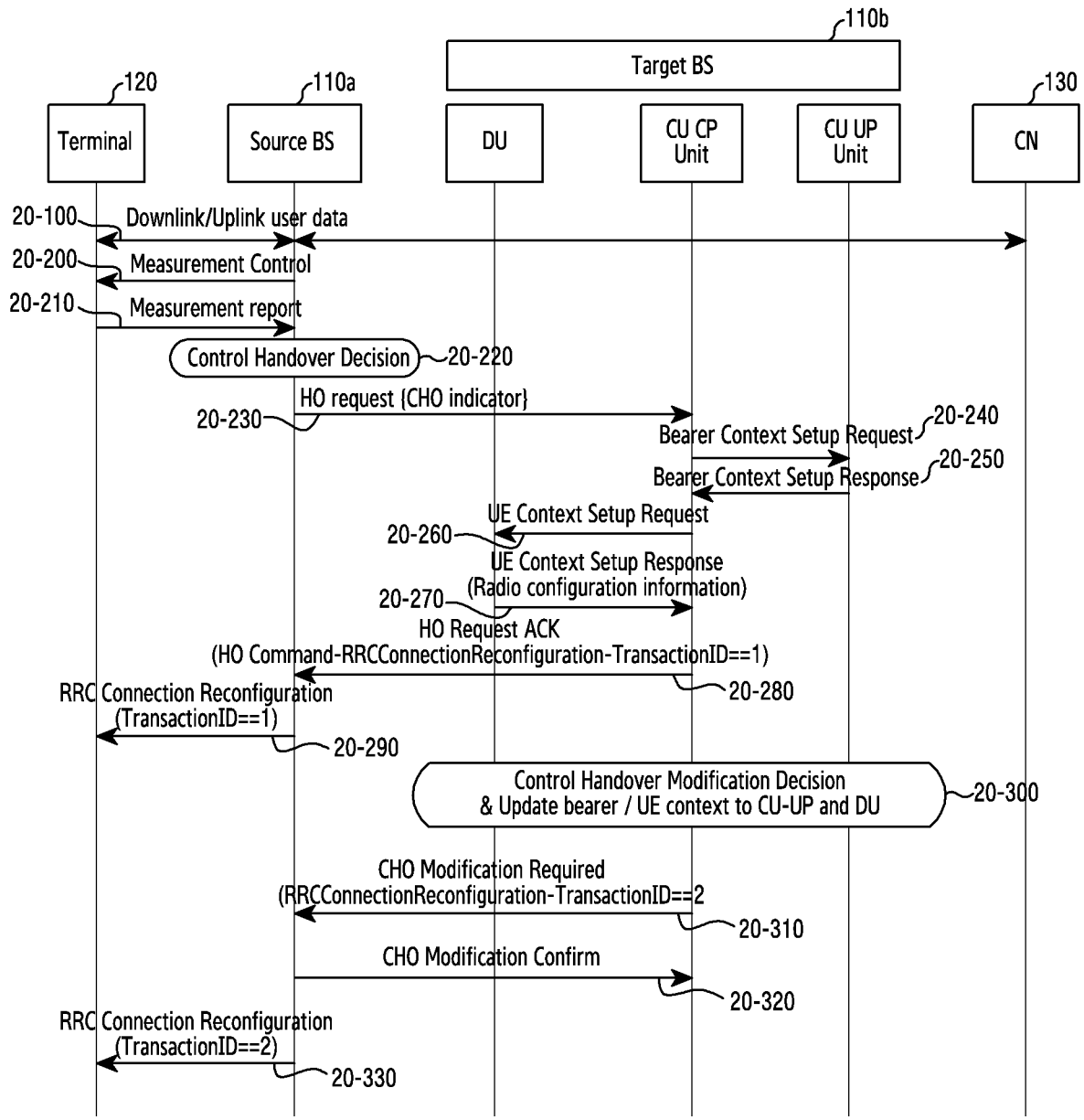
FIG. 20A illustrates a signal exchange for modifying a CHO by a decision of a potential target/candidate BS or a target BS in a wireless communication system according to various embodiments of the disclosure.
Figure 20B:
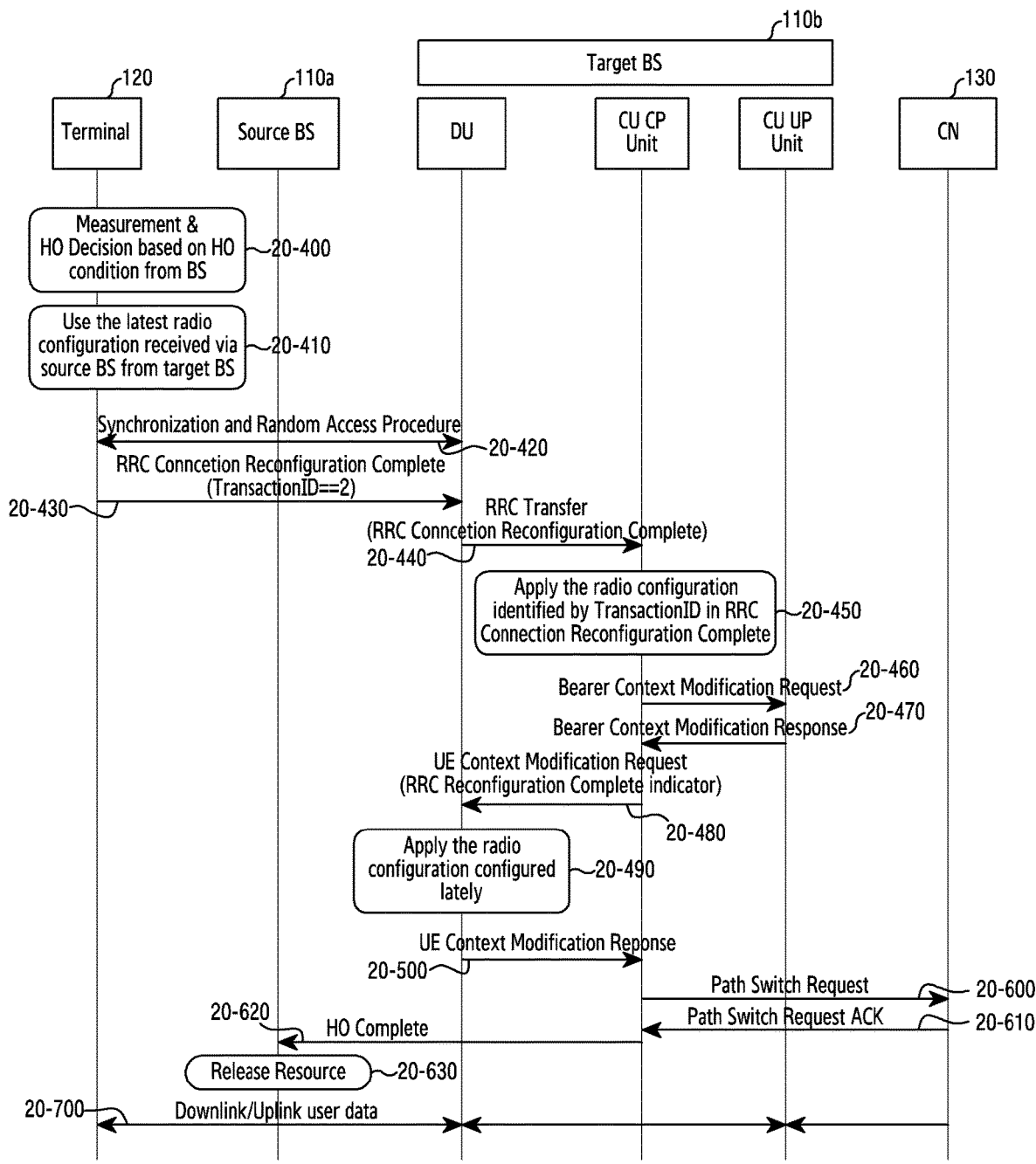
FIG. 20B illustrates a signal exchange for modifying a CHO by a decision of a potential target/candidate BS or a target BS in a wireless communication system according to various embodiments of the disclosure.

FIGS. 19A and 19B and FIGS. 20A and 20B illustrate another embodiment corresponding to FIG. 10A and FIG. 10B as an embodiment for a case where a CHO modification setup is complete after a terminal is set to a CHO and before the terminal executes a handover to a target BS. While FIG. 10A and FIG. 10B illustrate an embodiment in which a CHO is modified due to signaling of a core network, FIG. 19A and FIG. 19B illustrate an embodiment in which the CHO is modified according to a decision of a source BS, and FIG. 20A and FIG. 20B illustrate an embodiment in which the CHO is modified according to a decision of a potential target/candidate BS.

FIG. 19A and FIG. 19B illustrate a signal exchange for modifying a CHO by a decision of a source BS in a wireless communication system according to various embodiments of the disclosure. Specifically, FIG. 19A and FIG. 19B illustrate an embodiment for a case where a CHO modification setup is complete before the terminal 120 executes a handover to a target BS.

Referring to FIG. 19A and FIG. 19B, step 19-100 to step 19-290 are steps for configuring a CHO, and are identical to the step 10-100 to step 10-290 of FIG. 10A and FIG. 10B. Unlike in FIG. 10A and FIG. 10B, in case of an embodiment of FIG. 19A and FIG. 19B, when a CHO modification is determined in step 19-300 on the basis of measurement information transmitted by the terminal 120 or according to an internal decision such as a policy change or the like in the source BS 110a, in step 19-310, a CHO modification request message is transmitted to potential target/candidate BSs. Update information (or info) which requests for a CHO modification is transmitted by including updated information such as information on a change in a target cell for supporting the CHO. In step 19-310 to step 19-380, the potential target/candidate BS which has received this message and the source BS 110a which operates thereafter process the same procedure as the step 10-310 to step 10-380 of FIG. 10A and FIG. 10B. Next, when the terminal 120 decides to execute a handover in step 19-400, the same procedure as the step 10-400 to step 10-700 of FIG. 10A and FIG. 10B are performed in step 19-400 to step 19-700.

FIG. 20A and FIG. 20B illustrate a signal exchange for modifying a CHO by a decision of a potential target/candidate BS or a target BS in a wireless communication system according to various embodiments of the disclosure. Specifically, FIG. 20A and FIG. 20B illustrate an embodiment for a case where a CHO modification setup is complete before the terminal 120 executes a handover to a target BS.

Referring to FIG. 20A and FIG. 20B, when a CU-UP or DU of a potential target/candidate BS requires resource modification or when it is determined that there is a need to change a pre-set CHO resource according to an internal decision such as a policy change or the like in the CU-CP, the potential target/candidate BS may initiate a CHO modification procedure. Step 20-100 to step 20-290 of FIG. 20A and FIG. 20B are steps for configuring a CHO, and identical to the step 10-100 to step 10-290 of FIG. 10A and FIG. 10B. Unlike in FIG. 10A and FIG. 10B, in case of an embodiment of FIG. 20A and FIG. 20B, when the CU-UP or DU of the potential target/candidate BS requires the resource modification or when it is determined that there is a need to change the pre-set CHO resource according to the internal decision such as a policy change or the like in the CU-CP, a bearer context and UE context update procedure of the CU-UP and DU is performed internally, and thereafter, in step 20-310, the CU-CP transmits a CHO modification required message to the source BS 110*a*. The CHO modification required message is transmitted by including radio connection reconfiguration information modified in the target/candidate BS. If the source BS 110*a* which has received this message admits the CHO modification request in step 20-320, a CHO modification confirm message is transmitted to the potential target/candidate BS, and if it is rejected, a CHO modification reject message is transmitted. If the source BS 110*a* admits the CHO modification request, in step 20-330, an RRC connection reconfiguration message including radio connection reconfiguration information modified in the target/candidate BS is transmitted to the terminal 120. Thereafter, when the terminal 120 decides to execute a handover in step 20-400, the same procedure in the step 10-400 to step 10-700 of FIG. 10A and FIG. 10B are performed in step 20-400 and step 20-700.

Figure 21A:
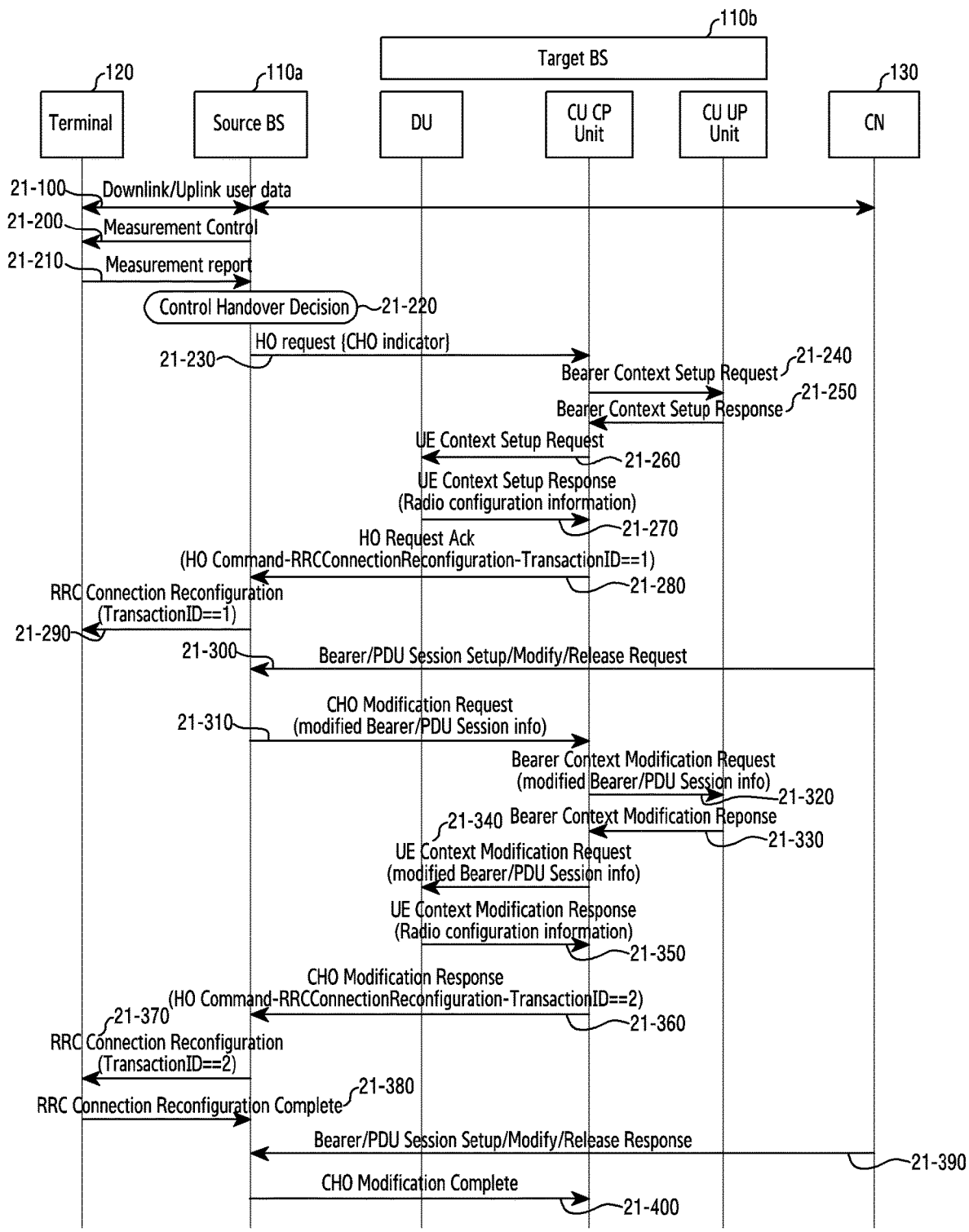
FIG. 21A illustrates another signal exchange for supporting a CHO modification in a wireless communication system according to various embodiments of the disclosure.
Figure 21B:
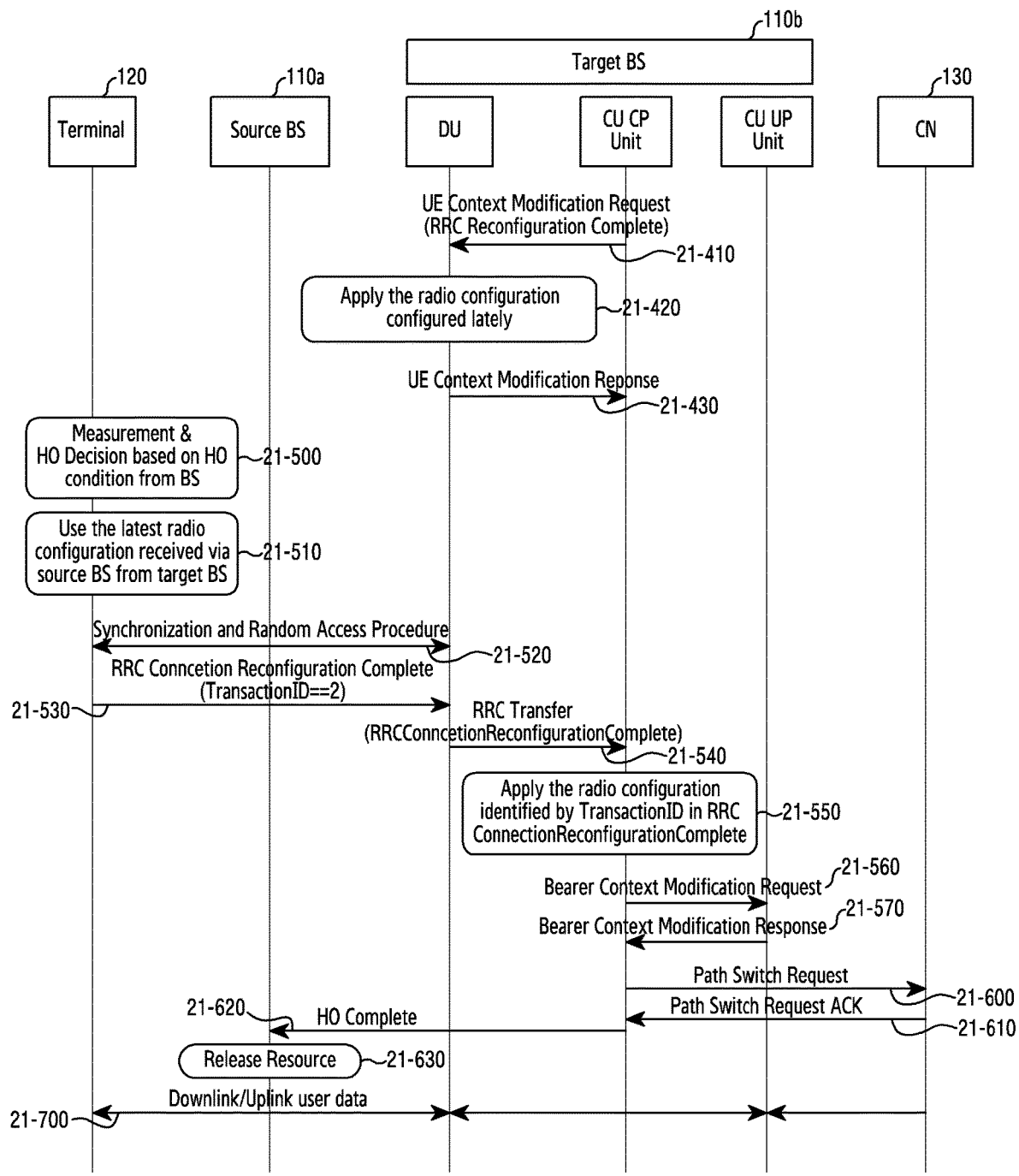
FIG. 21B illustrates another signal exchange for supporting a CHO modification in a wireless communication system according to various embodiments of the disclosure.

FIG. 21A and FIG. 21B illustrate another signal exchange for supporting a CHO modification in a wireless communication system according to various embodiments of the disclosure. FIG. 21A and FIG. 21B illustrate another embodiment corresponding to FIG. 10A and FIG. 10B as an embodiment for supporting a case where a CHO modification setup is complete after a terminal is set to a CHO and before the terminal executes a handover to a target BS. Specifically, FIG. 21A and FIG. 21B exemplify a case where a source BS transmits an RRC connection reconfiguration message to a terminal to modify a CHO and thereafter notifies a potential target/candidate BS or a target BS that the CHO modification is complete.

Referring to FIG. 21A and FIG. 21B, step 21-100 to step 21-290 are steps for configuring a CHO, and are identical to the step 10-100 to step 10-290 of FIG. 10A and FIG. 10B. Thereafter, when bearer or PDU session information changes at the request of the terminal 120 or the CN 130, in step 21-300, if the core network requests the source BS 110*a* to change the bearer or PDU session information in step 21-300, the source BS 110*a* receives a message related to the bearer or PDU session modification from the core network and then transmits a CHO modification request message to the potential target BS 110*b* (e.g., candidate BSs) in step 21-310 while performing related resource modification of the source BS 110*a*. This message may include modified bearer or PDU session information. In addition thereto, when different information, e.g., an AMBR or the like of the terminal 120, received from the core network is modified or when the modification is requested by the need of the source BS 110*a*, for example, information on a change of a target cell or the like may be included. Upon receiving the CHO modification request message from the source BS 110*a*, the CU-CP of the potential target BS 110*b* transmits a bearer context modification request message to the CU-UP of the potential target BS 110*b* in step 21-320, based on modification service information and information on the terminal 120, included in the CHO modification request message. The CU-UP of the potential target BS 110*b* modifies an internal user plane resource for supporting a service of the terminal 120. When resource allocation can be modified, the CU-CP of the potential target BS 110*b* configures the resource, and then, in step 21-330, transmits to the CU-CP of the potential target BS 110*b* a bearer context modification response message by including information related to resource allocation in the CU-UP of the potential target BS 110*b*. In step 21-340, the CU-CP of the potential target BS 110*b* transmits UE context modification request message to a DU of the potential target BS 110*b* which manages a cell to which the terminal 120 executes a handover. Based on information on the terminal 120 and service related information of the terminal 120, which is included in the UE context modification request message, the DU of the potential target BS 110*b* modifies a radio resource used by the DU of the target BS 110*b* to serve the terminal 120. When the DU of the potential target BS 110*b* successfully modifies and configures a radio resource for serving the terminal 120, in step 21-350, the DU transmits a UE context modification response message to the CU-CP of the potential target BS 110*b*. This message includes radio configuration information allocated in the DU of the potential target BS 110*b*. If a target cell included in the CHO modification request message transmitted in step 21-310 is a cell which manages a DU different from the DU which allocates a resource for a previous CHO, the CU-CP requests for a UE context release for an old DU and performs a UE context setup procedure for a new DU in steps 21-260 and 21-270. When the resource for the CHO is successfully modified in the CU-UP and DU of the potential target BS 110*b*, in step 21-360, the CU-CP of the potential target BS 110*b* transmits a CHO modification response message to the source BS 110*a*. This message includes RRC connection reconfiguration information including radio connection configuration information which is newly configured in the DU, CU-UP, and CU-CP of the potential target BS 110*b* to serve the terminal 120, and sets and includes a new RRC transaction ID value to be used as an index for this radio configuration. Upon receiving the CHO modification response message from the potential target BS 110*b*, in step 21-370, the source BS 110*a* transmits an RRC connection reconfiguration message including the RRC connection reconfiguration information of the potential target BS 110*b* to the terminal 120. If the modified RRC connection reconfiguration information of the source BS 110*a* is included in the RRC connection reconfiguration message transmitted to the terminal 120, in step 21-380, the terminal 120 transmits an RRC connection reconfiguration complete message to the source BS 110*a*. If the source BS 110*a* which has received this message receives a bearer or PDU session modification request from the CN 130 in step 21-300, a bearer or PDU session modification complete message is transmitted to the CN 130 in step 21-390. At the same time, when the source BS 110*a* successfully transmits to the terminal 120 an RRC connection reconfiguration message including radio connection reconfiguration information of the potential target BS 110*b*, in step 21-400, a CHO modification complete message is transmitted to the potential target BS 110*b*. If it fails to transmit the RRC connection reconfiguration message to the terminal 120, a CHO modification failure message is transmitted to the potential target BS 110*b*. Upon receiving the CHO modification complete message from the source BS 110*a*, in step 21-410, the CU-CP of the potential target BS 110*b* transmits to a corresponding DU a UE context modification request message including an RRC reconfiguration complete indication. In step 21-420, upon receiving this message, the DU may proceed a service of the terminal 120 by using a pre-set radio configuration. In addition, in step 21-430, a UE context modification response message is transmitted to the CU-CP. In step 21-370, upon receiving the RRC connection reconfiguration message from the source BS 110*a*, the terminal 120 monitors cells of candidate BSs including the potential target BS 110*b* while maintaining a connected state with respect to the source BS 110*a*. In step 21-500, upon discovering a cell of a candidate BS which satisfies a CHO condition included in the RRC connection reconfiguration message, a handover to a corresponding candidate BS (target BS 110*b*) is determined. The terminal 120 starts a handover procedure by using the BS determined in step 21-500 as the target BS 110b. In step 21-510, the handover is executed based on the radio resource configuration of the target BS 110b, which is last received by the terminal 120 via the source BS 110a. In addition, while continuously receiving or transmitting user data and a control message from the source BS 110a according to capability of the terminal 120, a synchronization and a random access for handover to the target BS 110b are performed in step 21-520. If the terminal 120 succeeds in the random access with respect to the target BS 110b in step 21-520, an RRC connection reconfiguration complete message is transmitted to the target BS 110b in step 21-530. The RRC connection reconfiguration complete message is transmitted by including an RRC transaction ID value capable of indexing a radio configuration used by the terminal 120 so that the radio configuration used by the terminal 120 can be notified to the target BS 110b. In step 21-540, upon receiving this message, the DU of the target BS 110b transfers the message to the CU-CP of the target BS 110b by using an RRC transfer message of an F1 interface.

After receiving the RRC connection reconfiguration complete message from the terminal 120, in step 21-550, the CU-CP of the target BS 110b identifies that the terminal 120 has completed the handover, and identifies a radio configuration used by the terminal 120 by using the RRC transaction ID value included in the RRC connection reconfiguration complete message. If the CU-CP, CU-UP, and DU of the target BS 110b are already set based on the radio configuration used by the terminal 120, in step 21-560, the bearer context modification request message is transmitted to the CU-CP of the target BS 110b. This message includes GTP-U tunnel information of the DU of the target BS 110b, which is to be used by the DU-UP of the target BS 110b to transmit a downlink packet to the DU of the target BS 110b. In step 21-570, the CU-UP of the target BS 110b responds to the CU-CP by using a bearer context modification response message. In step 21-410, the CU-CP of the target BS 110b may transmit a related message so that the DI operates with the radio configuration already used by the terminal 120 in step 21-430. Thus, in this step, a message is not additionally transmitted to the DU, and the DU is configured to use the radio configuration already used by the terminal 120, thereby rapidly processing user data transmission/reception of the terminal 120. Thereafter, the CU-CP of the target BS 110b transmits a path switch request message to the core network in step 21-600, and receives a path switch request ACK message from the core network in step 21-610, thereby modifying a data transfer path for transferring user data from the core network to the CU-UP of the target BS 110b. At the same time, in step 21-620, the CU-CP of the target BS 110b transfers a handover complete message to the source BS 110a to notify that the terminal 120 has successfully completed the handover to the target BS 110b. Upon receiving the handover complete message from the target BS 110b, the source BS 110a deletes a radio resource allocated for the terminal 120 and context information of the terminal 120. In the presence of different candidate BSs configured for the terminal 120, a handover cancel message is transmitted to the different BSs to delete the resource allocated to support the terminal 120 and the context information of the terminal 120. After transmitting an RRC connection reconfiguration complete message to the target BS 110b in step 21-530, the terminal 120 transmits/receives downlink and uplink user data via the target BS 110b in step 21-700.

Table 1 to Table 6 show examples of configuring a message used in an interface between a CU-CP and a CU-UP in a BS for supporting embodiments described with reference to FIG. 9 to FIGS. 21A and 21B, a message used in an interface between a CU-CP and a DU, and a message used in an interface between a source BS and a target BS. In FIG. 21A and FIG. 211B, although some Information Elements (IEs) or the like used by being included in the existing message are omitted in an example of configuring a message exemplified in Table 5, the omitted existing IEs may also be used as part of the disclosure.

Table 1 exemplifies a configuration of a bearer context setup request message transmitted from the CU-CP to the CU-UP.

TABLE 1

| IE/Group Name | Presence | Range | IE type and reference | Semantics description | Criticality | Assigned Criticality |
|---|---|---|---|---|---|---|
| Message Type | M | | | | YES | reject |
| gNB-CU-CP UE E1AP ID | M | | | | YES | reject |
| | | | [...] | | | |
| Bearer Context Status Change | O | | ENUMERATED (Suspend, Resume, | Indicates the status of the Bearer Context | YES | reject |
| >>DRB To Setup List | | 1 | | | YES | reject |
| >>>DRB To Setup Item | | 1 ... <maxnoofDRBs> | | | — | — |
| >>>>DRB ID | M | | | | — | — |
| | | | [...] | | | |
| >>>>DL UP Parameters | O | | UP Parameters [...] | | — | — |
| Conditional Handover Indicator | O | | | | YES | reject |

Referring to Table 1, the message includes a 'gNB-CU-CP UE E1AP TD' for identifying a terminal in an E1 interface (an interface between the CU-CP and the CU-UP). In order for the CU-CP to be used for the usage of a CHO indication in the CU-UP, the CU-CP may set a 'Bearer Context Status Change' ED value to 'suspend', or it may be indicated by excluding a 'DL UP Parameters' IE which notifies about DU's GTP-U tunnel information used by the CU-UP to transmit downlink data to the DU, or it may be indicated by additionally using a new 'Conditional Handover Indicator' IE.

Table 2 exemplifies a configuration of a bearer context modification request message transmitted from the CU-CP to the CU-UP in the BS.

TABLE 2

| IE/Group Name | Presence | Range | IE type and reference | Semantics description | Criticality | Assigned Criticality |
|---|---|---|---|---|---|---|
| Message Type | M | | | | YES | reject |
| gNB-CU-CP UE E1AP ID | M | | | | YES | reject |
| | | | [. . .] | | | |
| Bearer Context Status Change | O | | ENUMERATED (Suspend, Resume, . . .) | Indicates the status of the Bearer Context | YES | reject |
| >>DRB To Setup List | | 1 | | | YES | reject |
| >>>DRB To Setup Item | | 1 . . . <maxnoofDRBs> | | | — | — |
| >>>>DRB ID | M | | | | — | — |
| | | | [. . .] | | | |
| >>>>DL UP Parameters | O | | UP Parameters | | — | — |
| | | | [. . .] | | | |
| >>DRB To Modify List | | 0 . . . 1 | | | YES | reject |
| >>>DRB To Modify Item | | 1 . . . <maxnoofDRBs> | | | — | — |
| >>>>DRB ID | M | | | | — | — |
| | | | [. . .] | | | |
| >>>>DL UP Parameters | O | | UP Parameters | | — | — |
| | | | [. . .] | | | |
| Conditional Handover Indicator | O | | | | YES | reject |
| Conditional Handover Complete Indicator | O | | | | YES | reject |

Referring to Table 2, the message includes a 'gNB-CU-CP UE E1AP ID' for identifying a terminal in an E1 interface (an interface between the CU-CP and the CU-UP). In order for the CU-CP to be used for the usage of a CHO indication in the CU-UP, a 'Bearer Context Status Change' IE value may be to 'suspend', or it may be indicated by excluding a 'DL UP Parameters' IE which notifies about DU's GTP-U tunnel information used by the CU-UP to transmit downlink data to the DU, or it may be indicated by additionally using a new 'Conditional Handover Indicator' IE. Alternatively, in order for the CU-CP to be used for the usage of a CHO indication in the CU-UP, a 'Bearer Context Status Change' IE value may be to 'resume', or it may be indicated by including a 'DL UP Parameters' IE which notifies about DU's GTP-U tunnel information used by the CU-UP to transmit downlink data to the DU, or it may be indicated by additionally using a new 'Conditional Handover Complete Indicator' IE.

Table 3 exemplifies a configuration of a UE context setup request message transmitted from the CU-CP to the DU in the BS.

TABLE 3

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | O | | 9.3.1.5 | | YES | ignore |
| | | | [. . .] | | | |
| Conditional Handover Indicator | O | | | | YES | reject |

Referring to Table 3, the message includes 'gNB-CU UE F1AP ID' and 'gNB-DU UE F1AP ID' for identifying a terminal in an F1 interface (e.g., an interface between a CU and a DU). In order for the CU-CP to be used for the usage of a CHO indication in the DU, the CU-CP may include a 'Conditional Handover Indicator' IE in addition to the existing IEs.

Table 4 exemplifies a configuration of the UE context modification request message transmitted from the CU-CP in the BS to the DU.

TABLE 4

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| | | | [. . .] | | | |
| RRC Reconfiguration Complete Indicator | O | | 9.3.1.30 | | YES | ignore |
| | | | [. . .] | | | |
| Conditional Handover Indicator | O | | | | YES | reject |

Referring to Table 4, the message includes 'gNB-CU UE F1AP ID' and 'gNB-DU UE F1AP ID' for identifying a terminal in an F1 interface (an interface between a CU and a DU). In order for the CU-CP to be used for the usage of a CHO indication for the DU, the CU-CP may include a 'Conditional Handover Indicator' IE. In addition, the CU-CP may use an 'RRC reconfiguration complete indicator' IE to indicate whether an RRC connection reconfiguration configured in the terminal is successfully complete, or the DU may enable an RLF detection operation of the terminal.

Table 5 exemplifies a configuration of a new CHO modification request message transmitted from a source BS to a potential target/candidate BS when a CHO configuration modification is required.

TABLE 5

| IE/Group Name | Presence | Range | IE type and reference | Semantics description | Criticality | Assigned Criticality |
|---|---|---|---|---|---|---|
| Message Type | M | | | | YES | reject |
| Old eNB UE X2AP ID | M | | eNB UE X2AP ID | Allocated at the source eNB | YES | reject |
| Cause | M | | | | YES | ignore |
| Target Cell ID | O | | ECGI | | YES | reject |
| GUMMEI | O | | | | YES | reject |
| UE Context Information | | 0 . . . 1 | | | YES | reject |
| >MME UE S1AP ID | O | | INTEGER (0 . . . $2^{32}$ − 1) | MME UE S1AP ID allocated at the MME | — | — |
| >UE Security Capabilities | O | | | | — | — |
| >AS Security Information | O | | | | — | — |
| >UE Aggregate Maximum Bit Rate | O | | | | — | — |
| >Subscriber Profile ID for RAT/Frequency priority | O | | | | — | — |
| >E-RABs To Be Setup List | | 0 . . . 1 | | | — | — |
| >>E-RABs To Be Setup Item | | 1 . . . <maxnoofBearers> | | | EACH | ignore |
| >>>E-RAB ID | M | | | | — | — |
| >>>E-RAB Level QoS Parameters | M | | | Includes necessary QoS parameters | — | — |
| >>>DL Forwarding | O | | | | — | — |
| >>>UL GTP Tunnel Endpoint | M | | GTP Tunnel Endpoint | SGW endpoint of the S1 transport bearer. For delivery of UL PDUs. | — | — |
| >>>Bearer Type | O | | | | YES | reject |
| >E-RABs To Be Modified List | | 0 . . . 1 | | | | |

TABLE 5-continued

| IE/Group Name | Presence | Range | IE type and reference | Semantics description | Criticality | Assigned Criticality |
|---|---|---|---|---|---|---|
| >>E-RABs To Be Modified Item | | 1 . . . <maxnoofBearers> | | | | |
| >>>E-RAB ID | | | | | | |
| >>>E-RAB Level QoS Parameters | | | | | | |
| >>>DL Forwarding | | | | | | |
| >>>UL GTP Tunnel Endpoint | | | | | | |
| >>>Bearer Type | | | | | | |
| >E-RABs To Be Released List | | 0 . . . 1 | | | | |
| >>E-RABs To Be Released Item | | 1 . . . <maxnoofBearers> | | | | |
| >>>E-RAB ID | | | | | | |
| >RRC Context | M | | OCTET STRING | Includes the RRC HandoverPreparationInformation message or the RRC HandoverPreparationInformation-NB message | | |
| >Handover Restriction List | O | | | | | |
| >Location Reporting Information | O | | | Includes the necessary parameters for location reporting | | |
| >Management Based MDT Allowed | O | | | | YES | ignore |
| >Management Based MDT PLMN List | O | | MDT PLMN List | | YES | ignore |
| >UE Sidelink Aggregate Maximum Bit Rate | O | | | This IE applies only if the UE is authorized for V2X services. | YES | Ignore |
| UE History Information | M | | | | YES | ignore |
| Trace Activation | O | | | | YES | ignore |
| SRVCC Operation Possible | O | | | | YES | ignore |
| CSG Membership Status | O | | | | YES | reject |
| Mobility Information | O | | BIT STRING (SIZE (32)) | Information related to the handover; the source eNB provides it in order to enable later analysis of the conditions that led to a wrong HO. | YES | ignore |
| Masked IMEISV | O | | | | YES | ignore |
| UE History Information from the UE | O | | OCTET STRING | VisitedCellInfoList contained in the UEInformationResponse message | YES | ignore |
| Expected UE Behaviour | O | | | | YES | ignore |
| ProSe Authorized | O | | | | YES | ignore |
| UE Context Reference at the SeNB | O | | | | YES | ignore |
| >Global SeNB ID | M | | Global eNB ID | | | |
| >SeNB UE X2AP ID | M | | eNB UE X2AP ID | Allocated at the SeNB | | |
| >SeNB UE X2AP ID Extension | O | | Extended eNB UE X2AP ID | Allocated at the SeNB | | |
| Old eNB UE X2AP ID Extension | O | | Extended eNB UE X2AP ID | Allocated at the source eNB | YES | reject |
| V2X Services Authorized | O | | | | YES | ignore |
| UE Context Reference at the WT | O | | | | YES | ignore |
| >WT ID | M | | | | | |
| >WT UE XwAP ID | M | | | | | |
| UE Context Reference at the SgNB | O | | | | YES | ignore |
| >Global en-gNB ID | M | | | | | |
| >SgNB UE X2AP ID | M | | en-gNB UE X2AP ID | Allocated at the SgNB. | | |
| NR UE Security Capabilities | O | | | | YES | ignore |

TABLE 5-continued

| IE/Group Name | Presence | Range | IE type and reference | Semantics description | Criticality | Assigned Criticality |
|---|---|---|---|---|---|---|
| Aerial UE subscription information | O | | | | YES | ignore |
| Subscription Based UE Differentiation Information | O | | | | YES | ignore |

The CHO modification request message has a message configuration similarly to the existing handover request message, but may optionally include some IEs mandatorily included in the handover request message. In addition, the handover request message includes only information for an Evolved Packet System (BPS) bearer setup, whereas the CHO modification request message may include 'E-RABs To Be Modified List' for modifying a pre-set BPS bearer and 'E-RABs To Be Released List' for releasing the pre-set BPS bearer. Table 5 is an example of configuring an X2AP message for a case of being used in an E-UTRAN network supporting LTE and NR. Similarly to the case of the CHO modification request message, an XnAP message for a case of being used in an NG-RAN network supporting LTE and NR may also optionally include some IEs mandatorily included in an XnAP handover request message. In addition to information on a PDU session setup, information for modifying and releasing a PDU session may also be included.

Table 6 exemplifies a configuration of a new CHO modification request message transmitted from a potential target/candidate BS to a source BS when a CHO configuration modification is required.

The CHO modification request message may include 'Old eNB UE X2AP ID', 'New eNB UE X2AP ID', 'Old eNB UE XnAP ID' or 'New eNB UE XnAP ID' for identifying a terminal in an X2 or Xn interface (e.g., an interface between BSs), may include 'Target Cell ID' which is target cell information for supporting a CHO in the target/candidate BS, and may include 'UE Context Modification Request Information' for modifying a pre-set BPS bearer and 'E-RABs To Be Modified List' for releasing it. Table 6 is an example of configuring an X2AP message used in an E-UTRAN network supporting LTE and NR. An XnAP message used in an NG-RAN network supporting LTE and NR may also include target cell information for supporting a CHO in a target/candidate BS, similarly to the case of the CHO modification request message, and may be transmitted by including information for modifying and releasing the pre-set PDU session.

Figure 22:
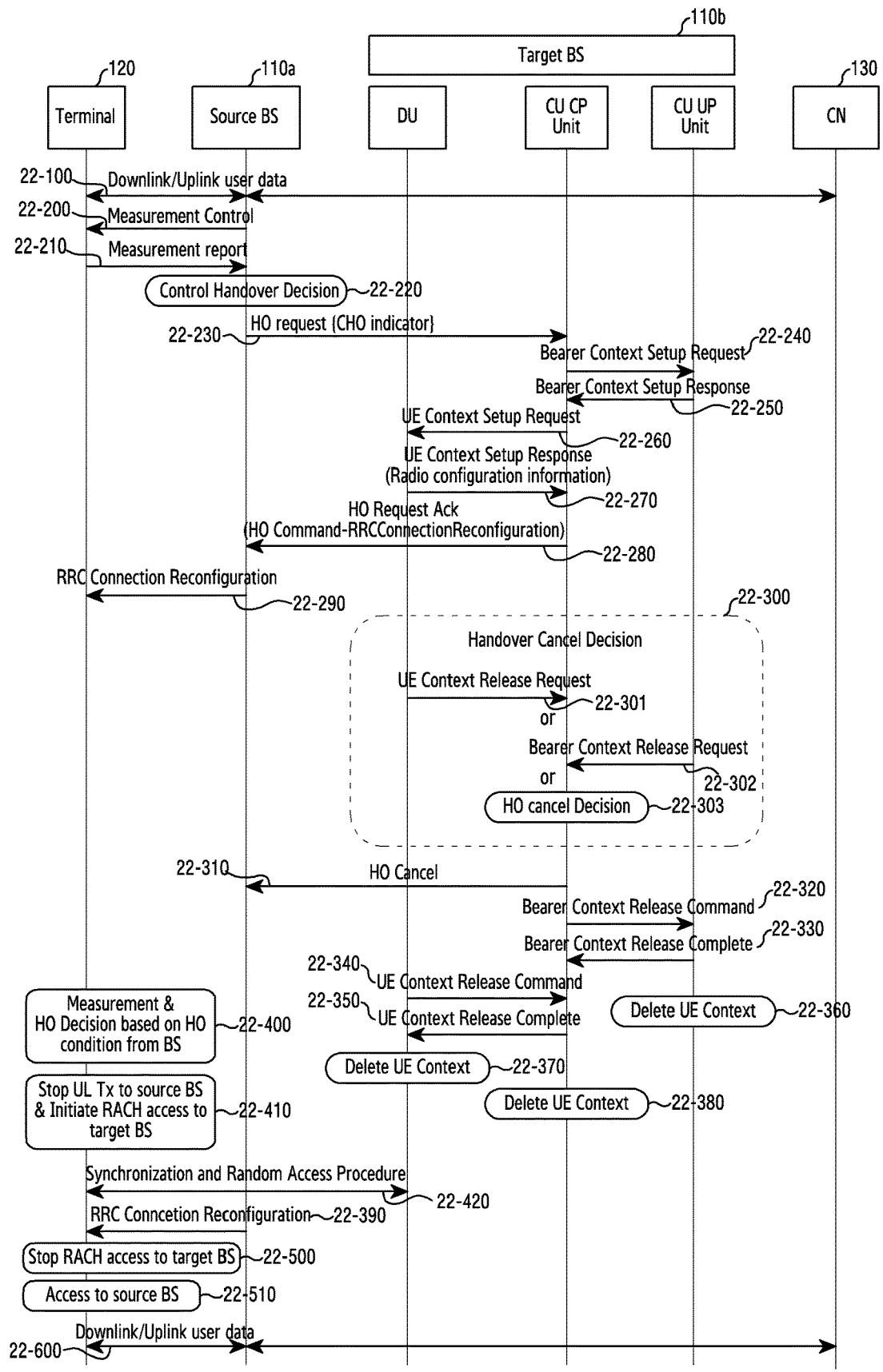
FIG. 22 illustrates a signal exchange for cancelling a handover upon releasing of a CHO resource of a target BS while a CHO is in progress in a wireless communication system according to various embodiments of the disclosure.

FIG. 22 illustrates a signal exchange for cancelling a handover upon releasing of a CHO resource of a target BS while a CHO is in progress in a wireless communication system according to various embodiments of the disclosure. Specifically, FIG. 22 exemplifies a case where a target BS releases a CHO resource and cancels a handover to a source

TABLE 6

| IE/Group Name | Presence | Range | IE type and reference | Semantics description | Criticality | Assigned Criticality |
|---|---|---|---|---|---|---|
| Message Type | M | | | | YES | reject |
| Old eNB UE X2AP ID | M | | eNB UE X2AP ID | Allocated at the source eNB | YES | ignore |
| New eNB UE X2AP ID | M | | eNB UE X2AP ID | Allocated at the target eNB | YES | ignore |
| Cause | M | | | | YES | ignore |
| Target Cell ID | O | | ECGI | | YES | reject |
| UE Context Modification Request Information | | 0 . . . 1 | | | YES | reject |
| >E-RABs To Be Modified List | | | | | | |
| >>E-RABs To Be Modified Item | | | | | | |
| >>>E-RAB ID | | | | | | |
| >>UL GTP Tunnel Endpoint | O | | GTP Tunnel Endpoint | Identifies the X2 transport bearer used for forwarding of UL PDUs | | |
| >>DL GTP Tunnel Endpoint | O | | GTP Tunnel Endpoint | Identifies the X2 transport bearer. used for forwarding of DL PDUs | | |
| >E-RABs To Be Released List | | | | | | |
| >>E-RABs To Be Released Item | | | | | | |
| >>>E-RAB ID | | | | | | |
| >RRC Context | M | | OCTET STRING | Includes the RRC HandoverPreparationInformation message or the RRC HandoverPreparationInformation-NB message | | |

BS while a terminal decides a handover and attempts the handover to the target BS in a state in which a CHO is set. Unlike in the embodiment of FIG. 6, although a procedure in which a different potential target/candidate BS is included is not exemplified in FIG. 22, there may be more different potential target/candidate BSs in addition to the target BS for the CHO.

Referring to FIG. 22, after being coupled to the source BS 110a, in a state in which downlink and uplink user data is exchanged with respect to the source BS 110a in step 22-100, when a measurement command for handover is received from the source BS 110a in step 22-200, the terminal 120 transmits information obtained by measuring cells of neighboring cells to the source BS 110a in step 22-210 according to the measurement command. Upon receiving the measurement information from the terminal 120, in step 22-220, the source BS 110a decides whether to execute the CHO. When the source BS 110a decides to execute the CHO, in step 22-230, the source BS 110a transmits a handover request message including a CHO indication to the CU-CP of the potential target BS 110b. In step 22-240, upon receiving the handover request message, the CU-CP of the potential target BS 110b transmits a bearer context setup request message to the CU-UP of the potential target BS 110b, based on current service information and information on the terminal 120, included in the handover request message. The CU-UP of the potential target BS 110b allocates an internal user plane resource for supporting a service of the terminal 120. When a resource can be allocated, the CU-CP of the potential target BS 110b configures the resource, and then, in step 22-250, transmits to the CU-CP of the potential target BS 110b a bearer context setup response message by including information related to resource allocation in the CU-UP of the potential target BS 110b. In step 22-260, the CU-CP of the potential target BS 110b transmits a UE context setup request message to the DU of the potential target BS 110b which manages a cell to which the terminal 120 executes a handover. Based on information on the terminal 120 and service related information of the terminal 120, which is included in the UE context setup request message, the DU of the potential target BS 110b allocates a radio resource to be used by the DU of the target BS 110b to serve the terminal 120. When the DU of the potential target BS 110b successfully allocates and configures a radio resource for serving the terminal 120, in step 22-270, a UE context setup response message is transmitted to the CU-CP of the potential target BS 110b. This message includes radio configuration information allocated in the DU of the potential target BS 110b. After receiving the UE context setup response message from the DU of the potential target BS 110b, in step 22-280, the CU-CP of the potential target BS 110b transmits a handover request ACK message to the source BS 110a. This message includes RRC connection reconfiguration information including radio connection configuration information which is configured in the DU, the CU-UP, and the CU-CP of the potential target BS 110b to serve the terminal 120. Upon receiving the handover request ACK message from the potential target BS 110b, in step 22-290, the source BS 110a transmits an RRC connection reconfiguration message including the RRC connection reconfiguration information of the potential target BS 110b to the terminal 120.

After the terminal 120 receives the RRC connection reconfiguration message from the source BS 110a in step 22-290, the terminal 120 monitors cells of candidate BSs including the potential target BS 110b while maintaining a connected state with respect to the source BS 110a. In step 22-400, upon discovering a cell of a candidate BS which satisfies a CHO condition included in the RRC connection reconfiguration message, a handover to a corresponding candidate BS (target BS 110b) is determined. The terminal 120 starts a handover procedure by using the BS determined in step 22-400 as the target BS 110b. In step 22-410, the handover is executed based on the radio resource configuration of the target BS 110b, which is last received by the terminal 120 via the source BS 110a. In addition, while continuously receiving or transmitting user data and a control message from the source BS 110a according to capability of the terminal 120, a synchronization and a random access for handover to the target BS 110b are performed in step 22-420.

While the terminal 120 decides a handover to the target BS 110b and performs a synchronization and a random access for handover to the target BS 110b in step 22-420, the target BS 110b may release a CHO resource and may determine to cancel a handover to the source BS 110a. The target BS 110b may determine to cancel the CHO when the DU transmits a UE context release request message to the CU-CP as in step 22-301 because it is impossible to maintain a radio resource allocated for the terminal 120 or due to other internal reasons, or the CU-UP transmits a bearer context release request message to the CU-CP as in step 22-302 because it is impossible to maintain a CU-UP resource allocated for the terminal 120 or due to other internal reasons, or it may be determined as in step 22-303 due to a policy in the CU-CP or other internal reasons. When the target BS 110b determines to cancel the CHO in step 22-300, a handover cancel message is transmitted to the source BS 110a in step 22-310. In addition, the target BS 110b operates internally in such a manner that the CU-CP transmits a bearer context release command to the CU-UP in step 22-320, and the CU-UP transmits a bearer context release complete message to the CU-CP in step 22-330. In addition, in step 22-340, the CU-CP transmits a UE context release request message to the DU. In step 22-350, the DU transmits a UE context release complete message to the CU-UP. Thereafter, the CU-CP, the CU-UP, and the DU delete the entirety of context information which is set for the terminal 120 in steps 22-360, 22-370, and 22-380, respectively.

In a state in which the context of the terminal 120 is deleted in the target BS 110b, when the terminal 120 attempts a random access to the target BS 110b in step 22-420, since there is no context of the terminal 120, even if the terminal 120 succeeds in the random access, the target BS 110b releases an RRC connection of the terminal 120. Therefore, the terminal 120 is disconnected from the BS and a service stops. If the terminal 120 receives from the source BS 110a an RRC connection reconfiguration in which a resource of the target BS 110b is released in step 22-390 before the random access to the target BS 110b is successful, in step 22-500, the terminal 120 stops the random access to the target BS 110b and changes again an access to the source BS 110a. Therefore, in step 22-600, downlink and uplink data is transmitted/received via the source BS 110a. In this case, transmission of user data may be interrupted while the terminal 120 attempts a synchronization and random access to the target BS 110b and changes again the access to the source BS 110a.

Figure 23:
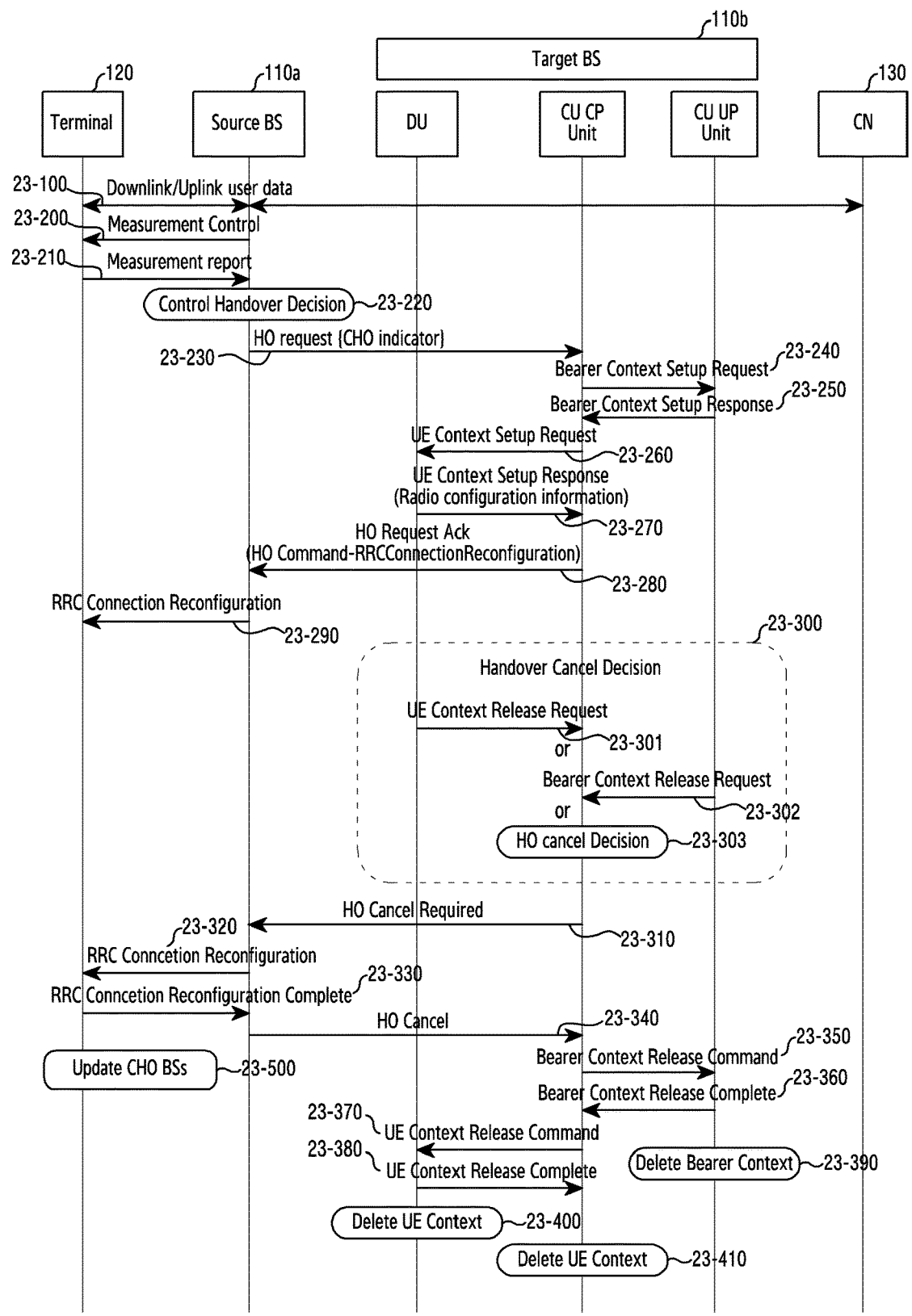
FIG. 23 illustrates a signal exchange for a follow-up action based on cancelling of a CHO in a wireless communication system according to various embodiments of the disclosure.
Figure 24A:
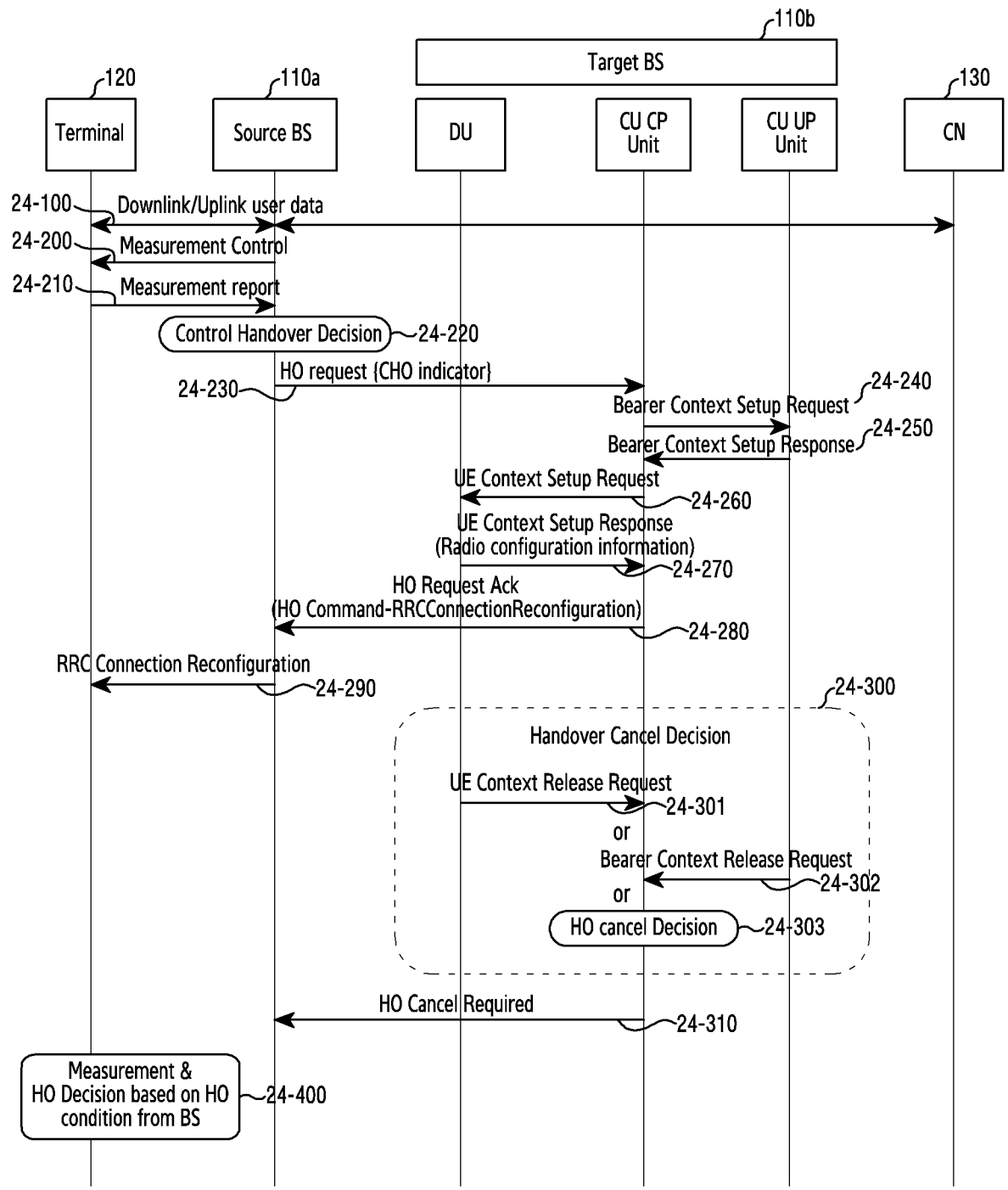
FIG. 24A illustrates another signal exchange for a follow-up action based on cancelling of a CHO in a wireless communication system according to various embodiments of the disclosure.
Figure 24B:
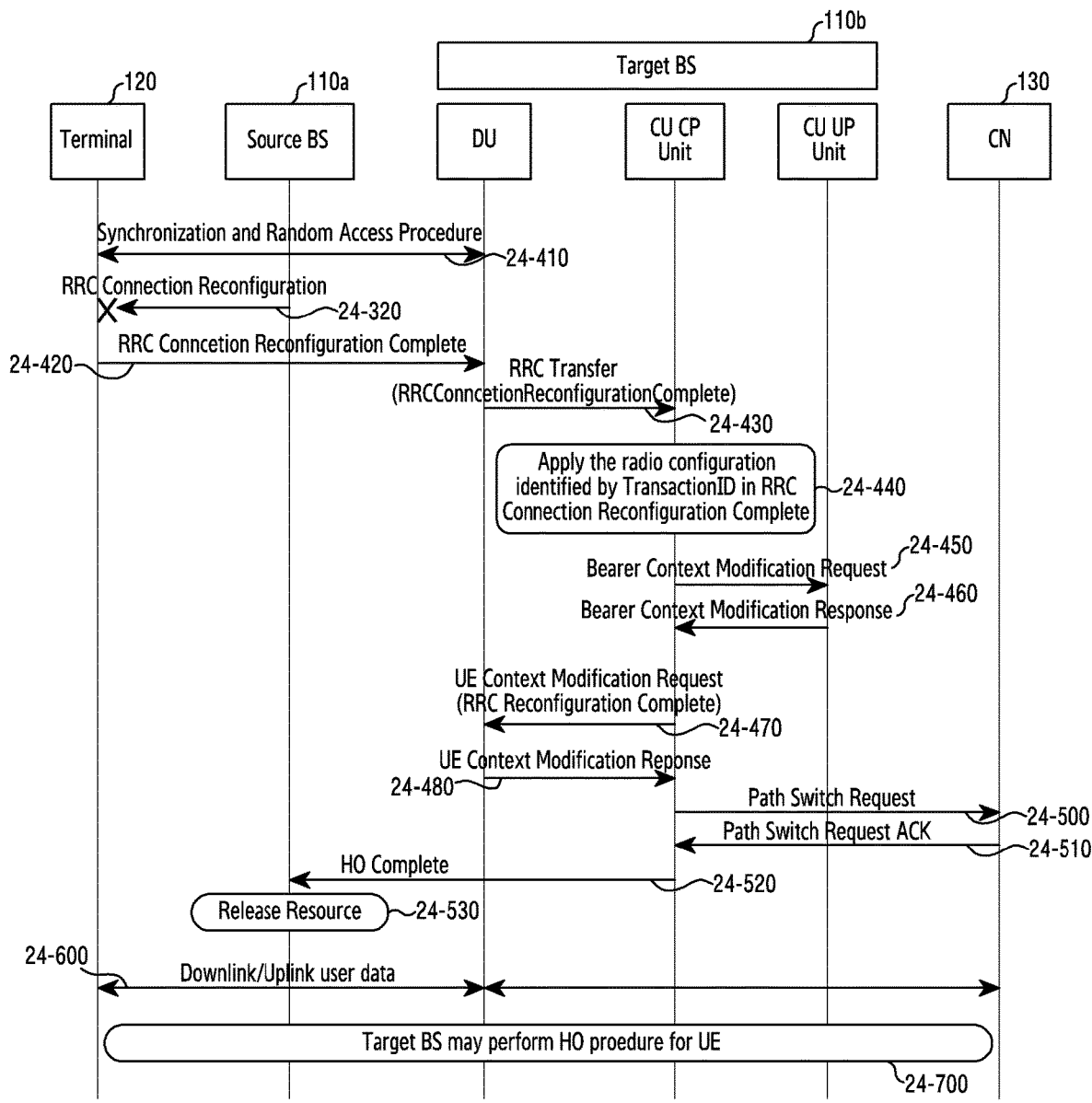
FIG. 24B illustrates another signal exchange for a follow-up action based on cancelling of a CHO in a wireless communication system according to various embodiments of the disclosure.

FIG. 23 and FIGS. 24A and 24B are embodiments for a method for minimizing a release of a radio connection of a terminal or an interruption of transmission/reception of user data for a case where a target BS releases a CHO resource and cancels a handover to a source BS while the terminal decides a handover and attempts the handover to the target BS in a state in which a CHO is set. FIG. 23 is an embodiment for a case where a CHO modification setup is complete before the terminal executes a handover to the target BS after the terminal is set to the CHO. FIG. 24A and FIG. 24B are embodiments for a case where a CHO modification setup is in progress in the meantime before the terminal completes the handover to the target BS after the terminal is set to the CHO. Although a procedure including different BSs as shown in FIG. 6 is not shown in FIG. 23 and FIGS. 24A and 24B, for a CHO, it may operate by including a different candidate BS other than the target BS. The different candidate BS may perform a procedure for modifying a CHO configuration with respect to a source BS, similarly to the target BS included in FIG. 23 and FIGS. 24A and 24B.

FIG. 23 illustrates a signal exchange for a follow-up action based on cancelling of a CHO in a wireless communication system according to various embodiments of the disclosure. Specifically, FIG. 23 illustrates an embodiment for minimizing a release of a radio connection of the terminal 120 or a disconnection of transmission/reception of user data when a CHO is cancelled, and exemplifies a case where a CHO modification setup is complete before the terminal 120 executes a handover to the target BS 110b.

Referring to FIG. 23, after being coupled to the source BS 110a, in a state in which downlink and uplink user data is exchanged with respect to the source BS 110a in step 23-100, when a measurement command for handover is received from the source BS 110a in step 23-200, the terminal 120 transmits information obtained by measuring cells of neighboring cells to the source BS 110a in step 23-210 according to the measurement command. Upon receiving the measurement information from the terminal 120, the source BS 110a decides whether to execute the CHO in step 23-220. When the source BS 110a decides to execute the CHO, in step 23-230, the source BS 110a transmits a handover request message including a CHO indication to the CU-CP of the potential target BS 110b. In step 23-240, upon receiving the handover request message, the CU-CP of the potential target BS 110b transmits a bearer context setup request message to the CU-UP of the potential target BS 110b, based on current service information and information on the terminal 120, included in the handover request message. The CU-UP of the potential target BS 110b allocates an internal user plane resource for supporting a service of the terminal 120. When a resource can be allocated, the CU-CP of the potential target BS 110b configures the resource, and then, in step 23-250, transmits to the CU-CP of the potential target BS 110b a bearer context setup response message by including information related to resource allocation in the CU-UP of the potential target BS 110b. In step 23-260, the CU-CP of the potential target BS 110b transmits a UE context setup request message to the DU of the potential target BS 110b which manages a cell to which the terminal 120 executes a handover. Based on information on the terminal 120 and service related information of the terminal 120, which is included in the UE context setup request message, the DU of the potential target BS 110b allocates a radio resource to be used by the DU to serve the terminal 120. When the DU successfully allocates and configures a radio resource for serving the terminal 120, in step 23-270, a UE context setup response message is transmitted to the CU-CP. This message includes radio configuration information allocated in the DU. After receiving the UE context setup response message from the DU, in step 23-280, the CU-CP transmits a handover request ACK message to the source BS 110a. This message includes RRC connection reconfiguration information including radio connection configuration information which is configured in the DU, the CU-UP, and the CU-CP of the potential target BS 110b to serve the terminal 120. Upon receiving the handover request ACK message from the potential target BS 110b, in step 23-290, the source BS 110a transmits an RRC connection reconfiguration message including the RRC connection reconfiguration information of the potential target BS 110b to the terminal 120.

Thereafter, in step 23-300, the potential target BS 110b may release a CHO resource and may determine to cancel a handover to the source BS 110a. The potential target BS 110b may determine to cancel the CHO when the DU transmits a UE context release request message to the CU-CP as in step 22-301 because it is impossible to maintain a radio resource allocated for the terminal 120 or due to other internal reasons, or the CU-UP transmits a bearer context release request message to the CU-CP as in step 22-302 because it is impossible to maintain a CU-UP resource allocated for the terminal 120 or due to other internal reasons, or it may be determined as in step 22-303 due to a policy in the CU-CP or other internal reasons. When the potential target BS 110b determines to cancel the CHO in step 23-300, a handover cancel required message is transmitted to the source BS 110a in step 23-310. Upon receiving the handover cancel required message, in step 23-320, the source BS 110a transmits to the terminal 120 an RRC connection reconfiguration message including information for deleting the potential target BS 110b from a CHO target BS. In step 23-330, the terminal 120 responds to the source BS 110a by using an RRC connection reconfiguration complete message. In step 23-500, the terminal 120 internally modifies CHO information.

In step 23-290, if information to be configured or modified for the terminal 120 by the potential target BS 110b is included in the RRC connection reconfiguration message received from the source BS 110a, instead of transmitting to the source BS 110a an RRC connection reconfiguration complete message for the information configured or modified by the potential target BS 110b, the RRC connection reconfiguration complete message is directly transmitted to the target BS 110b while the terminal 120 executes a handover. However, as in step 23-320, if the terminal 120 receives the RRC connection reconfiguration message including information to be used by the source BS 110a to delete the potential target BS 110b from a CHO target BS, the terminal transmits the RRC connection reconfiguration complete message to the source BS as in step 23-330. In summary, when the terminal receives the RRC connection reconfiguration message from the source BS in regards to a CHO configuration, the RRC connection reconfiguration complete message is transmitted as follows.

(1) When a CHO potential target BS is set up or modified in the RRC connection reconfiguration message, the RRC connection reconfiguration complete message is transmitted after being coupled to a corresponding target BS.

(2) When a CHO potential target BS is deleted in the RRC connection reconfiguration message, the RRC connection reconfiguration complete message is transmitted after being coupled to a source BS.

Upon receiving the RRC connection reconfiguration complete message from the terminal 120, in step 23-340, the source BS 110a transmits a handover cancel message to the potential target BS 110b so that the potential target BS 110b deletes UE context information configured for a corresponding UE. When the CU-CP receives the handover cancel message from the source BS 110*a*, in step 23-350, the CU-CP transmits a bearer context release command to the CU-UP. In step 23-360, the CU-UP transmits a bearer context release complete message to the CU-CP. In addition, in step 23-370, the CU-CP transmits a UE context release request message to the DU. In step 23-380, the DU transmits a UE context release complete message to the CU-UP. Thereafter, the CU-CP, the CU-UP, and the DU delete the entirety of context information which is set for the terminal 120 in steps 23-390, 23-400, and 23-410, respectively.

FIG. 24A and FIG. 24B illustrate another signal exchange for a follow-up action based on cancelling of a CHO in a wireless communication system according to various embodiments of the disclosure. Specifically, FIG. 24A and FIG. 24B illustrate an embodiment for minimizing a release of a radio connection of the terminal 120 or a disconnection of transmission/reception of user data when a CHO is cancelled, and exemplify a case where a CHO cancelling procedure is complete in the meantime before the terminal 120 executes a handover to the target BS 110*b*.

Referring to FIG. 24A and FIG. 24B, after being coupled to the source BS 110*a*, in a state in which downlink and uplink user data is exchanged with respect to the source BS 110*a* in step 24-100, when a measurement command for handover is received from the source BS 110*a* in step 24-200, the terminal 120 transmits information obtained by measuring cells of neighboring cells to the source BS 110*a* in step 24-210 according to the measurement command. Upon receiving the measurement information from the terminal 120, in step 24-220, the source BS 110*a* decides whether to execute the CHO. When the source BS 110*a* decides to execute the CHO, in step 24-230, the source BS 110*a* transmits a handover request message including a CHO indication to the CU-CP of the potential target BS 110*b*. In step 24-240, upon receiving the handover request message, the CU-CP of the potential target BS 110*b* transmits a bearer context setup request message to the CU-UP of the potential target BS 110*b*, based on current service information and information on the terminal 120, included in the handover request message. The CU-UP of the potential target BS 110*b* allocates an internal user plane resource for supporting a service of the terminal 120. When a resource can be allocated, the CU-CP of the potential target BS 110*b* configures the resource, and then, in step 24-250, transmits to the CU-CP of the potential target BS 110*b* a bearer context setup response message by including information related to resource allocation in the CU-UP of the potential target BS 110*b*. In step 24-260, the CU-CP of the potential target BS 110*b* transmits a UE context setup request message to the DU of the potential target BS 110*b* which manages a cell to which the terminal 120 executes a handover. Based on information on the terminal 120 and service related information of the terminal 120, which is included in the UE context setup request message, the DU of the potential target BS 110*b* allocates a radio resource to be used by the DU to serve the terminal 120. When the DU successfully allocates and configures a radio resource for serving the terminal 120, in step 24-270, a UE context setup response message is transmitted to the CU-CP. This message includes radio configuration information allocated in the DU. After receiving the UE context setup response message from the DU, in step 24-280, the CU-CP transmits a handover request ACK message to the source BS 110*a*. This message includes RRC connection reconfiguration information including radio connection configuration information which is configured in the DU, the CU-UP, and the CU-CP of the potential target BS 110*b* to serve the terminal 120. Upon receiving the handover request ACK message from the potential target BS 110*b*, in step 24-290, the source BS 110*a* transmits an RRC connection reconfiguration message including the RRC connection reconfiguration information of the potential target BS 110*b* to the terminal 120.

After the terminal 120 receives the RRC connection reconfiguration message from the source BS 110*a* in step 24-290, the terminal 120 monitors cells of candidate BSs including the potential target BS 110*b* while maintaining a connected state with respect to the source BS 110*a*. In step 24-400, upon discovering a cell of a candidate BS which satisfies a CHO condition included in the RRC connection reconfiguration message, a handover to a corresponding candidate BS (target BS 110*b*) is determined. The terminal 120 starts a handover procedure by using the BS determined in step 24-400 as the target BS 110*b*. In step 24-410, the handover is executed based on the radio resource configuration of the target BS 110*b*, which is last received by the terminal 120 via the source BS 110*a*. In addition, while continuously receiving or transmitting user data and a control message from the source BS 110*a* according to capability of the terminal 120, a synchronization and a random access for handover to the target BS 110*b* are performed in step 24-420.

While the terminal 120 decides a handover to the target BS 110*b* and performs a synchronization and a random access for handover to the target BS 110*b* in step 24-420, the target BS 110*b* may release a CHO resource and may determine to cancel a handover to the source BS 110*a*. The target BS 110*b* may determine to cancel the CHO when the DU transmits a UE context release request message to the CU-CP as in step 24-301 because it is impossible to maintain a radio resource allocated for the terminal 120 or due to other internal reasons, or the CU-UP transmits a bearer context release request message to the CU-CP as in step 24-302 because it is impossible to maintain a CU-UP resource allocated for the terminal 120 or due to other internal reasons, or it may be determined as in step 24-303 due to a policy in the CU-CP or other internal reasons. When the target BS 110*b* determines to cancel the CHO in step 24-300, a handover cancel message is transmitted to the source BS 110*a* in step 24-310. In step 24-320, upon receiving this message, the source BS 110*a* attempts to transmit to the terminal 120 an RRC connection reconfiguration message including information for deleting the potential target BS 110*b* from a CHO target BS. If the terminal 120 succeeds in a random access to the target BS 110*b* in step 24-210 before receiving the RRC connection reconfiguration message from the source BS 110*a* in step 24-320, the terminal 120 cannot receive the RRC connection reconfiguration message transmitted by the source BS 110*a* in step 24-320, and transmits the RRC connection reconfiguration complete message to the target BS 110*b* in step 24-420. In step 24-430, upon receiving this message, the DU of the target BS 110*b* transfers the message to the CU-CP of the target BS 110*b* by using an RRC transfer message of an F1 interface. After receiving the RRC connection reconfiguration complete message from the terminal 120, in step 24-440, the CU-CP of the target BS 110*b* identifies that the terminal 120 has completed the handover, and identifies a radio configuration used by the terminal 120 by using the RRC transaction ID value included in the RRC connection reconfiguration complete message. Thereafter, in step 24-450, the CU-CP transmits a bearer context modification request message to the CU-UP. In step 24-460, the CU-UP responds to the CU-CP by using a bearer context modification response message. In step 24-470, the CU-CP transmits to the DU a UE context modification request message including RRC reconfiguration indication information. In step 24-480, the DU responds to the CU-CP of the target BS 110*b* by transmitting the UE context modification response message. Thereafter, the CU-CP transmits a path switch request message to the CN 130 in step 24-500, and receives a path switch request ACK message from the CN 130 in step 24-510, thereby modifying a data transfer path for transferring user data from the CN 130 to the CU-UP of the target BS 110*b*. At the same time, in step 24-520, the CU-CP of the target BS 110*b* transfers a handover complete message to the source BS 110*a* to notify that the terminal 120 has successfully completed the handover to the target BS 110*b*. Upon receiving the handover complete message from the target BS 110*b*, the source BS 110*a* deletes a radio resource allocated for the terminal 120 and context information of the terminal 120. In the presence of different candidate BSs configured for the terminal 120, a handover cancel message is transmitted to the different candidate BSs to delete the resource allocated to support the terminal 120 and the context information of the terminal 120. After transmitting an RRC connection reconfiguration complete message to the target BS 110*b* in step 24-420, the terminal 120 transmits/receives downlink and uplink user data via the target BS 110*b* in step 24-600. Thereafter, if the target BS 110*b* cannot support a service of the terminal 120, in step 24-700, the existing handover procedure may be used so that the terminal 120 executes a handover to another BS.

Table 7 exemplifies a configuration of the handover cancel request message between BSs for supporting the embodiments of FIG. 22 and FIG. 23.

TABLE 7

| IE/Group Name | Presence | Range | IE type and reference | Semantics description | Criticality | Assigned Criticality |
|---|---|---|---|---|---|---|
| Message Type | M | | 9.2.13 | | YES | ignore |
| Old eNB UE X2AP ID | M | | eNB UE X2AP ID | Allocated at the source eNB | YES | reject |
| New eNB UE X2AP ID | O | | eNB UE X2AP ID | Allocated at the target eNB | YES | ignore |
| Cause | M | | | | YES | ignore |

The handover cancel request message is transmitted from the potential target BS to the source BS, and includes 'Old eNB UE X2AP ID', 'New eNB UE X2AP ID', 'Old eNB UE XnAP ID' or 'New eNB UE XnAP ID' for identifying a terminal, and includes 'cause' for indicating a cause of cancelling the handover.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the disclosure via an external port. In addition, an additional storage device on a communication network can have an access to the device for performing the embodiment of the disclosure.

According to an embodiment, an operation method of a Control Unit (CU)-Control Plane (CP) unit of a Base Station (BS) in a wireless communication system may include receiving a handover request message including an indicator indicating a Conditional Handover (CHO), and transmitting to a CU-User Plane (UP) unit a bearer context setup request message including information for reporting execution of the CHO.

According to an embodiment, the information for reporting execution of the CHO may be expressed by one of the indicator, bearer context status information which is set to 'suspend', and absence of tunnel information for packet transfer between a Distributed Unit (DU) and the CU-UP unit.

According to an embodiment, the method may further include receiving a Radio Resource Control (RRC) connection reconfiguration complete message for reporting completion of the CHO from the DU, and transmitting to the CU-UP unit a bearer context modification request message including information for reporting completion of the CHO.

According to an embodiment, the information for reporting completion of the CHO may be expressed by the indicator indicating completion of the CHO, bearer context status information which is set to 'resume', and presence of tunnel information for packet transfer between the DU and the CU-UP unit.

According to an embodiment, a CU-CP unit of a BS in a wireless communication system may include a transceiver and at least one processor coupled to the transceiver. The at least one processor may provide control to receive a handover request message including an indicator indicating a Conditional Handover (CHO), and transmit to a CU-User Plane (UP) unit a bearer context setup request message including information for reporting execution of the CHO.

According to an embodiment, the information for reporting execution of the CHO may be expressed by one of the indicator, bearer context status information which is set to 'suspend', and absence of tunnel information for packet transfer between a DU and the CU-UP unit.

According to an embodiment, the at least one processor may provide control to receive an RRC connection reconfiguration complete message for reporting completion of the CHO from the DU, and transmit to the CU-UP unit a bearer context modification request message including information for reporting completion of the CHO.

According to an embodiment, the information for reporting completion of the CHO may be expressed by the indicator indicating completion of the CHO, bearer context status information which is set to 'resume', and presence of tunnel information for packet transfer between the DU and the CU-UP unit.

According to an embodiment, an operation method of a CU-CP unit of a BS in a wireless communication system may include receiving a handover request message including an indicator indicating a CHO from a source BS, transmitting to the source BS a cancel request message for a handover cancel request in response to determining of cancelling the CHO, and receiving a cancel message from the source BS. According to an embodiment, the cancel request message may include information for identifying a User Equipment (UE) which performs the CHO and information indicating a cause of cancelling the handover.

According to an embodiment, the cancelling of the CHO may be determined when it is impossible to maintain a radio resource allocated for a corresponding UE in a DU of the BS and when it is impossible to maintain a CU-UP resource allocated for a corresponding UE in a CU-UP of the BS.

According to various embodiments, an operation method performed by a CU-CP of a candidate BS may include transmitting a first message for a bearer context setup request to a CU-UP of the candidate BS, wherein the first message includes information for indicating a conditional handover which is a handover executed by a UE when at least one execution condition is satisfied, and receiving a second message for a bearer context setup response from the CU-UP.

According to an embodiment, inactivity monitoring of the CU-UP may be performed after a bearer context modification procedure, based on the conditional handover.

According to an embodiment, the bearer context modification procedure may not indicate an initiation of the conditional handover.

According to an embodiment, the inactivity monitoring of the CU-UP may be disabled specified procedures based on the conditional handover.

According to an embodiment, the method may further include transmitting a third message for a UE context setup request to a DU of the candidate BS, wherein the third message includes information for indicating the conditional handover, and receiving a fourth message for a UE context setup response from the DU. The DU may be configured to stop an operation for detecting an RLF, based on the conditional handover.

According to an embodiment, the method may further include transmitting a fifth message for a bearer context modification request to the CU-UP, wherein the fifth message includes information for indicating the conditional handover, and receiving a sixth message for a bearer context modification response from the CU-UP.

According to various embodiments, a CU-CP of a candidate BS of a conditional handover which is a handover executed by a UE when at least one execution condition is satisfied may include at least one transceiver and at least one processor. The at least one processor may be configured to perform one of the aforementioned methods.

According to various embodiments, an operation method performed by a CU-UP of a candidate BS may include receiving a first message for a bearer context setup request from a CU-CP of the candidate BS, wherein the first message includes information for indicating a conditional handover which is a handover executed by a UE when at least one execution condition is satisfied, and transmitting a second message for a bearer context setup response to the CU-CP.

According to an embodiment, inactivity monitoring of the CU-UP may be performed after a bearer context modification procedure, based on the conditional handover.

According to an embodiment, the bearer context modification procedure may not include an indication of the conditional handover.

According to an embodiment, the inactivity monitoring of the CU-UP may be disabled specified procedures based on the conditional handover.

According to an embodiment, the method may further include receiving a third message for a bearer context modification request from the CU-CP, wherein the third message includes information for indicating the conditional handover, and transmitting a fourth message for a bearer context modification response to the CU-CP.

According to various embodiments, a CU-UP of a candidate BS of a conditional handover which is a handover executed by a UE when at least one execution condition is satisfied may include at least one transceiver and at least one processor. The at least one processor may be configured to perform one of the aforementioned methods.

According to various embodiments, an operation method performed by a DU of a candidate BS may include receiving a first message for a UE context setup request from a CU-CP of the candidate BS, wherein the first message includes information for indicating a conditional handover which is a handover executed by a UE when at least one execution condition is satisfied, and transmitting a second message for a UE context setup response to the CU-CP. The DU may be configured to stop an operation for detecting an RLF, based on the conditional handover.

According to various embodiments, a DU of a candidate BS of a conditional handover which is a handover executed by a UE when at least one execution condition is satisfied may include at least one transceiver and at least one processor. The at least one processor may be configured to perform one of the aforementioned methods.

According to various embodiments, an operation method performed by a CU of a candidate BS may include transmitting a first message including first configuration information to a source BS of a conditional handover which is a handover executed by a UE when at least one execution condition is satisfied, wherein the first configuration information relates to a first transaction Identifier (ID), transmitting a second message including second configuration information to the source BS after transmitting the first message, wherein the second configuration information relates to a second transaction ID, and receiving a third message from a DU of the candidate BS after an access procedure of the UE, wherein the third message relates to the second transaction ID.

According to an embodiment, the method may further include transmitting, by the CU of the candidate BS, a message for a UE context modification request to the DU of the candidate BS. The message may include the second configuration information and an RRC configuration complete indicator.

According to various embodiments, a CU-CP of a candidate BS of a conditional handover which is a handover executed by a UE when at least one execution condition is satisfied may include at least one transceiver and at least one processor. The at least one processor may be configured to perform one of the aforementioned methods.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form can also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

The invention claimed is:

1. A method performed by a central unit (CU)-control plane (CP) of a base station (BS), the method comprising:
   transmitting a first message for a bearer context setup request to a CU-user plane (UP) of the BS, wherein the first message includes information for indicating a conditional handover which is a handover executed by a user equipment (UE) when at least one execution condition is satisfied; and
   receiving a second message for a bearer context setup response from the CU-UP.

2. The method of claim 1, wherein inactivity monitoring of the CU-UP is performed after a bearer context modification procedure, based on the conditional handover.

3. The method of claim 1, wherein inactivity monitoring of the CU-UP is disabled specified procedures based on the conditional handover.

4. The method of claim 1, further comprising:
   transmitting a third message for a UE context setup request to a distributed unit (DU) of the BS, wherein the third message includes information for indicating the conditional handover; and
   receiving a fourth message for a UE context setup response from the DU,
   wherein the DU is configured to stop an operation for detecting a radio link failure (RLF), based on the conditional handover.

5. A method performed by a central unit-user plane (CU-UP) of a base station (BS), the method comprising:
   receiving a first message for a bearer context setup request from a CU-CP of the BS, wherein the first message includes information for indicating a conditional handover which is a handover executed by a user equipment (UE) when at least one execution condition is satisfied; and
   transmitting a second message for a bearer context setup response to the CU-CP.

6. The method of claim 5, wherein inactivity monitoring of the CU-UP is performed after a bearer context modification procedure, based on the conditional handover.

7. The method of claim 5, wherein inactivity monitoring of the CU-UP is disabled specified procedures based on the conditional handover.

8. A method performed by a distributed unit (DU) of a base station (BS), the method comprising:
   receiving a first message for a UE context setup request from a central unit-control plane (CU-CP) of the BS, wherein the first message includes information for indicating a conditional handover which is a handover executed by a UE when at least one execution condition is satisfied; and
   transmitting a second message for a UE context setup response to the CU-CP,
   wherein the DU is configured to stop an operation for detecting a radio link failure (RLF) based on the conditional handover.

9. An apparatus of a central unit (CU)-control plane (CP) of a base station (BS), comprising:
   at least one transceiver; and
   at least one processor,
   wherein the at least one processor is configured to:
   control the at least one transceiver to transmit a first message for a bearer context setup request to a CU-user plane (UP) of the BS, wherein the first message includes information for indicating a conditional handover which is a handover executed by a user equipment (UE) when at least one execution condition is satisfied; and
   control the at least one transceiver to receive a second message for a bearer context setup response from the CU-UP.

10. The apparatus of claim 9, wherein inactivity monitoring of the CU-UP is performed after a bearer context modification procedure, based on the conditional handover.

11. The apparatus of claim 9, wherein inactivity monitoring of the CU-UP is disabled specified procedures based on the conditional handover.

12. The apparatus of claim 9,
   wherein the at least one processor is further configured to:
   control the at least one transceiver to transmit a third message for a UE context setup request to a distributed unit (DU) of the BS, wherein the third message includes information for indicating the conditional handover, and
   control the at least one transceiver to receive a fourth message for a UE context setup response from the DU, and
   wherein the DU is configured to stop an operation for detecting a radio link failure (RLF), based on the conditional handover.

13. An apparatus of a central unit-user plane (CU-UP) of a base station (BS), the apparatus comprising:
   at least one transceiver; and
   at least one processor,
   wherein the at least one processor is configured to
   control the at least one transceiver to receive a first message for a bearer context setup request from a CU-CP of the BS, wherein the first message includes information for indicating a conditional handover which is a handover executed by a user equipment (UE) when at least one execution condition is satisfied; and
   control the at least one transceiver to transmit a second message for a bearer context setup response to the CU-CP.

14. The apparatus of claim 13, wherein inactivity monitoring of the CU-UP is performed after a bearer context modification procedure, based on the conditional handover.

15. The apparatus of claim 13, wherein inactivity monitoring of the CU-UP is disabled specified procedures based on the conditional handover.

16. An apparatus of a distributed unit (DU) of a base station (BS), the apparatus comprising:
at least one transceiver; and
at least one processor,
wherein the at least one processor is configured to
control the at least one transceiver to receive a first message for a UE context setup request from a central unit-control plane (CU-CP) of the BS, wherein the first message includes information for indicating a conditional handover which is a handover executed by a UE when at least one execution condition is satisfied, and
control the at least one transceiver to transmit a second message for a UE context setup response to the CU-CP, and
wherein the DU is configured to stop an operation for detecting a radio link failure, RLF, based on the conditional handover.

\* \* \* \* \*